United States Patent
Seok

(10) Patent No.: US 10,004,031 B2
(45) Date of Patent: Jun. 19, 2018

(54) METHOD FOR SENSING CHANNEL DYNAMICALLY IN WIRELESS LAN SYSTEM AND APPARATUS THEREFOR

(71) Applicant: LG Electronics Inc., Seoul (KR)

(72) Inventor: Yongho Seok, Seoul (KR)

(73) Assignee: LG Electronics Inc., Seoul (KR)

( * ) Notice: Subject to any disclaimer, the term of this patent is extended or adjusted under 35 U.S.C. 154(b) by 244 days.

(21) Appl. No.: 14/787,927

(22) PCT Filed: May 2, 2014

(86) PCT No.: PCT/KR2014/003940
§ 371 (c)(1),
(2) Date: Oct. 29, 2015

(87) PCT Pub. No.: WO2014/178678
PCT Pub. Date: Nov. 6, 2014

(65) Prior Publication Data
US 2016/0081010 A1   Mar. 17, 2016

Related U.S. Application Data

(60) Provisional application No. 61/818,876, filed on May 2, 2013, provisional application No. 61/874,410, filed
(Continued)

(51) Int. Cl.
*H04W 4/00* (2018.01)
*H04W 48/16* (2009.01)
(Continued)

(52) U.S. Cl.
CPC ....... *H04W 48/16* (2013.01); *H04W 72/0453* (2013.01); *H04W 72/0473* (2013.01);
(Continued)

(58) Field of Classification Search
None
See application file for complete search history.

(56) References Cited

U.S. PATENT DOCUMENTS 8,363,578 B1  1/2013  Ramamurthy et al.
2006/0146869 A1  7/2006  Zhang et al.
(Continued)

FOREIGN PATENT DOCUMENTS

CN    101253784 A    8/2008
CN    101873710 A    10/2010
(Continued)

OTHER PUBLICATIONS

B. Hart, "D1 Comment Resolution, brianh, part5", IEEE P802.11, Wireless LANs, IEEE 802.11-11/1128r3, Aug. 18, 2011.
(Continued)

*Primary Examiner* — Rebecca E Song
(74) *Attorney, Agent, or Firm* — Dentons US LLP

(57) ABSTRACT

The present invention relates to a wireless communications system, and more particularly to a method for sensing a channel dynamically in a wireless LAN system and an apparatus therefor. A method for performing CCA (Clear Channel Assessment) by a station (STA) in a wireless LAN system according to an embodiment of the present invention includes the steps of: receiving by a physical layer (PHY) of the STA a request primitive including a parameter indicating a CCA level type from an upper layer, and determining whether a signal equal to or greater than a prescribed CCA threshold is sensed based on the value of the parameter. Here, the parameter may be set so as to indicate one of a plurality of different CCA level types.

14 Claims, 26 Drawing Sheets

Related U.S. Application Data on Sep. 6, 2013, provisional application No. 61/887,431, filed on Oct. 6, 2013, provisional application No. 61/889,490, filed on Oct. 10, 2013, provisional application No. 61/896,006, filed on Oct. 25, 2013.

(51) Int. Cl.
*H04W 74/08* (2009.01)
*H04W 72/04* (2009.01)
*H04W 84/12* (2009.01)

(52) U.S. Cl.
CPC ... *H04W 74/0808* (2013.01); *H04W 74/0816* (2013.01); *H04W 84/12* (2013.01)

(56) References Cited

U.S. PATENT DOCUMENTS

| | | | |
|---|---|---|---|
| 2008/0192644 A1 | 8/2008 | Utsunomiya et al. | |
| 2009/0262688 A1 | 10/2009 | Tsai et al. | |
| 2011/0075620 A1* | 3/2011 | Jang | H04L 1/1812 370/329 |
| 2011/0292919 A1 | 12/2011 | Trainin et al. | |
| 2012/0057492 A1 | 3/2012 | Goel et al. | |
| 2012/0195296 A1* | 8/2012 | Adachi | H04W 16/14 370/338 |
| 2014/0355534 A1* | 12/2014 | Vermani | H04W 16/14 370/329 |

FOREIGN PATENT DOCUMENTS

| | | |
|---|---|---|
| JP | 2008199102 A | 8/2008 |
| JP | 2012169796 A | 9/2012 |
| RU | 2354059 C2 | 4/2009 |
| RU | 2427089 C2 | 8/2011 |
| RU | 115592 U1 | 4/2012 |
| WO | 2006109213 A1 | 10/2006 |
| WO | 2014165413 A1 | 10/2014 |

OTHER PUBLICATIONS

S. Schelstraete, "Comment resolution for CID 5119", IEEE P802.11, Wireless LANs, IEEE 802.11-12/0542r1, Mar. 5, 2012.

R. Hedayat et al., "D0.1 Comment Resolution—CIDs on CCA", IEEE P802.11, Wireless LANs, IEEE 8021.11-11/0610r4, May 4, 2011, XP068036303.

Minyoung Park: "IEEE 802.11ac: Dynamic bandwidth channel access", ICC 2011-2011 IEEE International conference on communications—Jun. 5-9, 2011—Kyoto, Japan, IEEE, Piscataway, NJ, USA, Jun. 5, 2011, pp. 1-5, XP031908841.

Steer D G: Wireless operation in the unlicensed personal communications, 1994. Record., 1994 Third annual international conference on San diego, CA, USA Sep. 27-Oct. 1, 1994, New York, NY, USA, IEEE, Sep. 27, 1994, pp. 586-590, XP010131601.

E. Perahia et al., "Delete the PMD (Comment Resolution for D3.0)", IEEE P802.11 Wireless LANs, IEEE 802.11-12/1009r3, Aug. 14, 2012.

Y. Seok, "LB 200 CID 2849 comment resolution", IEEE P802.11 Wireless LANs, IEEE 802.11-12/1234r00, Dec. 18, 2013.

D. Cavalcanti et al., "CBP Updates", IEEE P802.22 Wireless LANs, IEEE802.22-07/0369r1, Jun. 19, 2007.

E. Baik, "TGah D0.1 CCP—Resolution for CID 205,433", IEEE P802.11 Wireless LANs, IEEE 802.11-10/1025r3, Sep. 18, 2013.

\* cited by examiner

METHOD FOR SENSING CHANNEL DYNAMICALLY IN WIRELESS LAN SYSTEM AND APPARATUS THEREFOR

This application is a 35 USC § 371 National Stage entry of International Application No. PCT/KR2014/003940 filed on May 2, 2014, and claims priority to U.S. Provisional Application Nos. 61/818,876 filed on May 2, 2013; 61/874,410 filed on Sep. 6, 2013; 61/887,431 filed on Oct. 6, 2013; 61/889,490 filed on Oct. 10, 2013 and 61/896,006 filed on Oct. 25, 2013, all of which are hereby incorporated by reference in their entireties as if fully set forth herein.

TECHNICAL FIELD

The following description relates to a wireless communication system and, more specifically, to a method and apparatus for dynamically sensing a channel in a wireless LAN system.

BACKGROUND ART

With recent development of information communication technologies, a variety of wireless communication technologies have been developed. From among such technologies, WLAN is a technology that allows wireless Internet access at home, in businesses, or in specific service providing areas using a mobile terminal, such as a personal digital assistant (PDA), a laptop computer, and a portable multimedia player (PMP), based on radio frequency technology.

In order to overcome limited communication speed, which has been pointed out as a weak point of WLAN, technical standards have recently introduced a system capable of increasing the speed and reliability of a network while extending a coverage region of a wireless network. For example, IEEE 802.11n supports high throughput (HT) with a maximum data processing speed of 540 Mbps. In addition, Multiple Input Multiple Output (MIMO) technology, which employs multiple antennas for both a transmitter and a receiver in order to minimize transmission errors and optimize data rate, has been introduced.

DISCLOSURE

Technical Problem

Machine-to-Machine (M2M) communication technology as next-generation communication technology is under discussion. In IEEE 802.11 WLAN systems, IEEE 802.11ah is developed as a technical standard for M2M communication. For M2M communication, it is possible to consider a scenario of occasionally transmitting and receiving a small amount of data at a low rate in an environment in which a large number of devices is present.

An object of the present invention is to provide a new backoff scheme including an operation of determining whether a wireless medium (WM) is busy or idle by applying an appropriate parameter according to situations.

The technical problems solved by the present invention are not limited to the above technical problems and those skilled in the art may understand other technical problems from the following description.

Technical Solution

To accomplish the object of the present invention, there is provided a method for performing clear channel assessment (CCA) by a station (STA) in a wireless LAN system, the method including: receiving, by a physical layer (PHY) of the STA, a request primitive including a parameter indicating a CCA level type from a higher layer; and determining whether a signal equal to or greater than a CCA threshold set based on a value of the parameter is sensed, wherein the parameter is set to a first CCA level type for transmission of a data unit having a channel width equal to or greater than a first channel width, wherein the parameter is set to a second CCA level type for transmission of a data unit having a channel width equal to or greater than a second channel width, wherein the second channel width is wider than the first channel width, wherein a second CCA threshold set for the second CCA level type is higher than a first CCA threshold set for the first CCA level type.

To accomplish the other object of the present invention, there is provided an STA performing CCA in a wireless LAN system, including: a physical layer module; and a higher layer module. The physical layer module may be configured to receive a request primitive including a parameter indicating a CCA level type from a higher layer and to determine whether a signal equal to or greater than a CCA threshold set based on a value of the parameter is sensed. The parameter may be set to a first CCA level type for transmission of a data unit having a channel width equal to or greater than a first channel width. The parameter may be set to a second CCA level type for transmission of a data unit having a channel width equal to or greater than a second channel width. The second channel width may be wider than the first channel width, and a second CCA threshold set for the second CCA level type may be higher than a first CCA threshold set for the first CCA level type.

The following may be applied to embodiments of the present invention.

When the parameter is set to the first CCA level type, a CCA indication primitive including information indicating that a medium is busy may be transmitted from the physical layer to the higher layer when a signal equal to or greater than the first CCA threshold is sensed, and a CCA indication primitive including information indicating that the medium is idle may be transmitted from the physical layer to the higher layer when the signal equal to or greater than the first CCA threshold is not sensed.

When the parameter is set to the second CCA level type, a CCA indication primitive including information indicating that a medium is busy may be transmitted from the physical layer to the higher layer when a signal equal to or greater than the second CCA threshold is sensed, and a CCA indication primitive including information indicating that the medium is idle may be transmitted from the physical layer to the higher layer when the signal equal to or greater than the second CCA threshold is not sensed.

A first backoff process may be performed on a first primary channel having a channel width less than the first channel width using first CCA conditions including the first CCA threshold when the parameter is set to the first CCA level type. A second backoff process may be performed on a second primary channel having a channel width less than the second channel width using second CCA conditions including the second CCA threshold when the parameter is set to the second CCA level type.

A backoff timer value of the first backoff process may be decreased per backoff slot when the first primary channel is idle, and a backoff timer value of the second backoff process may be decreased per backoff slot when the second primary channel is idle.

A data unit having a channel width equal to or greater than the first channel width may be transmitted when a transmission opportunity (TXOP) is permitted as a result of the first backoff process, and a data unit having a channel width equal to or greater than the second channel width may be transmitted when a TXOP is permitted as a result of the second backoff process.

Permission of the TXOP as a result of the first backoff process may include arrival of the backoff timer value of the first backoff process at 0, and permission of the TXOP as a result of the second backoff process may include arrival of the backoff timer value of the second backoff process at 0.

Transmission of the data unit having a channel width equal to or greater than the first channel width may be performed according to idle states of one or more secondary channels when the TXOP is permitted as a result of the first backoff process. Transmission of the data unit having a channel width equal to or greater than the second channel width may be performed according to idle states of one or more secondary channels when the TXOP is permitted as a result of the second backoff process.

When the TXOP is permitted as a result of the second backoff process and the one or more secondary channels are busy, a new backoff process may be performed.

The first CCA threshold may be A dBm and the second CCA threshold may be A+3 dBm.

The first channel width may be W MHz, 2W MHz, 4W MHz or 8W MHz and the second channel width may be 2W MHz, 4W MHz or 8W MHz.

The request primitive may be a PHY-CONFIG.request primitive.

A PHY-CONFIG.confirm primitive may be transmitted from the physical layer to the higher layer in response to a PHY-CONFIG.request primitive.

The data units may be PPDUs (Physical Layer Convergence Protocol (PLCP) Packet Data Units).

It is to be understood that both the foregoing general description and the following detailed description are merely exemplary of the invention, and are intended to provide an overview or framework for understanding the nature and character of the invention as it is claimed.

Advantageous Effects

According to the present invention, it is possible to provide a new backoff method and apparatus including an operation of determining whether a wireless medium (WM) is busy or idle by applying an appropriate parameter.

It will be appreciated by persons skilled in the art that the effects that can be achieved through the present invention are not limited to what has been particularly described hereinabove and other advantages of the present invention will be more clearly understood from the following detailed description.

DESCRIPTION OF DRAWINGS

The accompanying drawings, which are included to provide a further understanding of the present invention, illustrate various embodiments of the present invention and together with the descriptions in this specification serve to explain the principle of the invention.

BEST MODE

Figure 1:
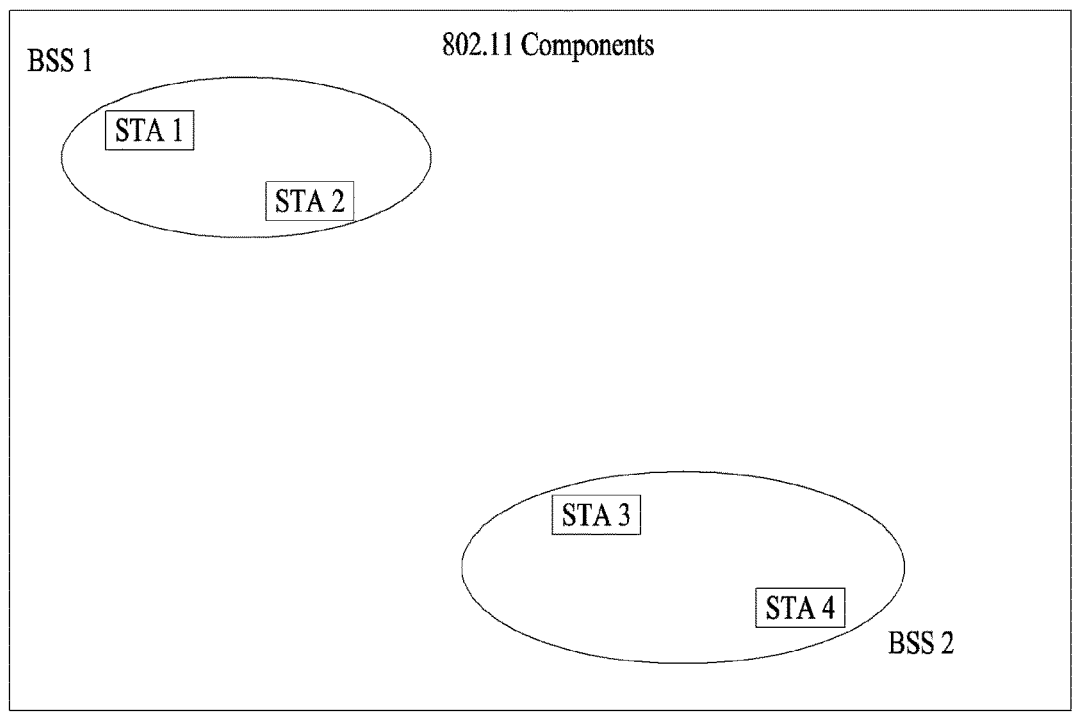
FIG. 1 is a diagram showing an exemplary structure of an IEEE 802.11 system to which the present invention is applicable.

Reference will now be made in detail to exemplary embodiments of the present invention, examples of which are illustrated in the accompanying drawings. The detailed description, which will be given below with reference to the accompanying drawings, is intended to explain exemplary embodiments of the present invention, rather than to present all embodiments that can be implemented according to the invention. The following detailed description includes specific details in order to provide a thorough understanding of the present invention. However, it will be apparent to those skilled in the art that the present invention may be practiced without such specific details.

The embodiments described below are constructed by combining elements and features of the present invention in a predetermined form. The elements or features may be considered selective unless explicitly mentioned otherwise. Each of the elements or features can be implemented without being combined with other elements. In addition, some elements and/or features may be combined to configure an embodiment of the present invention. The sequence of the operations discussed in the embodiments of the present invention may be changed. Some elements or features of one embodiment may also be included in another embodiment, or may be replaced by corresponding elements or features of another embodiment.

Specific terms are employed in the following description for better understanding of the present invention. Such specific terms may take other forms within the technical scope or spirit of the present invention.

In some cases, well-known structures and devices are omitted in order to avoid obscuring the concepts of the present invention and important functions of the structures and devices may be mainly illustrated in the form of block diagrams.

Exemplary embodiments of the present invention are supported by standard documents disclosed for at least one of an Institute of Electrical and Electronics Engineers (IEEE) 802 system, a 3rd Generation Partnership Project (3GPP) system, a 3GPP Long Term Evolution (LTE) system, an LTE-Advanced (LTE-A) system, and a 3GPP2 system, which are wireless access systems. That is, steps or parts which are not described to clearly reveal the technical spirit of the present invention in the embodiments of the present invention may be supported by the above documents. All terminology used herein may be supported by at least one of the aforementioned documents.

The following embodiments of the present invention can be applied to a variety of wireless access technologies such as, for example, CDMA (Code Division Multiple Access), FDMA (Frequency Division Multiple Access), TDMA (Time Division Multiple Access), OFDMA (Orthogonal Frequency Division Multiple Access), and SC-FDMA (Single Carrier Frequency Division Multiple Access). CDMA may be embodied through a radio technology such as UTRA (Universal Terrestrial Radio Access) or CDMA2000. TDMA may be embodied through radio technologies such as GSM (Global System for Mobile communication)/GPRS (General Packet Radio Service)/EDGE (Enhanced Data Rates for GSM Evolution). OFDMA may be embodied through radio technologies such as IEEE 802.11 (Wi-Fi), IEEE 802.16 (WiMAX), IEEE 802.20, and E-UTRA (Evolved UTRA). For clarity, the following description mainly focuses on IEEE 802.11 systems, but technical features of the present invention are not limited thereto.

Structure of WLAN System

FIG. 1 is a diagram showing an exemplary structure of an IEEE 802.11 system to which the present invention is applicable.

The structure of the IEEE 802.11 system may include a plurality of components. A WLAN which supports transparent STA mobility for a higher layer may be provided by interaction between components. A Basic Service Set (BSS) may correspond to a basic component block in an IEEE 802.11 LAN. In FIG. 1, two BSSs (BSS1 and BSS2) are shown and each of the BSSs includes two STAs as members thereof (i.e., STA1 and STA2 are included in BSS1, and STA3 and STA4 are included in BSS2). In FIG. 1, an ellipse indicating each BSS may be understood as a coverage area in which STAs included in the BSS maintain communication. This area may be referred to as a basic service area (BSA). If an STA moves out of the BSA, the STA cannot directly communicate with the other STAs within the BSA.

In the IEEE 802.11 LAN, the most basic type of BSS is an independent BSS (IBSS). For example, the IBSS may have a minimal form consisting of only two STAs. The BSS (BSS1 or BSS2) of FIG. 1, which is the simplest form and in which other components are omitted, may correspond to a typical example of the IBSS. Such configuration is possible when STAs can directly communicate with each other. This type of LAN may be configured when the LAN is necessary, rather than being prescheduled. This network may be referred to as an ad-hoc network.

Memberships of an STA in a BSS may be dynamically changed depending on whether the STA is switched on or off and whether the STA enters or leaves the BSS area. The STA may use a synchronization process to join the BSS to be a member of the BSS. To access all services of a BSS infrastructure, the STA should be associated with the BSS. Such association may be dynamically established and may involve use of a distribution system service (DSS).

Figure 2:
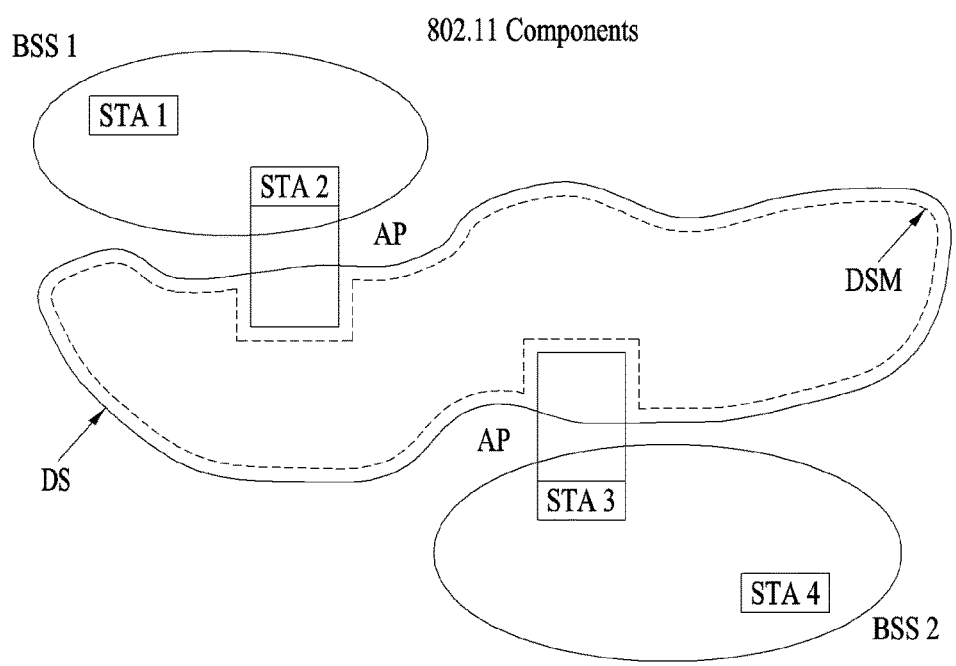
FIG. 2 is a diagram showing another exemplary structure of an IEEE 802.11 system to which the present invention is applicable.

FIG. 2 is a diagram showing another exemplary structure of an IEEE 802.11 system to which the present invention is applicable. In FIG. 2, components such as a distribution system (DS), a distribution system medium (DSM), and an access point (AP) are added to the structure of FIG. 1.

A direct STA-to-STA distance in a LAN may be limited by physical layer (PHY) performance. In some cases, such limited distance may be sufficient for communication. However, in other cases, communication between STAs over a long distance may be necessary. The DS may be configured to support extended coverage.

The DS refers to a structure in which BSSs are connected to each other. Specifically, a BSS may be configured as a component of an extended form of a network including a plurality of BSSs, rather than being independently present as shown in FIG. 1.

The DS is a logical concept and may be specified by the characteristics of the DSM. In this regard, a wireless medium (WM) and the DSM are logically distinguished from each other in IEEE 802.11. Respective logical media are used for different purposes and are used by different components. According to IEEE 802.11, such media are not restricted to either the same or different media. The flexibility of the IEEE 802.11 LAN architecture (DS architecture or other network architectures) can be explained by the fact that plural media are logically different from each other. That is, the IEEE 802.11 LAN architecture can be implemented in various manners and may be independently specified by a physical property of each implementation.

The DS may support mobile devices by providing seamless integration of multiple BSSs and providing logical services necessary for handling an address to a destination.

The AP refers to an entity that enables associated STAs to access the DS through a WM and that has STA functionality. Data may move between the BSS and the DS through the AP. For example, STA2 and STA3 shown in FIG. 2 have STA functionality and provide a function of causing associated STAs (STA1 and STA4) to access the DS. Moreover, since all APs basically correspond to STAs, all APs are addressable entities. An address used by an AP for communication on the WM need not be identical to an address used by the AP for communication on the DSM.

Data transmitted from one of STAs associated with the AP to an STA address of the AP may always be received by an uncontrolled port and may be processed by an IEEE 802.1X port access entity. If the controlled port is authenticated, transmission data (or frames) may be transmitted to the DS.

Figure 3:
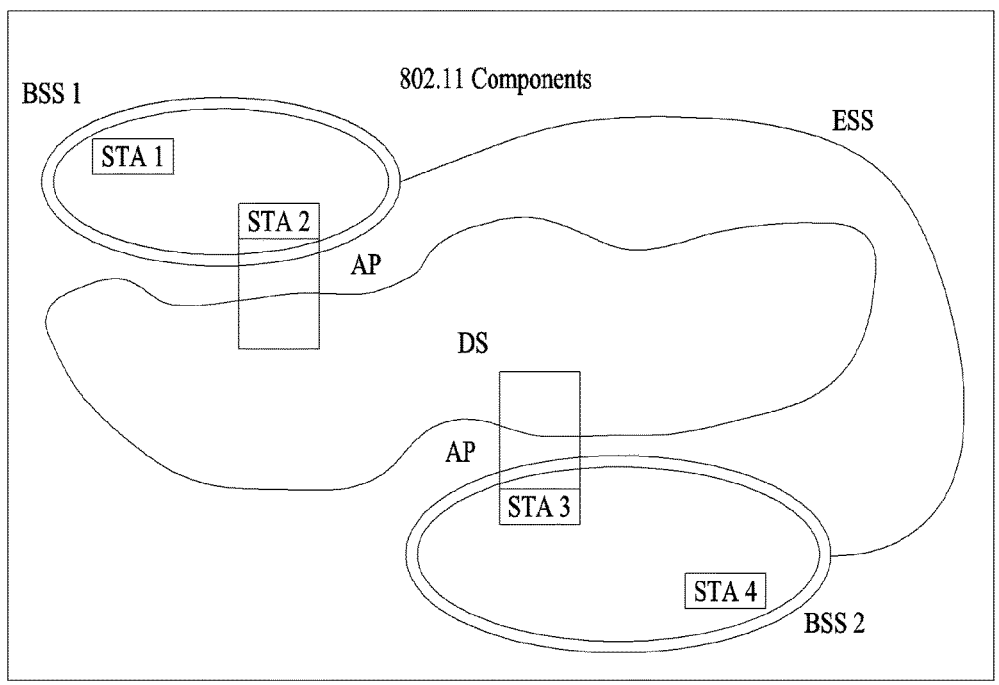
FIG. 3 is a diagram showing still another exemplary structure of an IEEE 802.11 system to which the present invention is applicable.

FIG. 3 is a diagram showing still another exemplary structure of an IEEE 802.11 system to which the present invention is applicable. In addition to the structure of FIG. 2, FIG. 3 conceptually shows an extended service set (ESS) for providing wide coverage.

A wireless network having arbitrary size and complexity may be constructed by a DS and BSSs. In the IEEE 802.11 system, this type of network is referred to as an ESS network. The ESS may correspond to a set of BSSs connected to one DS. However, the ESS does not include the DS. The ESS network is characterized in that the ESS network is viewed as an IBSS network in a logical link control (LLC) layer. STAs included in the ESS may communicate with each other and mobile STAs are movable transparently from one BSS to another BSS (within the same ESS) in LLC.

Regarding relative physical locations of the BSSs in FIG. 3, IEEE 802.11 does not assume any arrangement, and all the following arrangements are possible. BSSs may partially overlap and this positional arrangement is generally used to provide continuous coverage. In addition, the BSSs may not be physically connected, and a distance between BSSs is not logically limited. The BSSs may be located at the same physical position and this positional arrangement may be adopted to provide redundancy. One (or at least one) IBSS or ESS network may be physically present in one space as one (or at least one) ESS network. This may correspond to an ESS network form taken in the case in which an ad-hoc network operates in a location where the ESS network is present, in the case in which IEEE 802.11 networks of different organizations physically overlap, or in the case in which two or more different access and security policies are needed in the same location.

Figure 4:
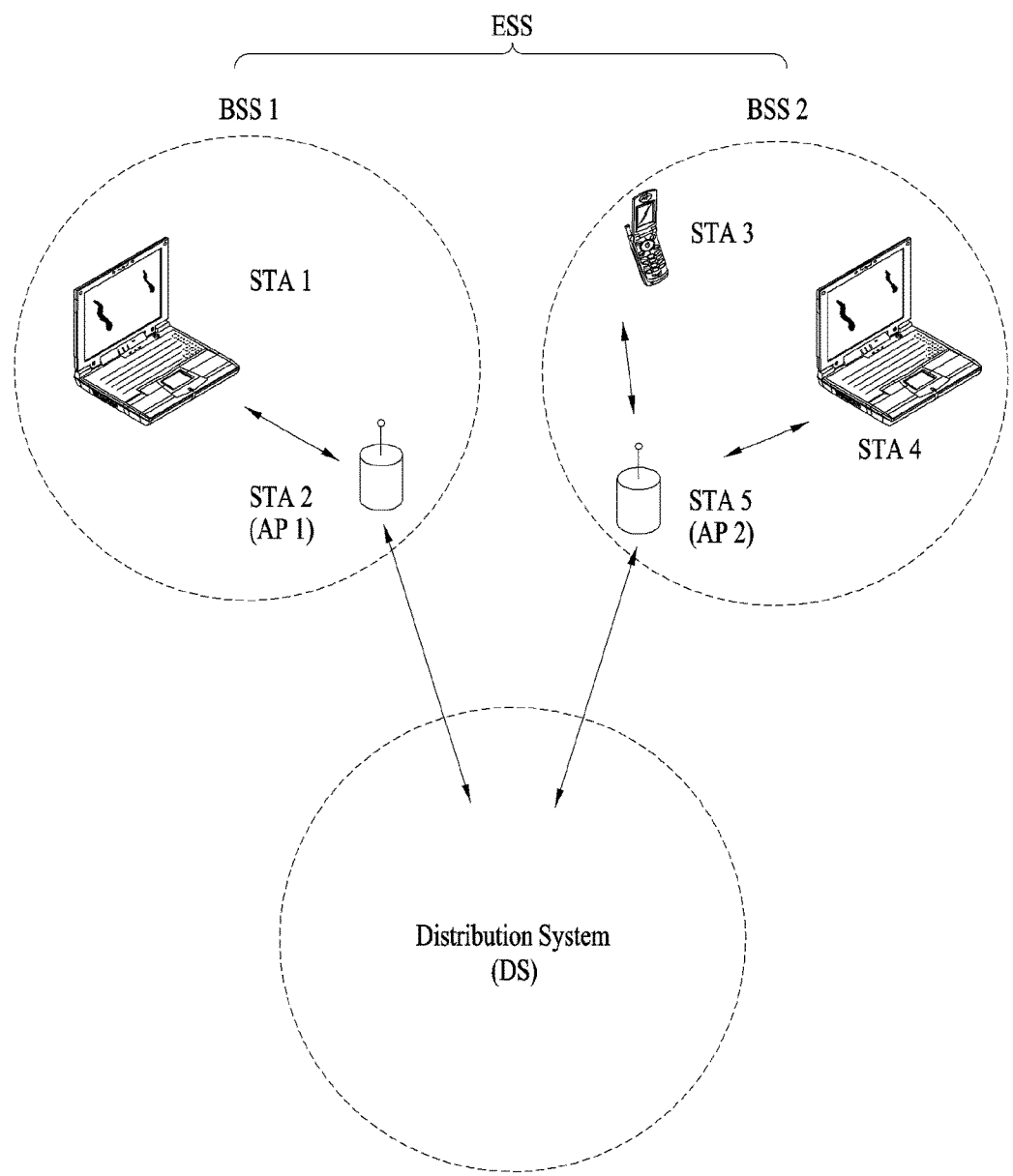
FIG. 4 is a diagram showing an exemplary structure of a WLAN system.

FIG. 4 is a diagram showing an exemplary structure of a WLAN system. FIG. 4 shows an exemplary infrastructure BSS including a DS.

In the example of FIG. 4, BSS1 and BSS2 constitute an ESS. In the WLAN system, an STA is a device operating according to MAC (Medium Access Control)/PHY (Physical) regulation of IEEE 802.11. STAs include AP STAs and non-AP STAs. The non-AP STAs correspond to devices such as laptop computers or mobile phones which are generally handled directly by users. In the example of FIG. 4, STA 1, STA 3, and STA 4 correspond to the non-AP STAs and STA 2 and STA 5 correspond to AP STAs.

In the following description, the non-AP STA may be called a terminal, a wireless transmit/receive unit (WTRU), user equipment (UE), a mobile station (MS), a mobile terminal, or a mobile subscriber station (MSS). The AP is a concept corresponding to a base station (BS), a Node-B, an evolved Node-B (e-NB), a base transceiver system (BTS), or a femto BS in other wireless communication fields.

Layer Structure

Operation of an STA in a wireless LAN system can be described in terms of a layer structure. A layer structure in a device configuration can be implemented by a processor. For example, a processor of an STA device which will be described later may include a plurality of layer modules corresponding to a plurality of layer structures which will be described later. For example, the processor can include a physical (PHY) layer module and a higher layer (e.g., MAC) module. A transceiver of the STA device may be configured to execute all or some functions of the PHY layer from among a plurality of layers which will be described below, and the processor may be configured to execute all or some of (other) functions of the PHY layer and/or all or some functions of an upper layer (e.g. MAC layer) of the PHY layer.

For example, 802.11 standard document mainly describes a MAC sublayer and a physical (PHY) layer on a data link layer (DLL). The PHY layer may include a PLCP (Physical Layer Convergence Procedure) entity, a PMD (Physical Medium Dependent) entity and the like. The MAC sublayer and PHY layer respectively include management entities, which are respectively called an MLME (MAC sublayer Management Entity) and a PLME (Physical Layer Management Entity). These entities provide a layer management service interface through which a layer management function is operated.

To provide accurate MAC operation, an SME (Station Management Entity) is present in each STA. The SME is a layer-independent entity which is present in a separate management plane or can be regarded as off to the side. While functions of the SME are not described in detail in the specification, the SME can be considered to execute functions of collecting layer-dependent statues from various layer management entities (LMEs), setting layer-specific parameters to similar values and the like. The SME can execute such functions on behalf of normal system management entities and implement a standard management protocol, in general.

The aforementioned entities interact in various manners. For example, entities can interact by exchanging GET/SET primitives therebetween. A primitive refers to a set of elements of parameters related to a specific purpose. XX-GET.request primitive is used to request the value of a given MIB attribute (management information based attribute information). XX-GET.confirm primitive is used to return an appropriate MIB attribute information value in the case of a status of "success" and to return an error indication in a status field otherwise. XX-SET.request primitive is used to request an indicated MIB attributed to be set to a given value. When the MIB attribute refers to a specific operation, this represents request for execution of the operation. XX-SET.confirm primitive is used to confirm that an indicated MIB attribute has been set to a requested value in the case of a status of "success" and to return an error condition in the status field otherwise. When the MIB attribute refers to a specific operation, this confirms that the corresponding operation has been performed.

In addition, the MLME and the SME can exchange various MLME_GET/SET primitives through an MLME_SAP (Service Access Point) therebetween. Furthermore, various PLME_GET/SET primitives can be exchanged between the PLME and the SME through a PLME_SAP and between the MLME and the PLME through an MLME-PLME_SAP.

Link Setup Process

Figure 5:
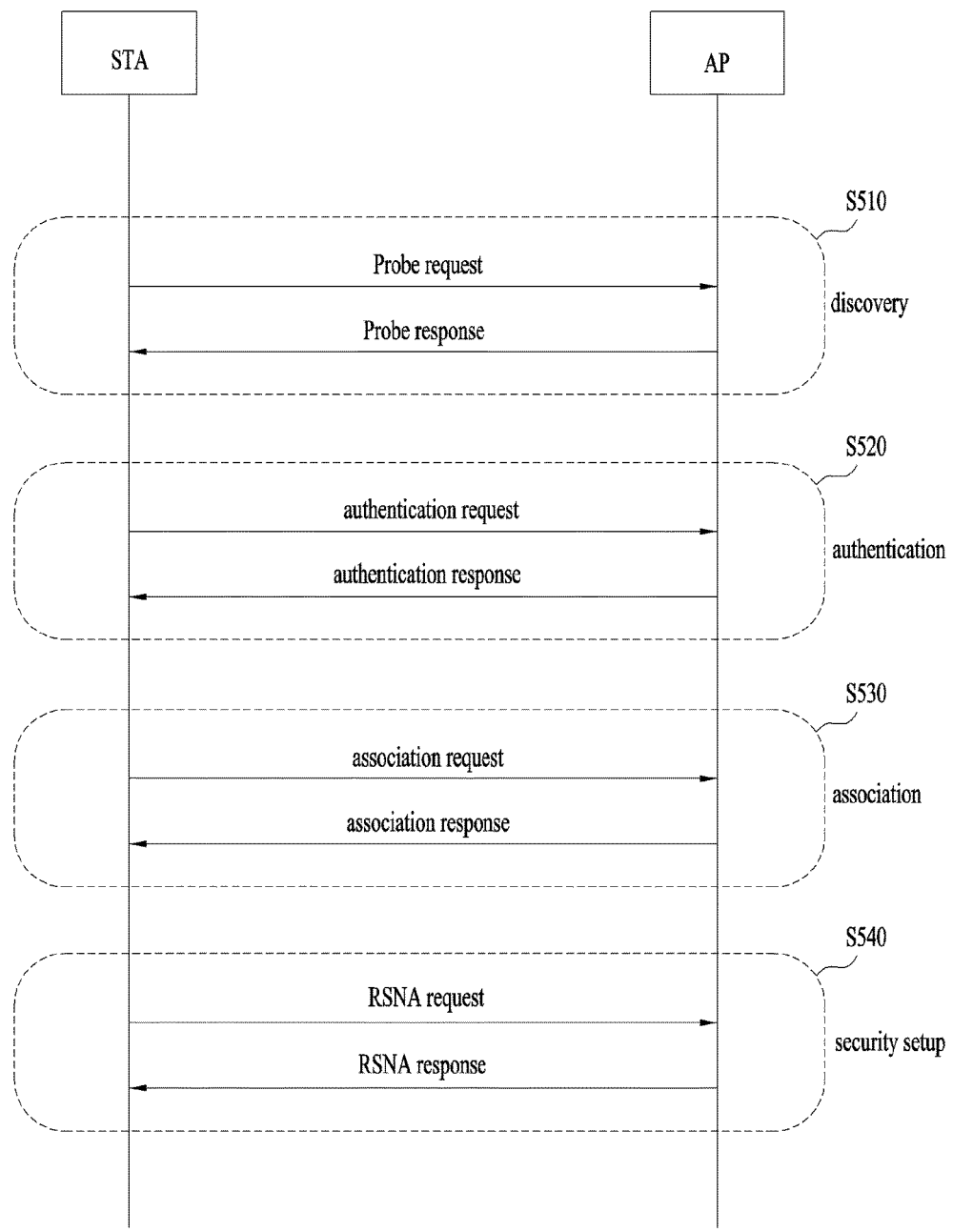
FIG. 5 illustrates a link setup process in a WLAN system.

FIG. 5 illustrates a general link setup process.

To set up a link with respect to the network and transmit/receive data over the network, the STA should perform network discovery and authentication, establish association, and perform an authentication procedure for security. The link setup process may also be referred to as a session initiation process or a session setup process. In addition, the discovery, authentication, association, and security setup steps in the link setup process may be collectively called an association step in a general sense.

Hereinafter, an exemplary link setup process will be described with reference to FIG. 5.

In step S510, an STA may perform the network discovery operation. The network discovery operation may include a scanning operation of the STA. That is, the STA needs to search for an available network so as to access the network. The STA needs to identify a compatible network before participating in a wireless network. Herein, the process of identifying a network contained in a specific region is referred to as scanning.

The scanning operation is classified into active scanning and passive scanning.

FIG. 5 exemplarily shows the network discovery operation including the active scanning process. In the case of active scanning, an STA configured to perform scanning transmits a probe request frame and waits for a response to the probe request frame, in order to move between channels and search for nearby APs. A responder transmits a probe response frame to the STA having transmitted the probe request frame, in response to the probe request frame. Herein, the responder may be the last STA that has transmitted a beacon frame in a BSS of the scanned channel. In the BSS, the AP transmits a beacon frame, and thus the AP serves as the responder. In the IBSS, STAs within the IBSS transmit a beacon frame in rotation, and thus the responder is not fixed. For example, the STA that has transmitted the probe request frame on Channel #1 and has received the probe response frame on Channel #1 may store BSS-related information that is contained in the received probe response frame and move to the next channel (for example, Channel #2) to perform scanning (i.e., transmission/reception of a probe request/response on Channel #2) in the same manner.

Although not shown in FIG. 5, scanning may be carried out in the passive scanning manner. In performing the passive scanning operation, an STA to perform scanning waits for a beacon frame while moving from one channel to another. The beacon frame, which is one of the management frames in IEEE 802.11, is periodically transmitted to inform of presence of a wireless network and to allow the STA performing scanning to find a wireless network and participate in the wireless network. In a BSS, the AP periodically transmits the beacon frame. In an IBSS, STAs of the IBSS transmit the beacon frame in rotation. When an STA performing scanning receives a beacon frame, the STA stores information about the BSS contained in the beacon frame and moves to the next channel. In this manner, the STA records beacon frame information received on each channel. The STA having received a beacon frame stores BSS-related information contained in the received beacon frame, and then moves to the next channel and performs scanning in the same manner.

In comparison between active scanning and passive scanning, active scanning is more advantageous than passive scanning in terms of delay and power consumption.

After the STA discovers the network, the STA may perform authentication in step S520. This authentication process may be referred to as first authentication, which is clearly distinguished from the security setup operation of step S540, which will be described later.

The authentication process may include transmitting, by the STA, an authentication request frame to an AP and transmitting, by the AP, an authentication response frame to the STA in response to the authentication request frame. The authentication frame used in transmitting an authentication request/response may correspond to a management frame.

The authentication frame may contain information about an authentication algorithm number, an authentication transaction sequence number, a status code, a challenge text, a robust security network (RSN), a finite cyclic group, etc. This information, which is an example of information that may be contained in the authentication request/response frame, may be replaced with other information, or include additional information.

The STA may transmit an authentication request frame to the AP. The AP may determine whether to authenticate the STA on the basis of the information contained in the received authentication request frame. The AP may provide an authentication result to the STA through the authentication response frame.

After the STA is successfully authenticated, the association process may be conducted in step S530. The association process may include the steps of transmitting, by the STA, an association request frame to the AP and transmitting, by the AP, an association response frame to the STA in response.

For example, the association request frame may include information related to various capabilities, a beacon listening interval, a service set identifier (SSID), supported rates, supported channels, RSN, mobility domain, supported operating classes, a traffic indication map (TIM) broadcast request, an interworking service capability, etc.

For example, the association response frame may include information related to various capabilities, a status code, an association ID (AID), supported rates, an enhanced distributed channel access (EDCA) parameter set, a received channel power indicator (RCPI), a received signal to noise indicator (RSNI), mobility domain, a timeout interval (association comeback time), an overlapping BSS scan parameter, a TIM broadcast response, a QoS map, etc.

The aforementioned information, which corresponds to some parts of information which can be contained in the association request/response frame, may be replaced with other information or include additional information.

After the STA is successfully associated with the network, the security setup process may be performed in step S540. The security setup process of step S540 may be referred to as an authentication process based on a robust security network association (RSNA) request/response. The authentication process of step S520 may be referred to as a first authentication process, and the security setup process of step S540 may be simply referred to as an authentication process.

The security setup process of step S540 may include, for example, a process of performing private key setup based on 4-way handshaking through an extensible authentication protocol over LAN (EAPOL) frame. In addition, the security setup process may be performed using another security scheme that is not defined in IEEE 802.11 standards.

Evolution of WLAN

IEEE 802.11 WLAN standards provide a transmission rate of 11 Mbps (IEEE 802.11b) or 54 Mbps (IEEE 802.11a) using an unlicensed band at 2.4 GHz or 5 GHz. IEEE 802.11g provides a transmission rate of 54 Mbps using OFDM at 2.4 GHz.

In order to overcome a limit in WLAN communication speed, IEEE 802.11n has recently been established as a communication standard. IEEE 802.11n aims to increase network speed and reliability as well as to extend wireless network coverage. More specifically, IEEE 802.11n supports a high throughput (HT) of a maximum data processing speed of 540 Mbps, and is based on multiple input multiple output (MIMO) technology in which multiple antennas are used at both a transmitter and a receiver. That is, IEEE 802.11n provides a transmission rate of 300 Mbps for 4 spatial streams using MIMO-OFDM. IEEE 802.11n supports up to 40 MHz as a channel bandwidth. In this case, a transmission rate of 600 Mbps is provided.

With widespread use of WLAN technology and diversification of WLAN applications, there has been a need for development of a new WLAN system capable of supporting higher throughput than a data processing speed supported by IEEE 802.11n. The next generation WLAN system for supporting very high throughput (VHT) is the next version (for example, IEEE 802.11ac) of the IEEE 802.11n WLAN system, and is one of IEEE 802.11 WLAN systems recently proposed to support a data processing speed greater than or equal to 1 Gbps at a MAC service access point (MAC SAP). To this end, VHT systems provide a channel bandwidth of 80 MHz or 160 MHz and up to 8 spatial streams. When a channel bandwidth of 160 MHz, 8 spatial streams, 256 QAM (Quadrature Amplitude Modulation) and a short guard interval (short GI) are all implemented, a transmission rate of up to 6.9 Gbps is provided.

In order to efficiently utilize a radio frequency channel, the next generation WLAN system supports a Multi User Multiple Input Multiple Output (MU-MIMO) transmission scheme in which a plurality of STAs can simultaneously access a channel. In accordance with the MU-MIMO transmission scheme, the AP may simultaneously transmit packets to at least one MIMO-paired STA.

In addition, a technology for supporting WLAN system operations in whitespace is under discussion. For example, a technology for introducing the WLAN system in TV whitespace (TV WS) such as a frequency band (e.g., a band between 54 MHz and 698 MHz) left idle due to transition from analog TV to digital TV has been discussed under the IEEE 802.11af standard. However, this is simply illustrative, and the whitespace may be viewed as a licensed band which is primarily usable by a licensed user. The licensed user means a user who has permission to use the licensed band, and may also be referred to as a licensed device, a primary user, an incumbent user, or the like.

For example, an AP and/or STA operating in the whitespace (WS) should provide a function of protecting the licensed user. For example, in the case in which a licensed user such as a microphone is already using a specific WS channel which is in a frequency band divided according to a regulation to have a specific bandwidth in the WS band, the AP and/or STA are not allowed to use the frequency band corresponding to the WS channel in order to protect the licensed user. In addition, the AP and/or STA should stop using a frequency band for transmission and/or reception of a current frame when the licensed user uses this frequency band.

Accordingly, the AP and/or STA need to pre-check whether use of a specific frequency band within the WS band is possible, namely whether a licensed user is in the frequency band. Checking whether a licensed user is in the specific frequency band is referred to as spectrum sensing. An energy detection scheme, a signature detection scheme and the like are utilized as the spectrum sensing mechanisms. The AP and/or STA may determine that a licensed user is using the specific frequency band if the intensity of a received signal exceeds a predetermined value, or when a DTV preamble is detected.

Machine-to-machine (M2M) communication technology has been discussed as a next generation communication technology. Technical standard IEEE 802.11 ah to support M2M communication in the IEEE 802.11 WLAN system is also under development. M2M communication, which represents a communication scheme involving one or more machines, may also be referred to as machine type communication (MTC) or machine-to-machine (M2M) communication. Herein, the machine may represent an entity that does not require direct manipulation from or intervention of a user. For example, not only a meter or vending machine equipped with a wireless communication module, but also user equipment such as a smartphone which is capable of performing communication by automatically accessing the network without manipulation/intervention by the user may be an example of the machines. M2M communication may include device-to-device (D2D) communication and communication between a device and an application server. As examples of communication between a device and an application server, there may be communication between a vending machine and an application server, communication between a Point of Sale (POS) device and an application server, and communication between an electric meter, a gas meter or a water meter and an application server. M2M communication-based applications may include security, transportation and healthcare applications. Considering the characteristics of the aforementioned application examples, M2M communication needs to support occasional transmission/reception of a small amount of data at a low speed in an environment including a large number of devices.

Specifically, M2M communication needs to support a large number of STAs. While the current WLAN system assumes that one AP is associated with up to 2007 STAs, various methods to support other cases in which many more STAs (e.g., about 6000 STAs) are associated with one AP have been discussed regarding M2M communication. In addition, it is expected that there will be many applications to support/require a low transfer rate in M2M communication. In order to smoothly support many STAs, an STA in the WLAN system may recognize presence or absence of data to be transmitted thereto on the basis of a traffic indication map (TIM), and several methods to reduce the bitmap size of the TIM have been under discussion. In addition, it is expected that there will be much traffic data having a very long transmission/reception interval in M2M communication. For example, in M2M communication, a very small amount of data such as electric/gas/water metering is required to be transmitted and received at long intervals (for example, every month). Accordingly, methods have been discussed to efficiently support the case in which a very small number of STAs have a data frame to receive from the AP during one beacon period while the number of STAs to be associated with one AP increases in the WLAN system.

As described above, WLAN technology is rapidly evolving, and not only the aforementioned exemplary techniques but also other techniques for direct link setup, improvement of media streaming throughput, support of high-speed and/or large-scale initial session setup, and support of an extended bandwidth and operation frequency are under development.

Medium Access Mechanism

In the IEEE 802.11-based WLAN system, a basic access mechanism of medium access control (MAC) is a Carrier Sense Multiple Access with Collision Avoidance (CSMA/CA) mechanism. The CSMA/CA mechanism, which is also called a Distributed Coordination Function (DCF) of IEEE 802.11 MAC, basically employs a "listen before talk" access mechanism. In accordance with this access mechanism, the AP and/or STA may perform Clear Channel Assessment (CCA) of sensing a radio frequency channel or medium in a predetermined time interval (e.g., DCF Inter-Frame Space (DIFS)), prior to data transmission. When it is determined in the sensing that the medium is in the idle state, frame transmission begins through the medium. On the other hand, when it is sensed that the medium is in the occupied state, the AP and/or STA does not start transmission, but establishes a delay time (e.g., a random backoff period) for medium access, and attempts to perform frame transmission after waiting during the period. Through application of a random backoff period, it is expected that multiple STAs will attempt to start frame transmission after waiting for different times, resulting in minimized collision.

In addition, the IEEE 802.11 MAC protocol provides a hybrid coordination function (HCF). HCF is based on the DCF and the point coordination function (PCF). PCF refers to a polling-based synchronous access scheme in which polling is periodically executed to allow all reception APs and/or STAs to receive a data frame. In addition, the HCF includes enhanced distributed channel access (EDCA) and HCF controlled channel access (HCCA). EDCA is achieved when the access scheme provided to multiple users by a provider is based on contention. HCCA is achieved in the contention-free channel access scheme which employs the polling mechanism. In addition, the HCF includes a medium access mechanism for improving Quality of Service (QoS) of the WLAN, and may transmit QoS data during both the contention period (CP) and the contention free period (CFP).

Figure 6:
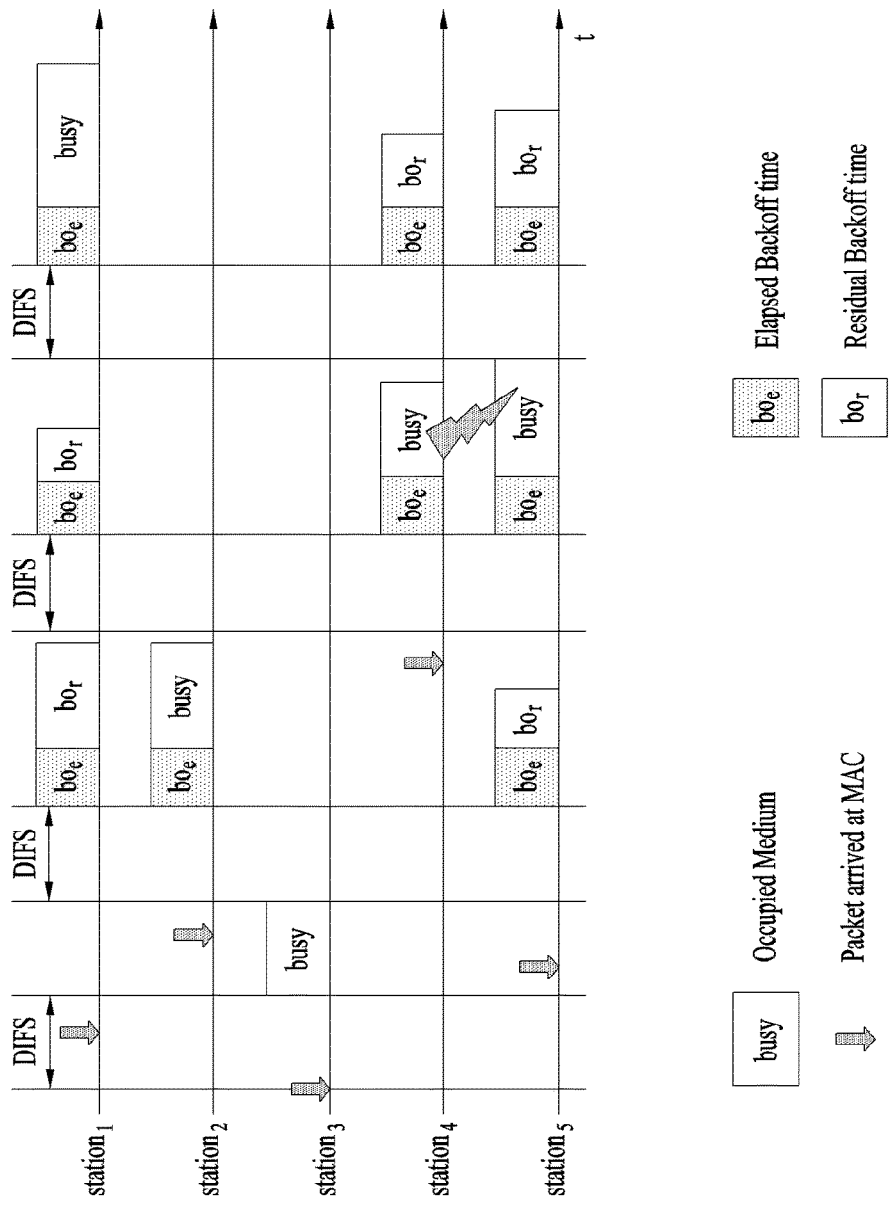
FIG. 6 illustrates a backoff process.

FIG. 6 illustrates a backoff process.

Hereinafter, operations based on a random backoff period will be described with reference to FIG. 6. If the medium is switched from the occupied or busy state to the idle state, several STAs may attempt to transmit data (or frames). In a method to minimize collisions, each STA selects a random backoff count, waits for a slot time corresponding to the selected backoff count, and then attempts to start transmission. The random backoff count has a value of a pseudo-random integer, and may be set to a value in a range between 0 and CW. Herein, CW is a contention window parameter value. Although the CW parameter is given CWmin as the initial value, the initial value may be doubled if transmission fails (for example, if ACK of the transmission frame is not received). If the CW parameter value is CWmax, CWmax is maintained until data transmission is successful, and at the same time data transmission may be attempted. If data transmission is successful, the CW parameter value is reset to CWmin. Preferably, the values of CW, CWmin, and CWmax are set to 2n−1 (where n=−0, 1, 2, . . . ).

Once the random backoff process begins, the STA continuously monitors the medium while counting down the backoff slot according to a determined backoff count value. If the medium is monitored as being in the occupied state, the STA stops the countdown and waits for a predetermined time. If the medium is in the idle state, the remaining countdown resumes.

In the example shown in FIG. 6, if a packet for STA3 to transmit reaches MAC of STA3, the STA3 may confirm that the medium is in the idle state in the DIFS and immediately transmit a frame. In the meantime, the other STAs monitor the busy state of the medium, and operate in the standby mode. During operation of STA3, each of STA1, STA2, and STA5 may have data to be transmitted. If the idle state of the medium is monitored, each of STA1, STA2, and STA5 waits for the DIFS time and then performs countdown of the backoff slot according to a random backoff count value which they have selected. In the example shown in FIG. 6, STA2 selects the lowest backoff count value and STA1 selects the highest backoff count value. That is, when the STA2 starts data transmission after completing backoff counting, the residual backoff time of STA5 is shorter than the residual backoff time of STA1. Each of STA1 and STA5 temporarily stops countdown and waits while STA2 occupies the medium. When occupancy by the STA2 is terminated and the medium returns to the idle state, each of STA1 and STA5 waits for a predetermined DIFS time, and restarts backoff counting. That is, after the residual backoff slot as long as the residual backoff time is counted down, frame transmission may start. Since the residual backoff time of STA5 is shorter than that of STA1, STA5 starts frame transmission. Meanwhile, STA4 may be given data to be transmitted while STA2 occupies the medium. In this case, when the medium is in the idle state, STA4 may wait for the DIFS time, perform countdown according to the random backoff count value selected by the STA4, and then start frame transmission. FIG. 6 exemplarily illustrates a case in which the residual backoff time of STA5 is equal to the random backoff count value of STA4 by chance. In this case, collision may occur between STA4 and STA5. If collision occurs between STA4 and STA5, neither STA4 nor STA5 receives ACK, and accordingly data transmission fails. In this case, each of STA4 and STA5 may double the CW value, select a random backoff count value and then perform countdown. Meanwhile, STA1 waits while the medium is in the occupied state due to transmission operation by STA4 and STA5. In this case, when the medium returns to the idle state, STA waits for the DIFS time, and then starts frame transmission after lapse of the residual backoff time.

Sensing Operation of STA

As described above, the CSMA/CA mechanism includes not only physical carrier sensing through which the AP and/or STA directly sense the medium, but also virtual carrier sensing. The virtual carrier sensing is performed to address some problems (such as a hidden node problem) encountered in medium access. In the virtual carrier sensing, MAC of the WLAN system may use a network allocation vector (NAV). By means of the NAV value, the AP and/or STA which is using the medium or has authority to use the medium indicates, for another AP and/or another STA, the remaining time before a time at which the medium becomes available. Accordingly, the NAV value may correspond to a reserved period during which the medium is used by the AP and/or STA to transmit a frame. An STA having received the NAV value may be prohibited from accessing the medium during the corresponding period. For example, NAV may be set according to the value of the duration field in the MAC header of a frame.

A robust collision detection mechanism has been introduced to reduce the probability of such collision. Hereinafter, this mechanism will be described with reference to FIGS. 7 and 8. The actual carrier sensing range may not be identical to the transmission range, but for simplicity of description, it will be assumed that the actual carrier sensing range is identical to the transmission range.

Figure 7:
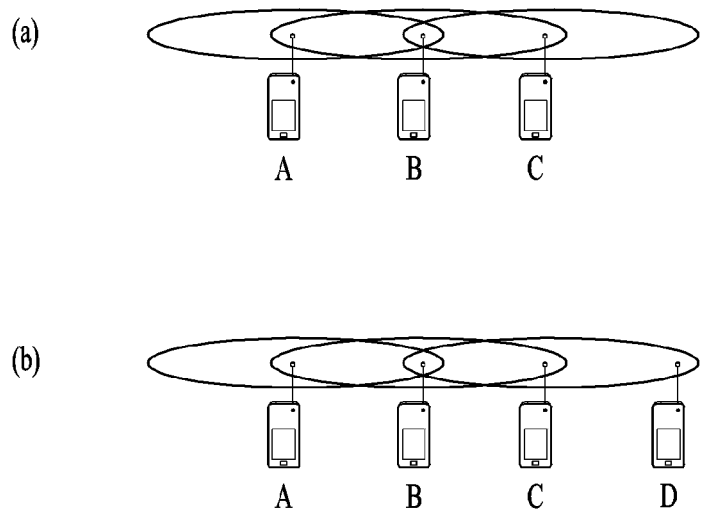
FIG. 7 illustrates a hidden node and an exposed node.

FIG. 7 illustrates a hidden node and an exposed node.

FIG. 7(a) exemplarily shows a hidden node. In FIG. 7(a), STA A communicates with STA B, and STA C has information to be transmitted. Specifically, when STA C performs carrier sensing prior to transmission of data to STA B, STA C may determine that the medium is in the idle state even in a situation in which STA A is transmitting information to STA B. This is because transmission by STA A (i.e., occupied medium) may not be sensed at the location of STA C. In this case, collision may occur since STA B receives information of STA A and information of STA C simultaneously. In this case, STA A may be considered a hidden node of STA C.

FIG. 7(b) exemplarily shows an exposed node. In FIG. 13(b), STA C has information to be transmitted to STA D in a situation in which STA B is transmitting data to STA A. In this case, STA C may perform carrier sensing and determine that the medium is occupied due to transmission of STA B.

Therefore, although STA C has information to be transmitted to STA D, STA C should wait until the medium switches back to the idle state since the occupied state of the medium is sensed. However, since STA A is actually located out of the transmission range of STA C, transmission from STA C may not collide with transmission from STA B in view of STA A, and STA C unnecessarily waits until STA B stops transmission. In this case, STA C may be viewed as an exposed node of STA B.

Figure 8:
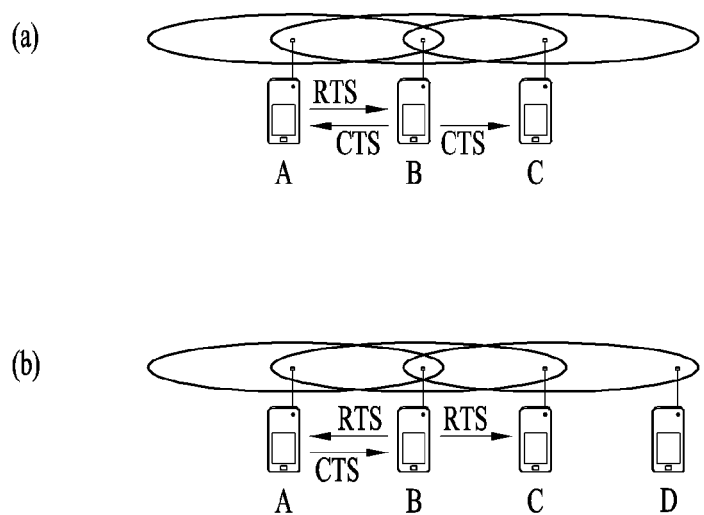
FIG. 8 illustrates RTS and CTS.

FIG. 8 illustrates RTS and CTS.

In order to efficiently use the collision avoidance mechanism in an exemplary situation as shown in FIG. 7, short-signaling packets such as RTS (request to send) and CTS (clear to send) may be used. RTS/CTS between two STAs may be overheard by nearby STA(s), such that the nearby STA(s) may consider whether information is communicated between the two STAs. For example, if an STA to transmit data transmits an RTS frame to another STA that is to receive data, the STA to receive data may transmit a CTS frame to nearby STAs, thereby informing the nearby STAs that the STA is about to receive data.

FIG. 8(a) exemplarily shows a method to solve the hidden node problem. The method assumes a situation in which both STA A and STA C attempt to transmit data to STA B. If STA A transmits RTS to STA B, STA B transmits CTS to both STA A and STA C located around STA B. As a result, STA C waits until STA A and STA B stop data transmission, and thus collision is avoided.

FIG. 8(b) exemplarily shows a method to solve the exposed node problem. STA C may overhear RTS/CTS transmission between STA A and STA B, thereby determining that no collision will occur when it transmits data to another STA (e.g., STA D). That is, STA B may transmit RTS to all the nearby STAs, and transmits CTS only to STA A which actually has data to transmit. Since STA C receives only the RTS, but fails to receive the CTS of STA A, STA C may recognize that STA A is located out of the carrier sensing range of STA C.

Power Management

As described above, STAs in the WLAN system should perform channel sensing before they perform transmission/reception operation. Persistently performing channel sensing causes persistent power consumption of the STA. There is not much difference in power consumption between the reception state and the transmission state, and continuous maintenance of the reception state may cause large load to STAs which are provided with limited power (i.e., operated by a battery). Therefore, if an STA maintains the reception standby mode so as to persistently sense the channel, power is inefficiently consumed without special advantages in terms of WLAN throughput. To address this problem, the WLAN system supports a power management (PM) mode of the STA.

The PM mode of the STA is classified into an active mode and a power save (PS) mode. The STA is basically operated in the active mode. The STA operating in the active mode maintains an awake state. When the STA is in the awake state, the STA may normally perform frame transmission/reception, channel scanning, or the like. On the other hand, the STA in the PS mode operates by switching between the sleep state (or doze state) and the awake state. The STA in the sleep state operates with minimum power and performs neither frame transmission/reception nor channel scanning.

As the time for which the STA operates in the sleep state increases, power consumption of the STA is reduced, and accordingly the STA operation duration increases. However, since transmission or reception of the frame is not allowed in the sleep state, the STA cannot unconditionally operate in the sleep state for a long time. When the STA operating in the sleep state has a frame to transmit to the AP, it may be switched to the awake state to transmit/receive the frame. On the other hand, when the AP has a frame to transmit to the STA which is in the sleep state, the STA cannot receive the frame nor recognize the presence of the frame. Accordingly, in order to recognize presence or absence of a frame to be transmitted to the STA (or in order to receive the frame if the frame is present), the STA may need to switch to the awake state according to specific periodicity.

Figure 9:
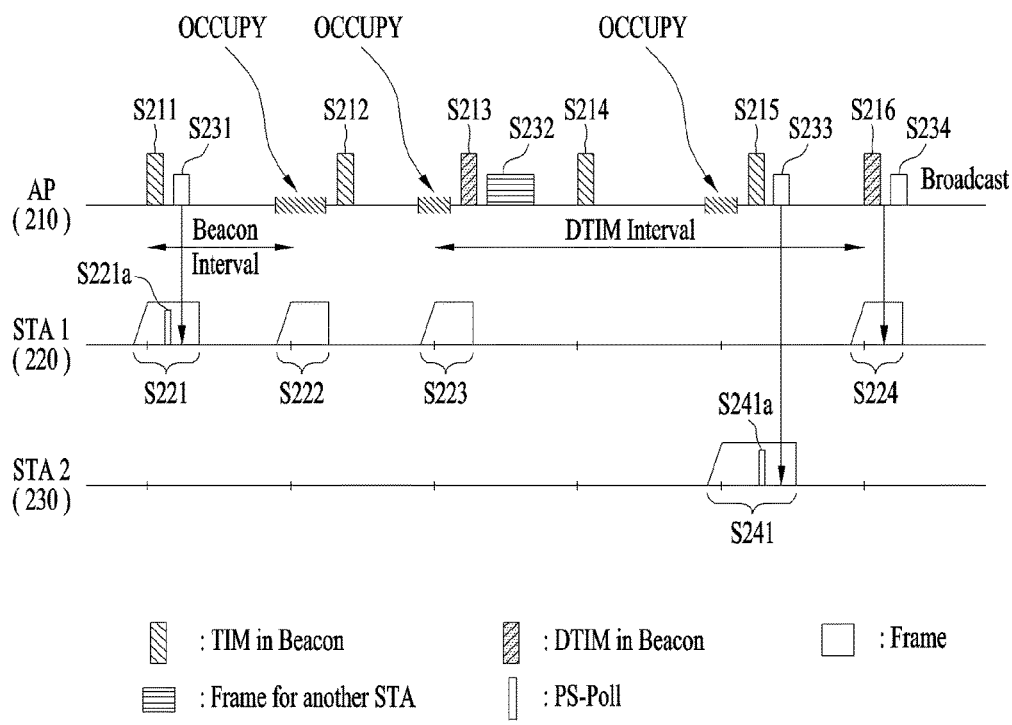
FIG. 9 illustrates a power management operation.

FIG. 9 illustrates a power management operation.

Referring to FIG. 9, AP 210 transmits a beacon frame to STAs present in the BSS at predetermined time intervals (S211, S212, S213, S214, S215 and S216). The beacon frame includes a traffic indication map (TIM) information element. The TIM information element contains information indicating that the AP 210 has buffered traffic for the STAs associated with the AP 210 and that a frame will be transmitted. The TIM element includes a TIM used to inform of a unicast frame and a delivery traffic indication map (DTIM) used to inform of a multicast or broadcast frame.

AP 210 may transmit a DTIM once per three transmissions of the beacon frame. STA 220 and STA2 222 are STAs operating in the PS mode. Each of STA 220 and STA2 222 may be switched from the sleep state to the awake state at every wakeup interval of a predetermined period to receive the TIM element transmitted by the AP 210. Each STA may calculate a switching time to switch to the awake state, based on its own local clock. In the example shown in FIG. 15, it is assumed that the clock of the STA coincides with that of the AP.

For example, the predetermined wakeup interval may be set in such a manner that STA1 220 can switch to the awake state at every beacon interval to receive the TIM element. Accordingly, when AP 210 transmits the beacon frame for the first time (S211), STA1 220 may switch to the awake state (S221). Thereby, STA1 220 may receive the beacon frame and acquire the TIM element. If the acquired TIM element indicates that there is a frame to be transmitted to STA1 220, STA1 220 may transmit a power save (PS)-Poll frame, which requests transmission of the frame, to the AP 210 (S221a). In response to the PS-Poll frame, the AP 210 may transmit the frame to STA 1 220 (S231). After completing reception of the frame, STA1 220 is switched back to the sleep state and operates in the sleep state.

When the AP 210 transmits the beacon frame for the second time, the medium is in the busy state in which the medium is accessed by another device, and accordingly the AP 210 may not transmit the beacon frame at the correct beacon interval, but may transmit the beacon frame at a delayed time (S212). In this case, STA1 220 is switched to the awake state in accordance with the beacon interval, but does not receive the beacon frame whose transmission is delayed, and is thus switched back to the sleep state (S222).

When the AP 210 thirdly transmits the beacon frame, the beacon frame may include a TIM element set to a DTIM. However, since the medium is in the busy state, the AP 210 transmits the beacon frame at a delayed time (S213). STA1 220 may be switched to the awake state in accordance with the beacon interval and acquire the DTIM through the beacon frame transmitted by the AP 210. It is assumed that the DTIM acquired by STA1 220 indicates that there is no frame to be transmitted to STA1 220, but there is a frame for another STA. In this case, STA1 220 may confirm that there is no frame to receive and switch back to the sleep state to operate in the sleep state. After transmission of the beacon frame, the AP 210 transmits the frame to the corresponding STA (S232).

The AP 210 fourthly transmits the beacon frame (S214). STA1 220 may adjust the wakeup interval for reception of the TIM element since it has failed to acquire information indicating presence of buffered traffic for STA1 220 through the previous two operations of reception of the TIM element. Alternatively, provided that signaling information for adjustment of the value of the wakeup interval of STA1 220 is contained in the beacon frame transmitted by the AP 210, the wakeup interval value of the STA1 220 may be adjusted. In this example, STA1 220 may be set to be switched to the awake state once at every three beacon intervals to receive a TIM element, rather than being set to be switched between the operating states at every beacon interval. Therefore, when the AP 210 fifthly transmits the beacon frame (S215) after the fourth transmission of the beacon frame (S214), STA1 220 remains in the sleep state, and thus cannot acquire the corresponding TIM element.

When AP 210 sixthly transmits the beacon frame (S216), STA1 220 may be switched to the awake state and acquire the TIM element contained in the beacon frame (S224). Since the TIM element is a DTIM indicating presence of a broadcast frame, STA1 220 may receive the broadcast frame transmitted by the AP 210 without transmitting a PS-Poll frame to the AP 210 (S234). In the meantime, the wakeup interval set for STA2 230 may have a longer period than the wakeup interval of STA1 220. Accordingly, STA2 230 is switched to the awake state at a time point (S215) when the AP 210 fifthly transmits the beacon frame, such that the STA2 230 may receive the TIM element (S241). STA2 230 may recognize presence of a frame to be transmitted thereto through the TIM element and transmit the PS-Poll frame to the AP 210 in order to request frame transmission (S241a). The AP 210 may transmit a frame to STA2 230 in response to the PS-Poll frame (S233).

In order to operate/manage the PS mode as shown in FIG. 9, the TIM element includes a TIM indicating presence or absence of a frame to be transmitted to the STA or a DTIM indicating presence or absence of a broadcast/multicast frame. The DTIM may be implemented through field setting for the TIM element.

Figure 10:
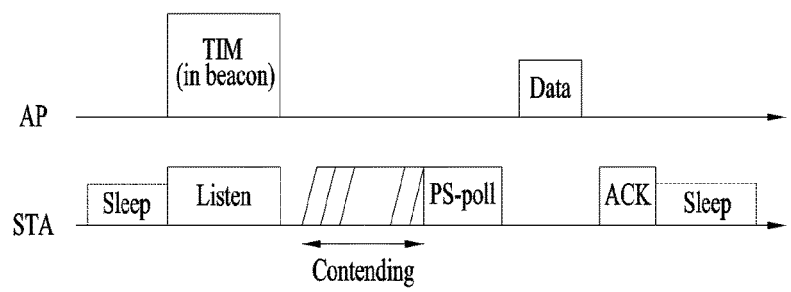
FIGS. 10 to 12 illustrate operations of a station (STA) having received a TIM in detail.
Figure 11:
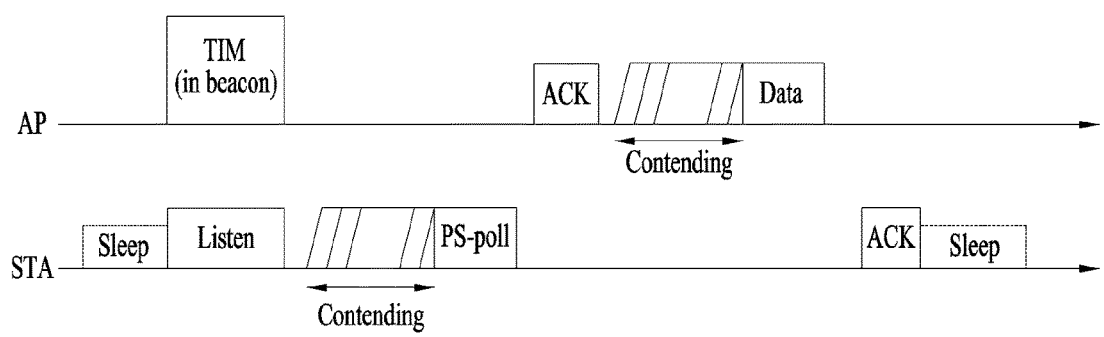
Figure 12:
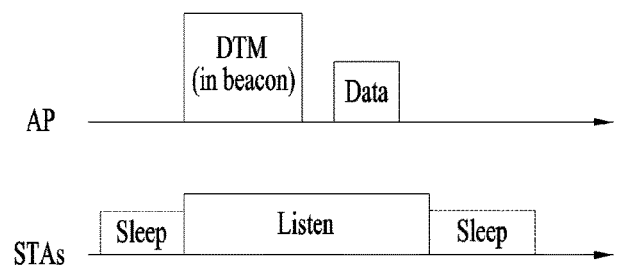

FIGS. 10 to 12 illustrate operations of an STA having received a TIM in detail.

Referring to FIG. 10, an STA is switched from the sleep state to the awake state to receive the beacon frame including a TIM from the AP. The STA may recognize presence of buffered traffic to be transmitted thereto by interpreting the received TIM element. After the STA contends with other STAs to access the medium for PS-Poll frame transmission, the STA may transmit a PS-Poll frame to the AP to request data frame transmission. The AP, upon receiving the PS-Poll frame transmitted from the STA, may transmit a data frame to the STA. The STA may receive the data frame and transmit an ACK frame to the AP in response to the received data frame. Thereafter, the STA may switch back to the sleep state.

As shown in FIG. 10, the AP may operate in a manner of immediate response in which the AP transmits the data frame when a predetermined time (e.g., a short inter-frame space (SIFS)) elapses after the AP receives the PS-Poll frame from the STA. However, the AP may operate in a manner of deferred response if the AP fails to prepare a data frame to be transmitted to the STA for the SIFS time after receiving the PS-Poll frame, which will be described in detail with reference to FIG. 11.

In the example of FIG. 11, the operations of the STA of switching from the sleep state to the awake state, receiving a TIM from the AP, and transmitting the PS-Poll frame to the AP through contention are identical to those in the example of FIG. 10. If the AP having received the PS-Poll frame fails to prepare a data frame for the SIFS time, the AP may transmit an ACK frame to the STA instead of transmitting the data frame. If the data frame is prepared after transmission of the ACK frame, the AP may perform contention and transmit the data frame to the STA. The STA may transmit the ACK frame indicating successful reception of the data frame to the AP, and then be switched to the sleep state.

FIG. 12 shows an exemplary case in which AP transmits DTIM. STAs may be switched from the sleep state to the awake state so as to receive the beacon frame including a DTIM element from the AP. The STAs may recognize, through the received DTIM, that a multicast/broadcast frame will be transmitted. After transmitting the beacon frame including the DTIM, the AP may immediately transmit data (i.e., a multicast/broadcast frame) without transmitting/receiving the PS-Poll frame. While the STAs continue to maintain the awake state even after receiving the beacon frame including the DTIM, the STAs may receive data and then switch back to the sleep state after data reception is completed.

TIM Structure

In the operation and management method of the power save (PS) mode based on the TIM (or DTIM) protocol illustrated in FIGS. 9 to 12, STAs may determine presence or absence of a data frame to be transmitted thereto through STA identification information contained in the TIM element. STA identification information may be specific information associated with an association identifier (AID) to be allocated when an STA is associated with an AP.

The AID is used as a unique ID of each STA within a BSS. For example, in the current WLAN system, an AID may be assigned a value between 1 and 2007. In the currently defined WLAN system, 14 bits for the AID may be allocated to a frame transmitted by an AP and/or an STA. Although the AID may be assigned any value up to 16383, values from 2008 to 16383 are set as reserved values.

The TIM element according to legacy definition is inappropriate for M2M application in which a large number of STAs (e.g., at least 2007 STAs) are associated with one AP. If the conventional TIM structure is extended without any change, the TIM bitmap size may excessively increase. Accordingly, it may be impossible to support the extended TIM structure using the legacy frame format, and the extended TIM structure is inappropriate for M2M communications in which application of a low transfer rate is considered. In addition, it is expected that the number of STAs having a reception data frame during one beacon period is very small. Therefore, in view of the aforementioned exemplary application of M2M communication, it is expected that a TIM bitmap will have a large size with most bits set to zero (0) in many cases. Therefore, there is a need for a technology capable of efficiently compressing a bitmap.

In the legacy bitmap compression technology, a series of 0s is omitted from the front part of a bitmap to define an offset (or start point) value. However, compression efficiency is not high in the case in which the number of STAs including a buffered frame is small, but there is a great difference between AID values of the STAs. For example, in the case in which a frame to be transmitted only to STAs whose AIDs are set to 10 and 2000 is buffered, the length of the compressed bitmap is 1990, but all the parts of the bit map other than both end parts are set to zero (0). If the number of STAs associated with one AP is small, inefficiency of bitmap compression may not be a serious problem. However, if the number of STAs associated with one AP increases, such inefficiency may deteriorate overall system performance.

In order to address this issue, AIDs may be divided into a plurality of groups such that data can be more efficiently transmitted with the AIDs. A designated group ID (GID) is allocated to each group. Hereinafter, AIDs allocated on the group basis will be described with reference to FIG. 20.

FIG. 13(a) is a diagram illustrating an exemplary AID allocated on the group basis. In FIG. 13(a), some bits located at the front part of the AID bitmap may be used to indicate a group ID (GID). For example, the first two bits of an AID bitmap may be used to designate four GIDs. If the total length of the AID bitmap is N bits, the first two bits (B1 and B2) may represent a GID of a corresponding AID.

FIG. 13(b) is a diagram illustrating another exemplary AID allocated on the group basis. In FIG. 13(b), a GID may be allocated according to the position of an AID. In this case, AIDs having the same GID may be represented by an offset and a length value. For example, if GID 1 is denoted by an offset A and a length B, this means that AIDs A to A+B−1 on a bitmap are set to GID 1. For example, FIG. 13(b) assumes that AIDs 1 to N4 are divided into four groups. In this case, AIDs belonging to GID 1 are denoted by 1 to N1, and may be represented by an offset of 1 and a length of N1. AIDs belonging to GID 2 may be represented by an offset of N1+1 and a length of N2−N1+1, AIDs belonging to GID 3 may be represented by an offset of N2+1 and a length of N3−N2+1, and AIDs belonging to GID 4 may be represented by an offset of N3+1 and a length of N4−N3+1.

If AIDs allocated on the group basis are introduced, channel access may be allowed in different time intervals according to GIDs. Thereby, the problem of lack of TIM elements for a large number of STAs may be solved and at the same time data transmission/reception may be efficiently performed. For example, in a specific time interval, channel access is allowed only for STA(s) corresponding to a specific group, and channel access of the remaining STA(s) may be restricted. A predetermined time interval in which only specific STA(s) are allowed to perform channel access may be referred to as a restricted access window (RAW).

Hereinafter, channel access based on GIDs will be described with reference to FIG. 13(c). FIG. 13(c) illustrates an exemplary channel access mechanism according to beacon intervals with AIDs divided into three groups. A first beacon interval (or a first RAW) is an interval in which channel access of an STA corresponding to an AID belonging to GID 1 is allowed, and channel access of STAs belonging to the other GIDs is not allowed. To implement this mechanism, a TIM element used only for AIDs corresponding to GID 1 is contained in a first beacon frame. A TIM element used only for AIDs corresponding to GID 2 is contained in a second beacon frame. Accordingly, channel access is allowed only for an STA corresponding to the AIDs belonging to GID 2 in a second beacon interval (or a second RAW). A TIM element used only for AIDs corresponding to GID 3 is contained in a third beacon frame. Accordingly, channel access is allowed only for an STA corresponding to the AIDs belonging GID 3 in a third beacon interval (or a third RAW). A TIM element used only for AIDs corresponding GID 1 is contained in a fourth beacon frame. Accordingly, channel access is allowed only for an STA corresponding to the AIDs belonging to GID 1 in a fourth beacon interval (or a fourth RAW). Thereafter, only channel access of an STA corresponding to a specific group indicated by the TIM contained in a corresponding beacon frame may be allowed in each of beacon intervals subsequent to the fifth beacon interval (or in each of RAWs subsequent to the fifth RAW).

While FIG. 13(c) exemplarily shows a case in which the order of allowed GIDs is cyclic or periodic according to the beacon intervals, embodiments of the present invention are not limited thereto. That is, only AID(s) belonging to specific GID(s) may be contained in a TIM element, such that only channel access of STA(s) corresponding to the specific AID(s) is allowed in a specific time interval (for example, a specific RAW), and channel access of the other STA(s) is not allowed.

Figure 13:
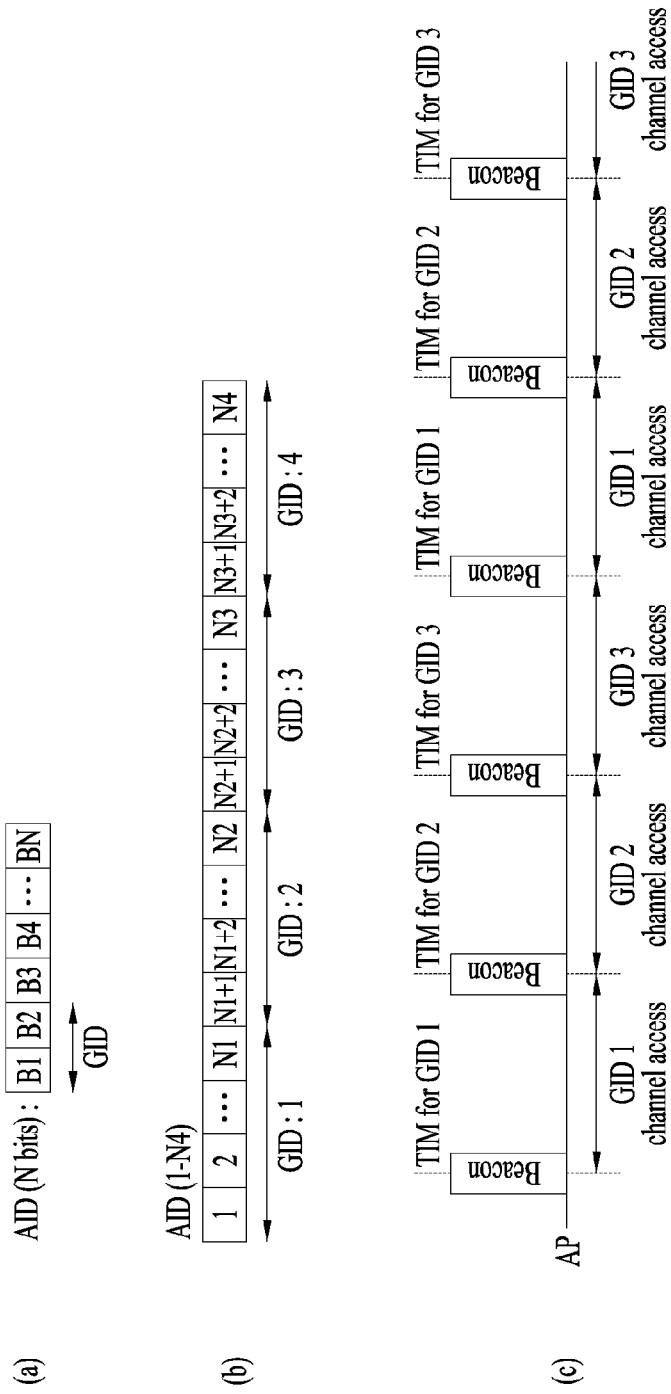
FIG. 13 illustrates a group-based AID.

The group-based AID allocation scheme as described above may also be called hierarchical structure of TIM. That is, the whole AID space may be divided into a plurality of blocks, and only STA(s) corresponding to a specific block set to a value other than 0 (namely, STA(s) of a specific group) may be allowed to perform channel access. Dividing a TIM of a large size into small blocks/groups as above may allow the STA to easily maintain TIM information and also facilitate management of the blocks/groups according to the class, quality of service (QoS), or purpose of the STA. While FIG. 13 illustrates a 2-level hierarchical structure, a TIM may be configured to have a hierarchical structure having two or more levels. For example, a whole AID space may be divided into a plurality of page groups, each page group may be divided into a plurality of blocks, and each block may be divided into a plurality of sub-blocks. In this case, as an extended version of the example of FIG. 13(a), an AID bitmap may be configured such that first N1 bits represent the page ID (i.e., PID), the next N2 bits indicate the block ID, the next N3 bits following the N2 bits represent sub-block ID, and the other bits represent the bit position of the STA in a sub-block.

In the embodiments of the present invention described below, various methods to divide STAs (or AIDs allocated to the STAs) into predetermined hierarchical groups and manage the groups may be adopted, and the group-based AID allocation scheme is not limited to the examples above.

Frame Structure

Figure 14:
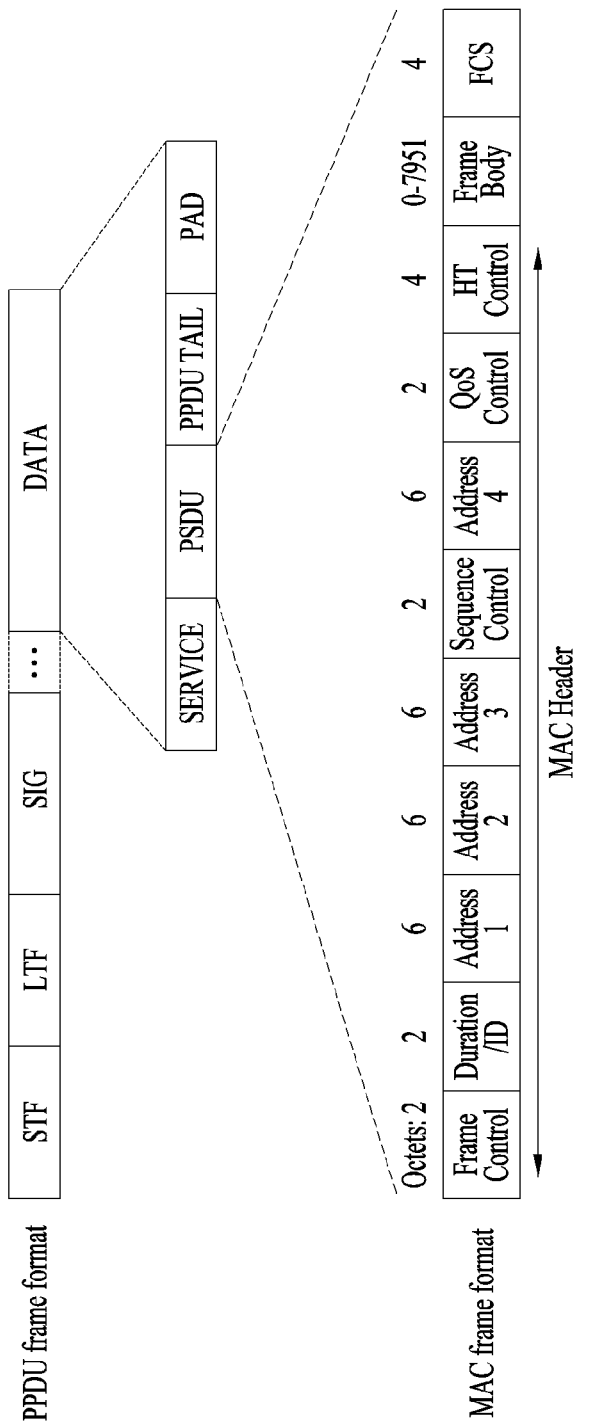
FIG. 14 illustrates an exemplary frame structure used in IEEE 802.11.

FIG. 14 illustrates an exemplary frame structure used in IEEE 802.11.

A PPDU (Physical Layer Convergence Protocol (PLCP) Packet Data Unit) frame format may be composed of an STF (Short Training Field), an LTF (Long Training Field), a signal (SIG) field and a data field. A basic (e.g., non-HT (High Throughput)) PPDU frame format can be composed of an L-STF (Legacy-STF), an L-LTF (Legacy-LTF), a SIG field and a data field. Furthermore, additional STF, LTF and SIG field may be included between the SIG field and the data field according to PPDU frame format type (e.g., HT-mixed format PPDU, HT-greenfield format PPDU, VHT (Very High Throughput) PPDU and the like).

The STF is a signal for signal detection, AGC (Automatic Gain Control), diversity selection, precise synchronization and the like and the LTF is a signal for channel estimation, frequency error estimation and the like. The STF and LTF can be called a PCLP preamble which is a signal for synchronization of OFDM physical layers and channel estimation.

The SIG field can include a RATE field and a LENGTH field. The RATE field can include information about a data modulation and coding rate. The LENGTH field can include information about a data length. In addition, the SIG field can include a parity bit and an SIG TAIL bit.

The data field can include a SERVICE field, a PSDU (PLCP Service Data Unit) and a PPDU TAIL bit and can also include a padding bit as necessary. Some bits of the SERVICE field can be used for synchronization of a descrambler at a receiver. The PSDU corresponds to a MAC PDU (Protocol Data Unit) defined in the MAC layer and can include data generated/used in a higher layer. The PPDU TAIL bit can be used to return an encoder to status 0. The padding bit can be used to adjust the length of the data field to a predetermined unit.

A MAC header includes a frame control field, a duration/ID field and an address field. The frame control field can include control information necessary for frame transmission/reception. The duration/ID field can be set to a time for transmitting a corresponding frame. Refer to IEEE 802.11-2012 for details of Sequence Control, QoS Control and HT Control subfields of the MAC header.

The frame control field of the MAC header can include Protocol Version, Type, Subtype, To DS, From DS, More Fragment, Retry, Power Management, More Data, Protected Frame and Order subfields. Refer to IEEE 802.11-2012 for the subfields of the frame control field.

A null-data packet (NDP) frame format refers to a frame format which does not include a data packet. That is, the NDP frame format refers to a frame format which includes only the PLCP header part (i.e., STF, LTF and SIG field) of the normal PPDU format and does not include the remaining part (i.e., data field). The NDP frame format may also be called a short frame format.

S1G Frame Format

To support applications such as M2M, IoT (Internet of Things), smart grid and the like, long-range low-power communication is required. To this end, utilization of communication using channel bandwidths of 1 MHz/2 MHz/4 MHz/8 MHz/16 MHz in a frequency band of sub-1 GHz (S1G) (e.g., 902 to 928 MHz) is under discussion.

Three types of formats are defined as S1G PPDU formats. That is, a short format used at bandwidths of more than S1G 2 MHz, a long format used at bandwidths of more than S1G 2 MHz, and a format used at the bandwidth of S1G 1 MHz are defined.

Figure 15:
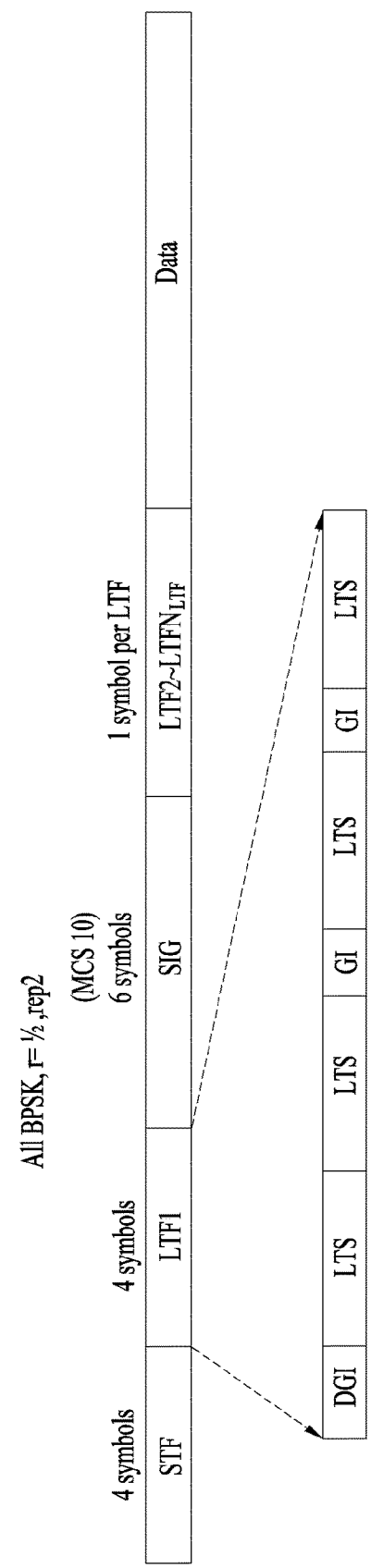
FIG. 15 illustrates an exemplary SIG 1 MHz format.

FIG. 15 illustrates an exemplary S1G 1 MHz format.

The S1G 1 MHz format can be used for 1 MHz PPDU SU (Single User) transmission.

While the S1G 1 MHz format, shown in FIG. 15, is composed of STF, LTF1, SIG, LTF2-LTFN and Data field, similarly to Green-field format defined in IEEE 802.11n, transmission time of the preamble of the S1G 1 MHz format is increased more than twice according to repetition, compared to the Green-field format.

While the STF of FIG. 15 has the same periodicity as the STF (2-symbol length) in a PPDU for bandwidths of 2 MHz or more, the STF is repeated twice (rep2) in the time domain so as to have a 4-symbol length (e.g. 160 µs), and 3 dB power boosting can be applied thereto.

The LTF1, shown in FIG. 5, is defined to be orthogonal to LTF1 (2-symbol length) in the PPDU for bandwidths of 2 MHz or more in the frequency domain and can have a 4-symbol length by being repeated twice in the time domain. The LTF1 can include a DGI (Double Guard Interval), an LTS (Long Training Sequence), an LTS, a GI (Guard Interval), an LTS, a GI and an LTS.

The SIG field, shown in FIG. 15, can be repeatedly coded, and a lowest MCS (Modulation and Coding Scheme) (i.e., BPSK (Binary Phase Shift Keying)) and repeated coding (rep2) are applied thereto. The SIG field may be configured such that the rate becomes ½ and may be defined as a 6-symbol length.

The LTF2 to LTFN$_{LTF}$, shown in FIG. 15, can be included only in the case of MIMO and each LTF can have a 1-symbol length.

Figure 16:
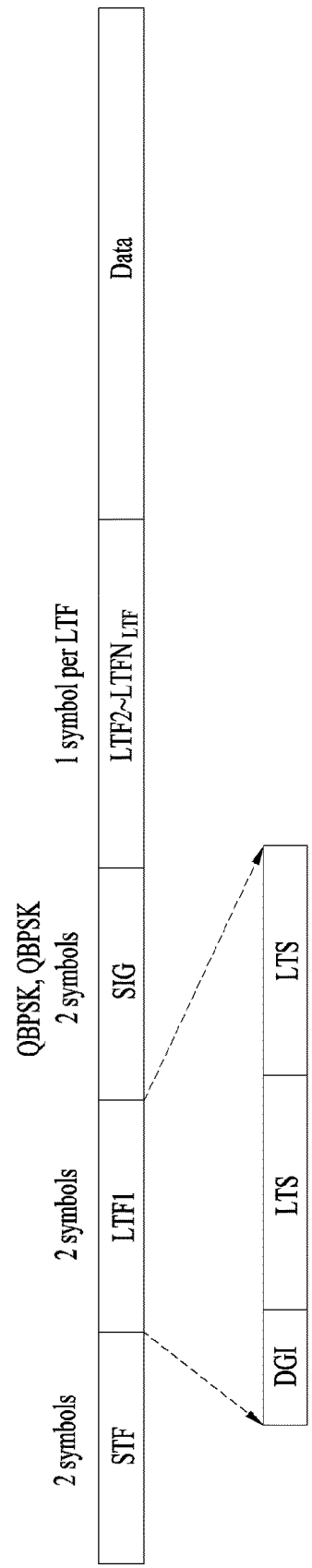
FIG. 16 illustrates an exemplary short format of more than S1G 2 MHz.

FIG. 16 illustrates an exemplary short format of S1G 2 MHz or more.

The short format of S1G 2 MHz or more can be used for SU transmission using 2 MHz, 4 MHz, 8 MHz and 16 MHz PPDUs.

The STF, shown in FIG. 16, may have a 2-symbol length.

The LTF1, shown in FIG. 16, may have a 2-symbol length and include a DGI, an LTS and an LTS.

The SIG field, shown in FIG. 16, may have a 2-symbol length. QPSK (Quadrature PSK), BPSK and the like can be applied to the SIG field as an MCS.

Each of LTF2 to LTFN$_{LTF}$, shown in FIG. 16, may have a 1-symbol length.

Figure 17:
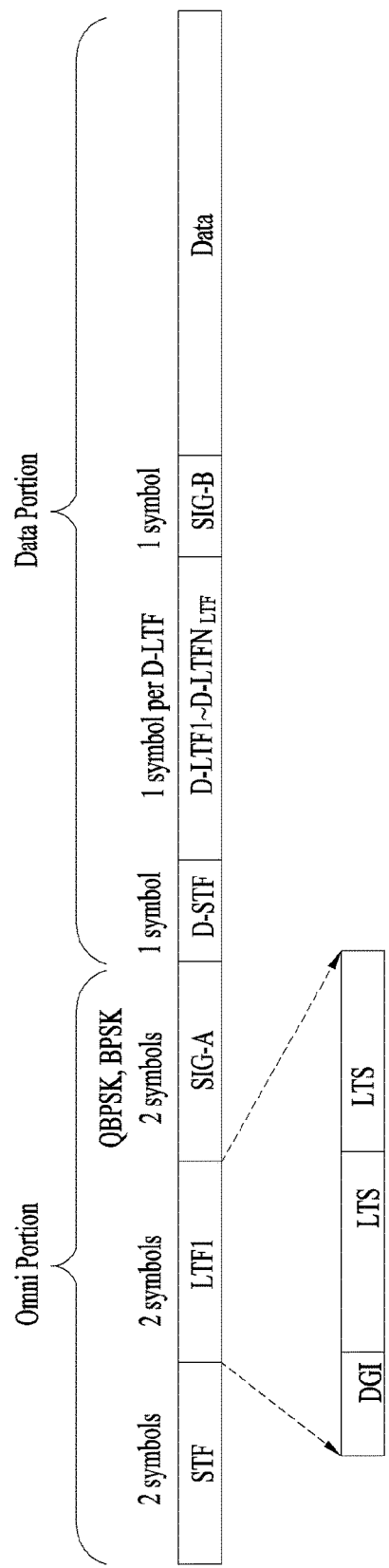
FIG. 17 illustrates an exemplary long format of more than S1G 2 MHz.

FIG. 17 illustrates an exemplary long format of S1G 2 MHz or more.

The long format of S1G 2 MHz or more can be used for MU transmission and SU beamformed transmission using 2 MHz, 4 MHz, 8 MHz and 16 MHz PPDUs. The long format of S1G 2 MHz or more can include an omni-portion transmitted in every direction and a data portion to which beamforming is applied.

The STF, shown in FIG. 17, may have a 2-symbol length.

The LTF1, shown in FIG. 17, may have a 2-symbol length and include a DGI, an LTS and an LTS.

A SIG-A (SIGNAL-A) field, shown in FIG. 17, may have a 2-symbol length. QPSK, BPSK or the like can be applied as an MCS.

D-STF (Short Training field for Data), shown in FIG. 17, may have a 1-symbol length.

D-LTF (Long Training field for Data), shown in FIG. 17, that is, each of D-LTF1 to D-LTFN$_{LTF}$ may have a 1-symbol length.

SIG-B (SIGNAL-B) field, shown in FIG. 17, may have a 1-symbol length.

Channel Access Mechanism in BSS Supporting Channel Bandwidths of 1 MHz and 2 MHz or More The present invention proposes a channel access mechanism, particularly, a backoff mechanism in a BSS supporting 1 MHz channel bandwidth and channel bandwidths of 2 MHz or more.

STAs belonging to the BSS perform the backoff mechanism using a primary channel. That is, the STAs can determine whether a corresponding channel (or medium) is idle by performing CCA or the like on the primary channel. The primary channel is defined as a common channel for all STAs belonging to the BSS and can be used to transmit a basic signal such as a beacon. In addition, the primary channel may be represented as a channel fundamentally used to transmit a data unit (e.g. PPDU). When a channel bandwidth used by an STA for data transmission is wider than the bandwidth of the primary channel, a channel other than the primary channel in the corresponding channel is called a secondary channel.

While the primary channel has only one bandwidth size in conventional wireless LAN systems, the primary channel can have two different bandwidths according to STA capability in evolved wireless LAN systems. The present invention proposes a backoff mechanism in such multi-channel environments.

For example, a sensor type STA can support 1 MHz or 2 MHz channel bandwidth (only) in order to reduce complexity of implementation thereof. However, STAs of IoT and M2M types require higher throughput and thus the STAs can support 2 MHz, 4 MH, 8 MHz or 16 MHz channel bandwidth (only) in order to support higher throughput.

In the present invention, STAs supporting 1 MHz or 2 MHz channel bandwidth are referred to as low-rate (LR) STAs and STAs supporting 2 MHz, 4 MHz, 8 MHz or 16 MHz channel bandwidths are referred to as high-rate (HR) STAs. In addition, it is assumed that a primary channel of an LR STA has 1 MHz channel bandwidth and a primary channel of an HR STA has 2 MHz channel bandwidth.

A description will be given of a backoff mechanism of an STA in a multi-channel environment in which a primary channel has two channel bandwidths according to capabilities of the STA.

An AP can designate a primary channel to be used by an LR STA through a beacon frame or the like. This primary channel is referred to as a first primary channel in the present invention. In addition, the AP can designate a primary channel to be used by an HR STA. This primary channel is referred to as a second primary channel in the present invention. For example, the first primary channel can correspond to a primary channel having a 1 MHz bandwidth and the second primary channel can correspond to a primary channel having a 2 MHz bandwidth.

Figure 18:
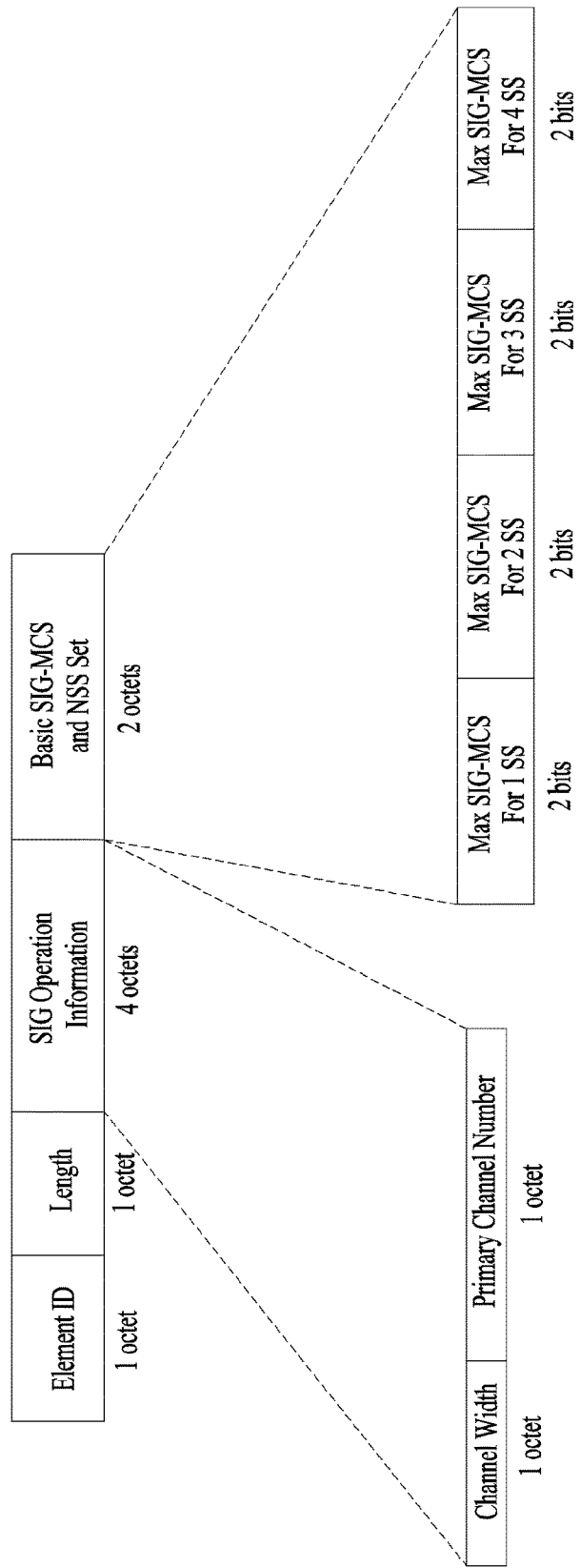
FIG. 18 illustrates an exemplary format of an S1G operation element.

FIG. 18 illustrates an exemplary format of an S1G operation element.

The S1G operation element shown in FIG. 18 may be delivered to STAs belonging to a BSS through a beacon frame, a probe response frame or the like. Accordingly, a channel set of the S1G BSS can be set.

A format of the S1G operation element may include an element ID field, a length field, an S1G operation information field and a basic S1G-MCS and NSS (Number of Spatial Stream) set field.

The ID field of the S1G operation element may be set to a value indicating that the corresponding information element is an S1G operation element.

The length field of the S1G operation element may be set to a value indicating the lengths of subsequent fields.

The S1G operation information field of the S1G operation element may include a channel width field and a primary channel number field.

For example, bits 0 to 5 (B0 to B5) of the channel width field can be set to a value indicating one of 1 MHz, 2 MHz, 4 MHz, 8 MHz and 16 MHz. Bits 6 and 7 (B6 and B7) of the channel width field can be set to a value indicating the location of the first primary channel. For example, 00 can indicate no first primary channel, 01 can indicate a lower side of the second primary channel, 10 can indicate an upper side of the second primary channel and 11 can be reserved.

B0 to B5 of the channel width field may be configured as follows. B0 can be set to 1 when the S1G BSS permits 1 MHz PPDU transmission. B1 can be set to 1 when the S1G BSS permits 2 MHz PPDU transmission. B2 can be set to 1 when the S1G BSS permits 4 MHz PPDU transmission. B3 can be set to 1 when the S1G BSS permits 8 MHz PPDU transmission. B4 can be set to 1 when the S1G BSS permits 16 MHz PPDU transmission. B5 can indicate the location of a 1 MHz primary channel (e.g. B5 indicates a lower side of a 2 MHz primary channel when set to 0 and indicates an upper side of the 2 MHz primary channel when set to 1).

Here, the first primary channel corresponds to part of the second primary channel. That is, the first primary channel is present in the second primary channel. In addition, the bandwidth of the first primary channel is less than the bandwidth of the second primary channel. For example, the second primary channel (or primary 2 MHz channel) can include the first primary channel (or primary 1 MHz channel) and the first primary channel can be located at one of upper 1 MHz and lower 1 MHz in the 2 MHz bandwidth of the second primary channel.

The primary channel number may be set to a value indicating the channel number of the second primary channel.

As described above, the locations of the second primary channel and the first primary channel (if present) can be specified at frequencies according to the channel width field and the primary channel number of the S1G operation information field.

The basic S1G-MCS and NSS set of the S1G operation element may include a maximum S1G-MCS field for 1 spatial stream (Max SIG-MCS for 1 SS), a maximum SIG-MCS field for 2 SSs (Max SIG-MCS for 2 SS), a maximum S1G-MCS field for 3 SSs (Max SIG-MCS for 3 SS) and a maximum S1G-MCS field for 4 SSs (Max SIG-MCS for 4 SS). A maximum S1G-MCS field for N SSs (N=1, 2, 3 or 4) may be set to a value indicating an index for a maximum MCS supported for N SSs.

The AP can support the following BSSs of three types using the S1G operation element described above with reference to FIG. 18.

Firstly, the AP can support a BSS composed of only LR STAs. In this case, bits B6 and B7 of the channel width field of the S1G operation element of FIG. 18 can be limited to 01 or 10. That is, only when the location of a first primary channel to be used by an LR STA is set to a lower side or an upper side of a second primary channel, can the location of the first primary channel be specified.

Secondly, the AP can support a BSS composed of only HR STAs. In this case, bits B6 and B7 of the channel width field of the S1G operation element of FIG. 18 can be limited to 00. That is, a first primary channel for an LR STA is not set (or not present) and 1 MHz PPDU transmission is not supported in the corresponding BSS.

Thirdly, the AP can support a BSS in which LR STAs and HR STAs coexist. In this case, bits B6 and B7 of the channel width field of the S1G operation element of FIG. 18 can be set to 00, 01 or 11.

A description will be given of a backoff process in an STA belonging to a BSS when the bandwidth of a primary channel is set to 1 MHz and/or 2 MHz in the BSS, as described above.

The STA performs the backoff process on the primary channel and, when a backoff count value (or backoff timer) reaches 0, can determine a transmission bandwidth by checking idle/busy status of a secondary channel on the basis of the time at which the backoff count value arrives at 0.

For example, when the first primary channel is not set as in a BSS composed of only HR STAs, an STA may invoke the backoff process on a second primary channel (or primary 2 MHz channel). When a channel on the second primary channel is idle in a backoff slot, the STA decreases the backoff timer by one. When the backoff timer reaches 0, the STA can check whether secondary channels are idle. That is, the STA can perform CCA for a secondary 2 MHz channel, a secondary 4 MHz channel or a secondary 8 MHz channel after the backoff timer reaches 0. The STA may perform PPDU (e.g. 2 MHz, 4 MHz, 8 MHz or 16 MHz PPDU) transmission including a secondary channel in an idle state according to a CCA result for the secondary channel.

For example, when the first primary channel is set as in a BSS composed of only LR STAs, an STA may invoke the backoff process on a first primary channel (or primary 1 MHz channel). When a channel on the first primary channel is idle in a backoff slot, the STA decreases the backoff timer by one. When the backoff timer reaches 0, the STA can check whether secondary channels are idle. That is, the STA can perform CCA for a secondary 1 MHz channel, a secondary 2 MHz channel, a secondary 4 MHz channel or a secondary 8 MHz channel after the backoff timer reaches 0. The STA may perform PPDU (e.g. 1 MHz, 2 MHz, 4 MHz, 8 MHz or 16 MHz PPDU) transmission including a secondary channel in an idle state according to a CCA result for the secondary channel.

A description will be given of secondary channels.

The AP can designate a secondary channel to be used by an LR STA. In the present invention, this secondary channel is referred to as a first secondary channel. In addition, the AP can designate a secondary channel to be used by an HR STA. This secondary channel is referred to as a second secondary channel in the present invention.

The first secondary channel corresponds to part of the second primary channel. A plurality of second secondary channels may be present and may respectively have different channel bandwidths.

Figure 19:
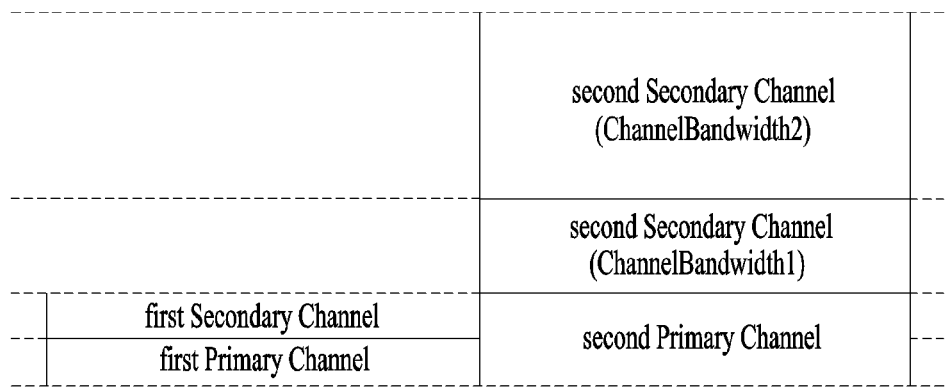
FIG. 19 illustrates a relationship between a primary channel and a secondary channel.

FIG. 19 illustrates the relationship between a primary channel and a secondary channel.

The first primary channel and the first secondary channel correspond to part of the second primary channel. Only one secondary channel may be set or a plurality of secondary channels may be set. When the plurality of secondary channels is set, the secondary channels may respectively have different channel bandwidths (e.g., ChannelBandwidth1 and ChannelBandwidth2).

When the first primary channel and the first secondary channel are bonded so as to be equal to the second primary channel, the AP can inform STAs of only the first primary channel number, the second primary channel number and the second secondary channel number and omit the first secondary channel number.

A description will be given of an exemplary backoff process when the primary channels and the secondary channels are set as shown in FIG. 19.

An LR STA may perform channel access on the first primary channel. For example, the LR STA can check channel idle/busy status on the first primary channel and invoke a backoff mechanism according to the checked result. The STA decreases the backoff timer by 1 when the first primary channel is idle in a backoff slot and freezes the backoff timer otherwise (that is, maintains a previous backoff count value without reducing the backoff timer).

An HR STA may perform channel access on the second primary channel. For example, the HR STA can check channel idle/busy status on the second primary channel and invoke the backoff mechanism according to the checked result. The STA decreases the backoff timer by 1 when the second primary channel is idle in a backoff slot and freezes the backoff timer otherwise (that is, maintains a previous backoff count value without reducing the backoff timer).

Here, when the STA performs channel sensing on the second primary channel, the STA needs to determine that the second primary channel is busy if use of the channel by another STA is sensed in any one of the first primary channel and the first secondary channel belonging to the second primary channel.

Figure 20:
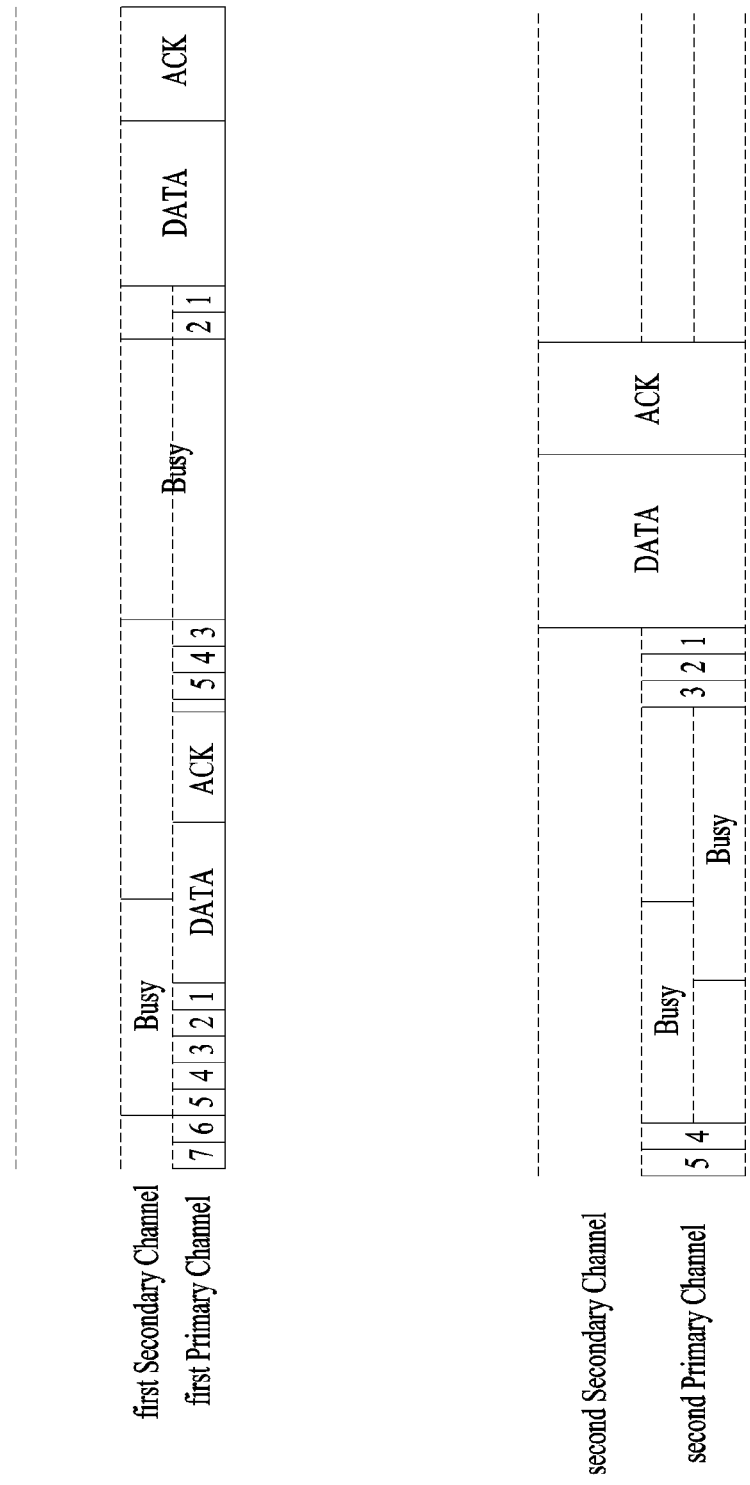
FIG. 20 illustrates an exemplary backoff process of an STA.

FIG. 20 illustrates an exemplary backoff process of an STA.

FIG. 20(a) illustrates a backoff process of an LR STA and FIG. 20(b) illustrates a backoff process of an HR STA. In the examples shown in FIGS. 20(a) and 20(b), it is assumed that the LR STA and the HR STA start backoff at the same time and respectively select 7 and 5 as a backoff timer value.

Referring to FIG. 20(a), the LR STA performs channel sensing only on the first primary channel and decreases the backoff timer to 7, 6, 5, 4, 3, 2 and 1 by executing the backoff process according to the channel sensing result. Although the first secondary channel is busy due to communication of another BSS, the backoff timer reaches 0 irrespective of use of the first secondary channel since the LR STA performs channel sensing on the first primary channel, and thus the LR STA is permitted to begin transmission opportunity (TXOP) and can transmit a data frame. However, since the first secondary channel is busy when the backoff timer reaches 0, the LR STA cannot use the first secondary channel for data frame transmission and can transmit a data frame (i.e. PPDU frame using a 1 MHz channel bandwidth) using the first primary channel only. Then, the LR STA can receive an ACK frame from an AP.

The LR STA may perform the backoff process again in order to additionally transmit data. The LR STA selects 5 as a backoff timer value and decreases the backoff timer to 5, 4 and 3 during a channel idle state on the first primacy channel. At this time, the first primary channel becomes busy due to data frame transmission of the HR STA. Accordingly, the LR STA stops countdown of the backoff timer. Upon completion of data frame transmission and ACK frame reception of the HR STA, the LR STA resumes the backoff process while the first primary channel is idle so as to reduce the backoff timer value to 2 and 1 until the backoff timer value reaches 0. When the backoff timer value becomes 0, the STA can transmit a data frame upon determining that the STA is permitted to begin TXOP. Since the first secondary channel is idle at the time when the backoff timer reaches 0, the LR STA can transmit a data frame (i.e. PPDU frame using a 2 MHz channel bandwidth) using both the first primary channel and the second secondary channel.

Referring to FIG. 20(b), the HR STA performs channel sensing on the second primary channel and decreases the backoff timer to 5 and 4 by executing the backoff process according to the channel sensing result. At this time, when part (i.e. a part corresponding to the first secondary channel) of the second primary channel becomes busy by being used by an LR STA, the HR STA stops countdown of the backoff timer. When another part (i.e. a part corresponding to the first primary channel) of the second primary channel is busy even if part (i.e. a part corresponding to the first secondary channel) of the second primary channel becomes idle, it is determined that the secondary primary channel is busy. Accordingly, when the entire second primary channel is not busy (that is, when the entire second primacy channel becomes idle), the HR STA resumes countdown of the backoff timer so as to decrease the backoff timer value to 3, 2 and 1. When the backoff timer reaches 0, the HR STA can transmit a data frame upon determining that the HR STA is permitted to begin TXOP. Here, since the second secondary channel is idle, the HR STA can transmit a data frame (i.e. 4 MHz PPDU frame) using both the second primary channel and the second secondary channel.

It can be known from the examples of FIG. 20 that the probability that the LR STA obtains TXOP is higher than the probability that the HR STA obtains TXOP. That is, while the LR STA and the HR STA perform the backoff process respectively using the first primary channel and the second primary channel, the HR STA has a smaller number of opportunities to perform the operation of decreasing the backoff count than the LR STA and thus the probability that the HR STA obtains TXOP becomes lower than the probability that the LR STA obtains TXOP since the probability that the entire second primary channel is idle is lower than the probability that the first primary channel is idle. That is, fairness in channel access of the LR STA and the HR STA is lost.

To solve this problem, it is possible to consider a scheme in which both the LR STA and the HR STA perform backoff only on the first primary channel. For example, both the LR STA and the HR STA may support only reception capability for the first primacy channel and the backoff mechanisms of the LR STA and the HR STA may be limited such that the backoff mechanism are performed only in the first primary channel.

For example, in a BSS supporting 1 MHz, 2 MHz, 4 MHz, 8 MHz and 16 MHz channel bandwidths, both the LR STA and the HR STA support reception capability for 1 MHz transmission and commonly perform the backoff mechanism on a 1 MHz channel. When channel sensing is performed only on the 1 MHz channel, the backoff process is executed according to the channel sensing result and thus the backoff timer reaches 0, the corresponding STA (i.e. any of the LR STA and HR STA) can transmit data upon determining that the STA is permitted to begin TXOP. Here, transmission of a 1 MHz, 2 MHz, 4 MHz, 8 MHz or 16 MHz PPDU frame can be determined according to idle/busy states of secondary channels after the backoff timer of the corresponding STA reaches 0 irrespective of idle/busy states of the secondary channels during backoff countdown. In addition, the bandwidth of a data frame to be transmitted after the backoff timer of the STA reaches 0 may be limited according to transmission capability of the STA.

That is, both the LR STA and HR STA perform the backoff mechanism using the first primary channel and a data transmission bandwidth is determined according to transmission capability of an STA whose backoff timer has reached 0 and idle/busy states of the first secondary channel and the second secondary channel.

According to the aforementioned operation scheme, however, an HR STA for which data transmission using only the first primary channel (i.e. primary 1 MHz channel) is not supported cannot perform data transmission when all secondary channels are busy and only the first primary channel is idle even if the HR STA is permitted to begin TXOP (or the backoff timer has reached 0) (since the HR STA needs to use at least the second primary channel (i.e. primary 2 MHz channel) for data transmission).

In this case, the HR STA can re-perform the backoff process. Here, the backoff process can be re-performed by maintaining a previous contention window value instead of doubling the same and without changing a retransmission count, distinguished from a new backoff process performed due to collision.

According to this method, however, the HR STA cannot perform channel access even if the HR STA successfully completes backoff countdown although fairness in channel access of the LR STA and HR STA can be provided.

To solve the problem that fairness in channel access of the LR SRA and HR STA is lost, as shown in FIG. 20, it is possible to allow both the LR STA and HR STA to support reception capability for the second primary channel and to limit the backoff mechanism of the LR STA and HR STA such that the backoff mechanism is performed only in the second primary channel.

For example, in a BSS supporting 1 MHz, 2 MHz, 4 MHz, 8 MHz and 16 MHz channel bandwidths, both the LR STA and HR STA commonly support reception capability for 2 MHz transmission and commonly perform the backoff mechanism on a 2 MHz channel. When channel sensing is performed only on the 2 MHz channel and the backoff process is performed according to the channel sensing result so as to permit beginning of TXOP (or when the backoff timer reaches 0), the corresponding STA (any of the LR STA and HR STA) can transmit data. Here, when the backoff timer reaches 0, a 1 MHz or 2 MHz PPDU frame can be transmitted according to idle/busy states of the first primary channel, the first secondary channel and the second primary channel. In addition, transmission of a 4 MHz, 8 MHz or 16 MHz PPDU frame can be determined according to the idle/busy state of the second secondary channel after the backoff timer of the corresponding STA reaches 0, irrespective of the idle/busy state of the second secondary channel during backoff countdown. In addition, the bandwidth of a data frame to be transmitted after the backoff timer of the STA reaches 0 may be limited according to transmission capability of the STA.

That is, both the LR STA and HR STA perform the backoff mechanism using the second primary channel and a data transmission bandwidth is determined according to transmission capability of an STA which is permitted to begin TXOP (or whose backoff timer has reached 0) and idle/busy states of the first primary channel, the first secondary channel and the second secondary channel.

According to the aforementioned method, fairness in channel access of the LR STA and HR STA can be provided. However, when the first primary channel is idle and the first secondary channel is busy, even the LR STA which intends to transmit a 1 MHz PPDU frame cannot continue backoff countdown since the second primary channel is busy. Consequently, utilization of the first primary channel in an idle state is blocked, deteriorating efficiency of bandwidth utilization from the viewpoint of the entire system.

To solve the aforementioned problems, the present invention proposes a method by which the LR STA transmits data using only the first primary channel without being permitted to use the second secondary channel even if the second secondary channel is idle when the LR STA performs the backoff process using the first primary channel and is permitted to begin TXPO as a result of the backoff process.

In other words, when the channel obtained by bonding the first primary channel and the first secondary channel corresponds to the second primary channel, the LR STA is prohibited from transmitting data on the second primary channel and is permitted to transmit data on the first primary channel when the LR STA performs the backoff process on the first primary channel and is permitted to begin TXOP as a result of the backoff process (or after the backoff time reaches 0). This can be considered to be a minimum measure for solving the problem with respect to fairness between the LR STA and the HR STA, compared to the procedure in which the HR STA performs the backoff process on the second primary channel in order to transmit data on the second primary channel.

According to the aforementioned method, when the LR STA attempts to transmit data using both the first primary channel and the first secondary channel (that is, on the second primary channel), the LR STA needs to perform the backoff process on the second primary channel from the beginning, instead of performing the backoff process only on the first primary channel.

Figure 21:
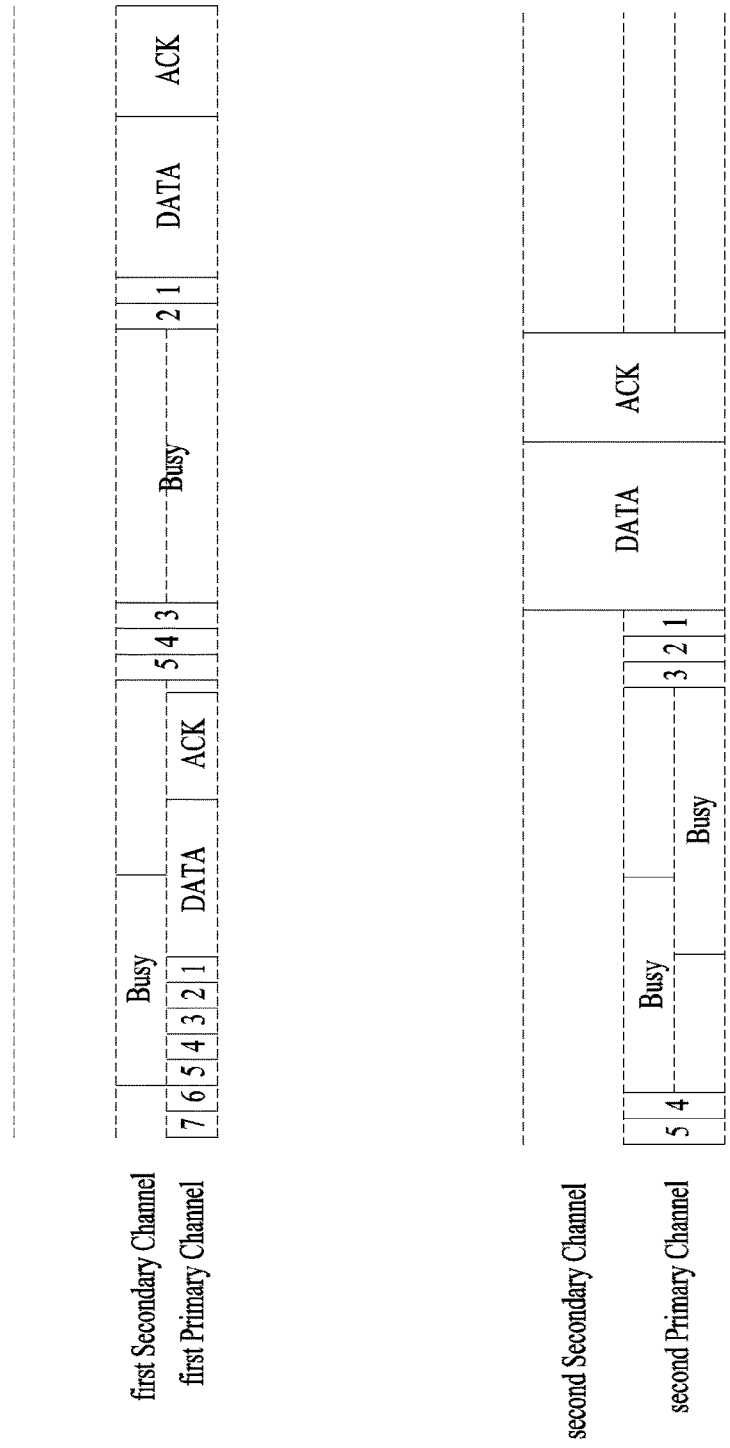
FIG. 21 illustrates an exemplary backoff process of an STA according to the present invention.

FIG. 21 illustrates an exemplary backoff process of an STA according to the present invention.

As shown in the example of FIG. 21, when an LR STA intends to transmit data (or a PPDU using channel bandwidths of 2 MHz or more) using both the first primary channel and the first secondary channel, the LR STA can decrease the backoff timer value one by one only when both the first primary channel and the second secondary channel are idle.

If a certain STA has both capabilities of an LR STA and an HR STA (e.g. if the STA supports transmission through 1 MHz, 2 MHz, 4 MHz, 8 MHz and 16 MHz channel bandwidths), the STA cannot perform data transmission on 2 MHz, 4 MHz, 8 MHz and 16 MHz channels even if the STA is permitted to begin TXOP by performing the backoff process on a 1 MHz channel (or even if the backoff timer reaches 0). That is, after performing the backoff mechanism on the first primary channel, the STA is prohibited from transmitting data using the second primary channel and the second secondary channel.

In short, when the STA performs the backoff process on the first primary channel, only the operation of transmitting data (or a PPDU using a 1 MHz channel bandwidth) using the first primary channel is defined. If the STA performs the backoff process on the first primary channel and the first secondary channel (i.e. second primary channel), the STA can transmit a data frame (or a PPDU frame using a 2 MHz channel bandwidth) using only the second primary channel or transmit a data frame (or a PPDU frame using a 4 MHz channel bandwidth) using both the second primary channel and the second secondary channel according to the state of the second secondary channel when permitted to begin TXOP (or after the backoff timer reaches 0).

While FIGS. 20 and 21 show that the STA transmits a data unit (or PPDU) of up to 4 MHz bandwidth, the present invention is not limited thereto and the principle of the present invention can be applied to transmission of a PPDU of up to 8 MHz bandwidth or a PPDU having a channel bandwidth size greater than 8 MHz, as shown in FIG. 19. For example, when an STA performs a first backoff process on the first primary channel (or 1 MHz primary channel) and is permitted to begin TXOP as a result of the first backoff process, the STA is permitted to perform only transmission of a 1 MHz PPDU (i.e. PPDUs of 2 MHz or more are not transmitted). In addition, when the STA performs a second backoff process on the second primary channel (or 2 MHz primary channel) and is permitted to begin TXOP as a result of the second backoff process, the STA can transmit a 2 MHz PPDU (when only the 2 MHz primary channel is idle), a 4 MHz PPDU (when both the 2 MHz second primary channel and the 2 MHz second secondary channel are idle), an 8 MHz PPDU (when the 2 MHz second primary channel, 2 MHz second secondary channel and 4 MHz second secondary channel are all idle) or a 16 MHz PPDU (when the 2 MHz second primary channel, 2 MHz second secondary channel, 4 MHz second secondary channel and 8 MHz second secondary channel are all idle) according to idle states of the second secondary channels (2 MHz, 4 MHz and 8 MHz second secondary channels) for a PIFS (point coordination function (PCF) interframe space) interval immediately before beginning of TXOP.

CCA Threshold

In the present invention, when an STA performs a backoff process on the first primary channel and the second primary channel, CCA operation of determining whether a channel is idle or busy is determined according to a CCA threshold (or CCA power threshold). For example, when the strength of a received signal detected from a channel exceeds the CCA threshold, the corresponding channel can be determined to be busy. A high CCA threshold can be considered to less protect other signals (i.e. probability of collision with signals transmitted from other devices is high) and a low CCA threshold can be considered to further protect other signals (i.e. probability of collision with signals transmitted from other devices).

The LR STA and the HR STA have different usage scenarios. The LR STA wants to provide services for longer distance with low power and the HR STA wants to obtain higher throughput than power consumption. Since the LR STA and the HR STA promote contradicting purposes, the CCA threshold which becomes a standard for determining whether a channel (or medium) is idle or busy in the LR STA and the HR STA needs to be changed according to the environment in which the CCA threshold is used.

Accordingly, the present invention proposes definition of two or more CCA thresholds. For example, an LR CCA threshold and an HR CCA threshold are separately defined, and the HR CCA threshold can be set to be higher than the LR CCA threshold. When a signal lower than the HR CCA threshold and higher than the LR CCA threshold is detected, an STA using the HR CCA threshold determines that the corresponding channel is not busy (i.e. the channel is idle) even when the signal is detected, whereas an STA using the LR CCA threshold determines that the corresponding channel is busy when the signal is detected. The STA using the HR CCA threshold can be considered to less protect signals transmitted from other devices, compared to the STA using the LR CCA threshold. Accordingly, the STA using the HR CCA threshold needs to set a service range narrower than the service range of the STA using the LR CCA threshold.

The present invention assumes that STAs use the HR CCA threshold as a CCA threshold (or as a default value). When services of the STAs are impeded by an interference signal, the STAs can transmit a management frame for requesting HR CCA prohibition to an AP. Upon reception of the management frame for requesting HR CCA prohibition, the AP can broadcast a management frame for ordering HR CCA prohibition to all STAs belonging to S1G BSSs. Upon reception of the management frame for ordering HR CCA prohibition, STAs change the CCA threshold from the HR CCA threshold to the LR CCA threshold.

When some or all BSAs of different BSSs overlap and the BSSs operate on the same channel, such BSSs are called OBSSs. When the management frame for ordering HR CCA prohibition is received from an AP of a neighbor BSS in an environment in which OBSSs are present, corresponding STAs change the CCA threshold to the LR CCA threshold. While the STAs may use the changed LR CCA threshold, the LR CCA threshold is not continuously applied because the STAs need not use the LR CCA threshold when the AP of the neighbor BSS which sent the HR CCA prohibition management frame does not provide services any more.

Accordingly, upon reception of the management frame for ordering HR CCA prohibition, STAs can change the CCA threshold from the HR CCA threshold to the LR CCA threshold and apply the LR CCA threshold for a predetermined time (e.g. HR CCA prohibit timeout). After the HR CCA prohibition timeout, the CCA threshold is changed to the HR CCA threshold. Accordingly, if the CCA threshold needs to be continuously changed to the LR CCA threshold, the management frame for ordering HR CCA prohibition needs to be continuously transmitted at an interval less than the HR CCA prohibition timeout.

The HR CCA prohibition request management frame may include information designating a time to which HR CCA prohibition is applied (e.g. HR CCA prohibition start time, HR CCA prohibition timeout and the like). That is, when the service of a certain STA is impeded by an interference signal, information about the HR CCA prohibition start time and HR CCA prohibition timeout, which indicates a period at which the interference signal is generated, can be included in the HR CCA prohibition request management frame in order to request HR CCA prohibition for the period.

In addition, when an AP transmits the management frame for ordering HR CCA prohibition, in order to HR CCA prohibition for a specific period, information such as HR CCA prohibition start time and HR CCA prohibition timeout, which indicates the specific period, can be included in the management frame for ordering HR CCA prohibition.

Upon reception of the HR CCA prohibition management frame including the HR CCA prohibition start time and HR CCA prohibition timeout, STAs can change the CCA threshold from the HR CCA threshold to the LR CCA threshold and apply the LR CCA threshold only for the period specified by the HR CCA prohibition start time and HR CCA prohibition timeout. The STAs can continuously use the original HR CCA threshold for an unspecified period.

When an AP or an STA which has received the HR CCA prohibition management frame moves to another channel, HR CCA prohibition is not applied to the new channel. This means that signaling for HR CCA prohibition is performed per channel. When the AP performs channel switching upon reception of the HR CCA prohibition management frame and an STA performs scanning on another channel upon reception of the HR CCA prohibition management frame, previous signaling for HR CCA prohibition is ignored and channel access can be performed using the HR CCA threshold.

Dynamic CCA Scheme

To achieve high throughput (e.g. aggregated throughput of higher than 1 Gbps, which can be provided by a BSS of an IEEE 802.11ac VHT system) of enhanced wireless LAN systems in the actual environment, multiple non-AP STAs need to simultaneously use channels. To this end, an AP STA can use SDMA (Space Division Multiple Access) or MU-MIMO. That is, multiple non-AP STAs and the AP-STA are permitted to simultaneously perform transmission and reception.

In addition, to support an extended channel bandwidth (e.g. 160 MHz channel bandwidth of a VHT system), legacy STAs such as IEEE 802.11a/n STAs may operate at various positions in a frequency band and thus it is difficult to find contiguous 160 MHz channels which are not used by the legacy STAs. Accordingly, it is necessary to aggregate non-contiguous channels so as to use the aggregated channels as an extended channel bandwidth.

Figure 22:
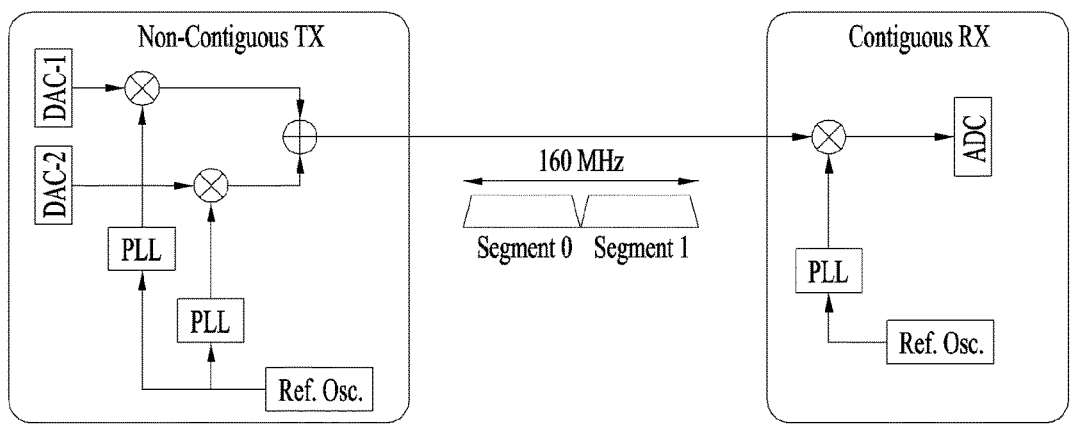
FIG. 22 is a block diagram for explaining a transmission operation using a non-contiguous channel.

FIG. 22 is a block diagram illustrating transmission operation using non-contiguous channels.

In FIG. 22, at a transmitting side which performs non-contiguous transmission (TX), the output of a reference oscillator Ref.Osc passes through phase locked loops (PLLs) and is multiplied by outputs of two digital-to-analog converters DAC-1 and DAC-2. A result of multiplication of the output of DAC-1 and the output of the reference oscillator via the PLL can be added to a result of multiplication of the output of DAC-2 and the output of the reference oscillator via the PLL and transmitted on a wireless medium. Here, the output of DAC-1 can correspond to the first segment 0 of a 160 MHz channel bandwidth and the output of DAC-2 can correspond to the second segment 1 of the 160 MHz channel bandwidth. To communicate with a receiving side which performs contiguous reception (RX), the transmitting side which performs non-contiguous TX can locate the two frequency segments thereof next to each other.

Figure 23:
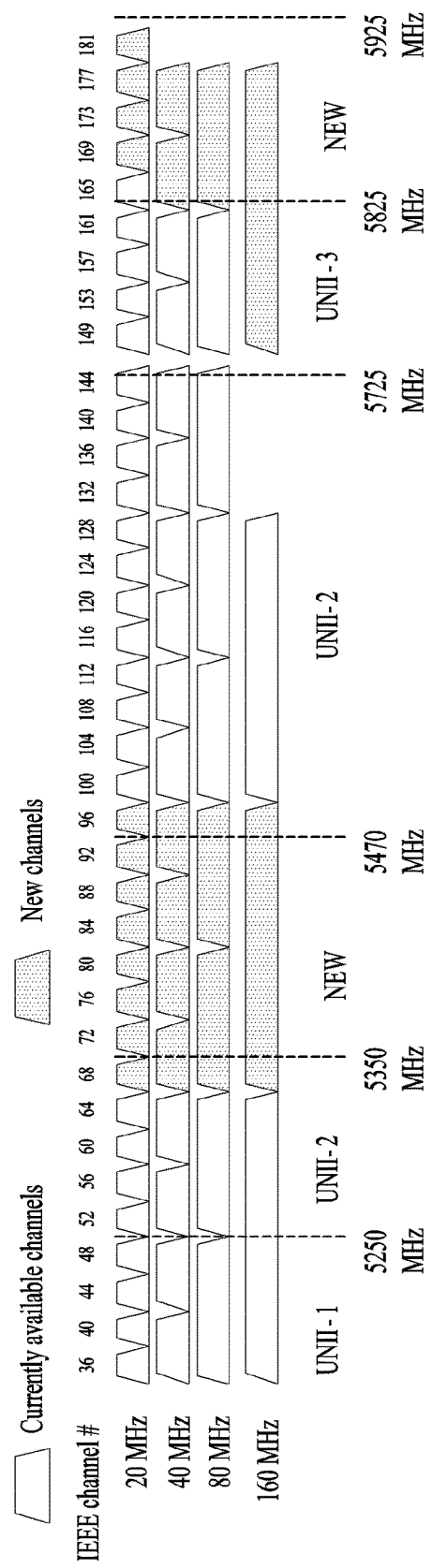
FIG. 23 illustrates channels available for a wireless LAN system at 5 GHz.

FIG. 23 illustrates channels available for wireless LAN systems in a band of 5 GHz.

As demands for large-capacity data transmission (e.g. high picture quality multimedia transmission) increase, extension of unlicensed bands available for wireless LAN systems is under discussion. FIG. 23 shows the locations of currently available channels and new channels, which will be additionally available, of an IEEE 802.11ac system at frequencies in a band of 5 GHz.

The currently available channels include UNII (Unlicensed National Information Infrastructure)-1, UNII-2, UNII-3 and UNII3. UNII-1 is also called UNII Low and is defined as being located in a band ranging from 5150 Hz to 5250 Hz. UNII-2 includes a part called UNII Mid and located in a band ranging from 5250 Hz to 5350 Hz and a part called UNII-2e or UNII-Worldwide and located in a band ranging from 5470 Hz to 5725 Hz. UNII-3 is also called UNII-Upper and is defined as being located in a band ranging from 5725 Hz to 5825 Hz.

As shown in FIG. 23, considering newly added channels in a band ranging from 5350 MHz to 5470 MHz and a band ranging from 5825 MHz to 5925 MHz, the number of available 80 MHz channels increases to 9 from 6. Furthermore, the number of available 160 MHz channels increases from 2 to 4.

To effectively support a gradually increasing quantity of data, enhancement of efficiency of a wireless LAN protocol becomes important in addition to extension of available unlicensed bands of a wireless LAN system. Particularly, in an environment in which many APs are concentrated, it is important to increase a spatial reuse gain.

The present invention proposes a dynamic CCA scheme for maximizing efficiency of use of a wireless medium in CSMA/CA fundamentally employed by a wireless LAN system.

While the following description is focused on an example of using 20 MHz, 40 MHz, 80 MHz and 160 MHz channel bandwidths in a band of 5 GHz, the same principle can be equally applied to operation of using different channel bandwidths (2 MHz, 4 MHz, 8 MHz, 16 MHz and the like) in a different band (e.g. S1G band). In the following example, a minimum primary channel bandwidth is represented by W MHz. W may be 20 in a wireless LAN system operating in a 5 GHz band and W may be 2 in a wireless LAN system operating in an S1G band. The backoff operation including the CCA scheme proposed by the present invention can be applied to a case in which the minimum primary channel bandwidth is 1 (i.e. W=1) as in the aforementioned example of the present invention.

The dynamic CCA scheme proposed by the present invention may include varying a CCA parameter per BSS. In addition, the dynamic CCA scheme proposed by the present invention may include application of a CCA parameter (or CCA condition) according to the channel width of a data unit (PPDU) to be transmitted.

CCA operation may refer to operation of determining that a specific operation channel is occupied by another STA when reception power of more than A dBm is detected (e.g. start of a PPDU of more than A dBm is detected) on the specific operation channel. On an operation channel determined to be busy according to CCA result, an STA stops the currently performed backoff process (i.e. countdown of the backoff counter) and waits until the corresponding operation channel is determined to be idle from a CCA result.

The conventional CCA operation and backoff operation are described. All STAs can perform the backoff process in a primary W MHz channel by default. That is, a backoff timer is set within a range of 0 to CWmin and, when the primary W MHz channel is determined to be idle from a CCA result with respect to the primary W MHz channel for a backoff slot time, the backoff timer is decreased one by one.

An STA whose backoff timer has reached 0 can transmit a data frame on the corresponding channel. Here, the STA can transmit an RTS frame first and transmit a data frame upon reception of a CTS frame from a destination STA. Otherwise, the STA may directly transmit the data frame to the destination STA without exchanging the RTS frame and the CTS frame.

When an STA other than the destination STA receives the RTS frame, CTS frame and data frame or an ACK frame, channel access is deferred by setting an NAV value in order to avoid simultaneous transmission (or collision) of STAs on the corresponding channel. The backoff time is not decreased for a time for which the NAV value is set even when the corresponding channel is determined to be idle from a CCA result.

Here, according to the CCA operation of the present invention, when it is determined that other STAs occupy a wireless medium (WM), backoff can be continued by increasing the primary channel bandwidth.

That is, STAs (i.e. third STAs or third party STAs) which have received (overheard) an RTS frame or a CTS frame transmitted from a specific STA can estimate a channel use time of the specific STA through the duration field of the RTS frame or the CTS frame and set an NAV. Here, the third party STAs can increase the primary channel bandwidth, perform CCA and continue backoff.

For example, the third party STAs can increase the primary channel bandwidth twice and perform CCA. In this case, a primary channel CCA parameter can be changed. For example, when the primary channel bandwidth is doubled and CCA is performed, the CCA threshold can be increased by 3 dBm. The third party STAs can continue the backoff process using the changed CCA parameter.

When the primary channel bandwidth, which is a target of backoff (or CCA) is W MHz, the backoff process can be understood as a backoff (or CCA) process for transmitting a data unit (i.e. PPDU) having a W MHz (or more) channel width. When a data unit having a W MHz (or more) channel width is transmitted, a channel busy/idle state is determined on the basis of a CCA threshold of A dBm on a W MHz primary channel and the backoff process can be performed according to the channel busy/idle state. When a data unit having a 2W MHz (or more) channel width is transmitted, a channel busy/idle state is determined on the basis of a CCA threshold of A+3 dBm on a 2W MHz primary channel and the backoff process can be performed according to the channel busy/idle state.

For example, a 20 MHz primary channel can be determined to be busy when CCA is performed using a CCA threshold of A dBm for the 20 MHz primary channel, whereas a 40 MHz primary channel can be determined to be idle when CCA is performed using a CCA threshold of A+3 dBm for the 40 MHz primary channel. If an STA determines that the 40 MHz primary channel is idle by performing CCA for the 40 MHz primary channel using the CCA threshold of A+3 dBm, the STA can decrease the backoff timer by one. Here, when the backoff timer reaches 0, the STA needs to transmit a data frame using (or including) the 40 MHz primary channel. That is, the STA needs to transmit a data unit (e.g. PPDU) using channel widths of 40 MHz or more. When the STA performs backoff for the 40 MHz primary channel using the CCA threshold of A+3 dBm, the STA is prohibited from transmitting a PPDU having a channel width of less than 40 MHz even during TXOP. That is, the STA performs the backoff process using the CCA threshold of A dBm on the 20 MHz primary channel in order to transmit a data unit having a channel width of more than 20 MHz and performs the backoff process using the CCA threshold of A+3 dBm on the 40 MHz primary channel in order to transmit a data unit having a channel width of more than 40 MHz.

If the 40 MHz primary channel is busy even when the backoff process is performed using the CCA threshold of A+3 dBm on the 40 MHz primary channel, the STA can use a primary channel having a doubled channel bandwidth and perform the backoff process using a CCA parameter corresponding to the CCA threshold plus 3 dBm (i.e. A+6 dBm). For example, if an 80 MHz primary channel is determined to be idle when CCA is performed using the CCA threshold of A+6 dBm on the 80 MHz primary channel, the backoff timer can be decreased by one. When the backoff timer reaches 0, the corresponding STA needs to transmit a data frame using (or including) the 80 MHz primary channel. When the STA performs backoff using the CCA threshold of A+6 dBm for the 80 MHz primary channel, the STA is prohibited from transmitting a PPDU having a channel width of less than 80 MHz for TXOP. That is, the STA performs the backoff process using the CCA threshold of A dBm on the 20 MHz primary channel in order to transmit a data unit having a channel width of more than 20 MHz, performs the backoff process using the CCA threshold of A+3 dBm on the 40 MHz primary channel in order to transmit a data unit having a channel width of more than 40 MHz and performs the backoff process using the CCA threshold of A+6 dBm on the 80 MHz primary channel in order to transmit a data unit having a channel width of more than 80 MHz.

If the 80 MHz primary channel is busy even when the backoff process is performed using the CCA threshold of A+6 dBm on the 80 MHz primary channel, the STA can use a primary channel having a doubled channel bandwidth and perform the backoff process using a CCA parameter corresponding to the CCA threshold plus 3 dBm (i.e. A+9 dBm). For example, if a 160 MHz primary channel is determined to be idle when CCA is performed using the CCA threshold of A+9 dBm on the 160 MHz primary channel, the backoff timer can be decreased by one. When the backoff timer reaches 0, the corresponding STA needs to transmit a data frame using (or including) the 160 MHz primary channel. When the STA performs backoff using the CCA threshold of A+9 dBm for the 160 MHz primary channel, the STA is prohibited from transmitting a PPDU having a channel width of less than 160 MHz for TXOP. That is, the STA performs the backoff process using the CCA threshold of A dBm on the 20 MHz primary channel in order to transmit a data unit having a channel width of more than 20 MHz, performs the backoff process using the CCA threshold of A+3 dBm on the 40 MHz primary channel in order to transmit a data unit having a channel width of more than 40 MHz, performs the backoff process using the CCA threshold of A+6 dBm on the 80 MHz primary channel in order to transmit a data unit having a channel width of more than 80 MHz and performs the backoff process using the CCA threshold of A+9 dBm on the 160 MHz primary channel in order to transmit a data unit having a channel width of more than 160 MHz.

The reason why the CCA threshold is increased by 3 dBm when the bandwidth of a primary channel on which the STA performs CCA is doubled is as follows. When transmission power of the STA is uniform, power per unit bandwidth is halved if a PPDU transmission channel width is doubled. Accordingly, when the PPDU transmission channel bandwidth is doubled, an interference level applied to other STAs is halved and thus the actual interference level applied to other STAs is not varied even when the CCA threshold is doubled (that is, increased by 3 dBm).

For example, when an interference level caused by an STA which uses power P to transmit a W MHz PPDU is X dBm, an interference level caused by an STA which uses power P to transmit a 2W MHz PPDU can be regarded as X−3 dBm. CCA is operation of detecting presence of interference signals caused by other STAs on a channel. When a signal having an interference level of higher than a CCA threshold is detected on a channel, a wireless medium (WM) is determined to be occupied by another STA and thus a CCA threshold of a first STA can be considered to be related to an interference level caused by PPDU transmission of a second STA. Application of a CCA threshold of A dBm by the first STA to W MHz PPDU transmission means that the corresponding channel is determined to be busy when an interference level caused by W MHz PPDU transmission of the second STA is higher than A dBm. Application of the CCA threshold of A dBm by the first STA to 2W MHz PPDU transmission means that the corresponding channel is determined to be busy even when an interference level caused by 2W MHz PPDU transmission of the second STA is observed as a value greater than A dBm. That is, use of the CCA threshold of A dBm for both W MHz PPDU transmission and 2W MHz PPDU transmission can be interpreted as application of a half CCA threshold, considering that 2W MHz PPDU transmission causes an interference level corresponding to a half that of W MHz PPDU transmission. That is, if the CCA threshold is not increased even when the transmission channel width of the first STA is widened, the first STA has to determine the corresponding channel to be busy even with a lower interference level. In addition, when the backoff process is performed on the basis of CCA operation using such CCA threshold, opportunities to obtain TXOP are decreased. Accordingly, when the channel bandwidth of a PPDU to be transmitted increases, the CCA threshold also needs to be increased in order to prevent imbalance of possibility of obtaining TXOP.

Accordingly, when a specific STA attempts to transmit a PPDU of W MHz or more, the STA can determine whether PPDU transmissions of other STAs are present on the corresponding channel by using A dBm as a CCA threshold. When a specific STA attempts to transmit a PPDU of 2W MHz or more, the STA can determine whether PPDU transmissions of other STAs are present on the corresponding channel by using A+3 dBm as a CCA threshold.

Figure 24:
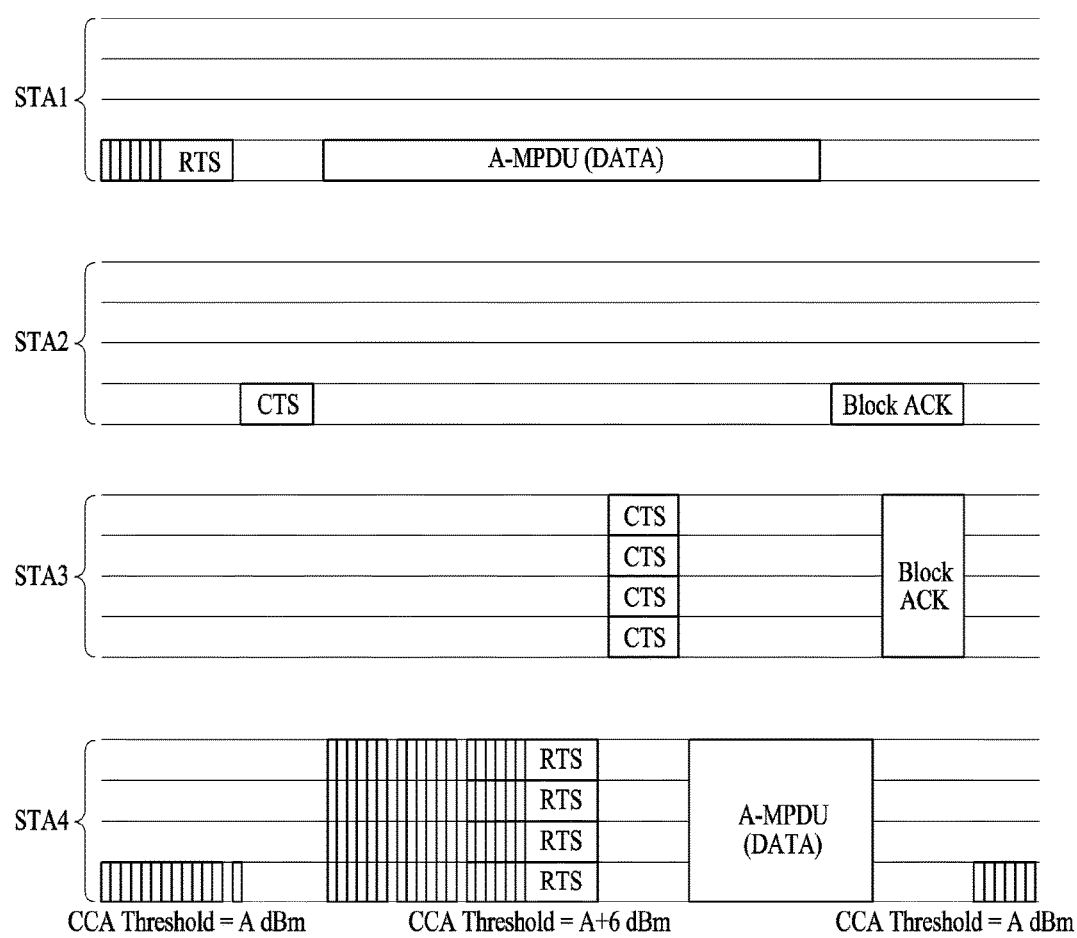
FIG. 24 illustrates a CCA scheme according to an example of the present invention.

FIG. 24 illustrates a CCA scheme according to an example of the present invention.

STA1 and STA4 having data to transmit can perform backoff processes on a 20 MHz primary channel. Here, it is assumed that a CCA threshold is A dBm on the 20 MHz primary channel. That is, STA and STA4 can stop countdown of the backoff timer upon determining that a CCA result value indicates a channel busy state when a signal received with power of A dBm or more is present. Since STA1 and STA4 randomly select different backoff timer start values, it is assumed that the backoff timer of STA1 reaches 0 first. Accordingly, STA1 can perform frame transmission and reception using the 20 MHz primary channel. For example, STA1 can transmit an RTS to STA2 which is a destination STA and STA2 can respond to STA 1 with a CTS upon reception of the RTS. Accordingly, STA1 can transmit A-MPDU (DATA) to STA2 and STA2 can transmit a block ACK frame to STA1 in response to the A-MPDU.

STA4 determines that a CCA result value with respect to the 20 MHz primary channel indicates a channel busy state due to the frames transmitted and received by STA1. Accordingly, STA4 can quadruple the primary channel bandwidth (i.e. to 80 MHz primary channel), increase the CCA threshold by 6 dBm (i.e. A+6 dBm) and resume backoff. A backoff process according to the increased CCA threshold may be performed in such a manner that backoff timer countdown is performed on the basis of received signal strength in the entire 80 MHz primary channel or backoff timer countdown is performed on the basis of received signal strength in part of the 80 MHz primary channel. Upon completion of the backoff process for the 80 MHz primary channel, STA4 can perform frame transmission and reception using the 80 MHz primary channel after the backoff timer reaches 0. For example, STA4 can transmit an RTS to STA3 and STA3 can respond to STA4 with a CTS. Accordingly, STA4 can transmit A-MPDU (DATA) to STA3 and STA3 can transmit a block ACK frame to STA4 in response to the A-MPDU.

Then, STA4 can newly start backoff on the 20 MHz primary channel. Here, backoff can be performed while the CCA threshold in the 20 MHz primary channel is decreased by 6 dBm from the CCA threshold for the 80 MHz primary channel (that is, A dBm).

In the example shown in FIG. 24, the CTS and the block ACK frame transmitted by STA3 may obstruct communication between STA and STA2. To solve this problem, a specific STA may request other STAs to perform dynamic CCA.

Figure 25:
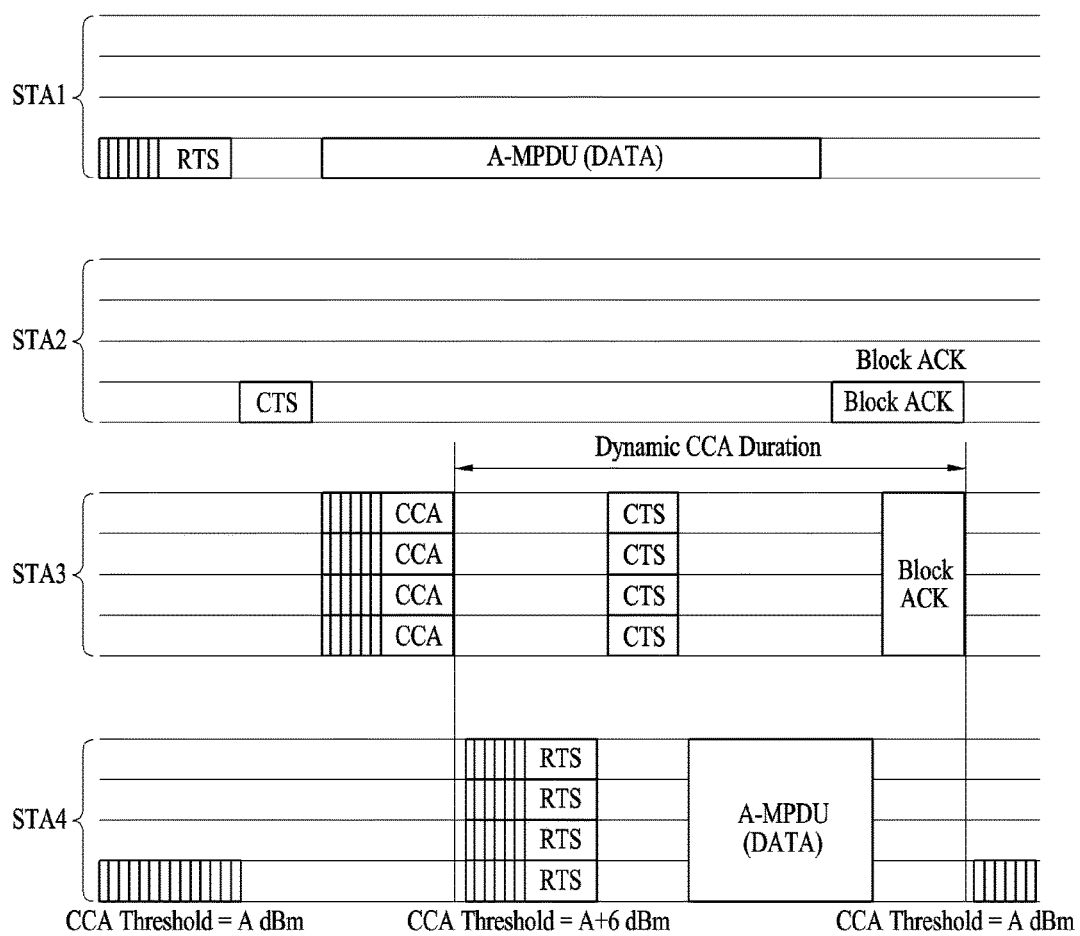
FIG. 25 illustrates a CCA scheme according to an additional example of the present invention.

FIG. 25 illustrates a CCA scheme according to an additional example of the present invention.

In the example shown in FIG. 25, STA3 can estimate channel use time of STA 1 and STA2 through the duration fields included in RTS/CTS frames exchanged between STA1 and STA2. If STA3 is an AP, STA3 can inform all STAs belonging to a BSS thereof that STA3 has determined that an 80 MHz primary channel is idle from a CCA result. A frame used for a specific STA to inform other STAs of a CCA result thereof may be referred to as a CCA control frame. To transmit the CCA control frame, STA3 can perform a backoff process on the 80 MHz primary channel (i.e. 80 MHz primary channel determined to be idle from the CCA result) and transmit the CCA control frame using the 80 MHz primary channel when the backoff timer reaches 0. An STA which has received the CCA control frame can change the CCA parameter thereof on the basis of dynamic CCA duration information, CCA bandwidth information, CCA threshold level information and the like included in the CCA control frame and resume a backoff process on the basis of the changed CCA parameter.

Here, the dynamic CCA duration information indicates that STAs belonging to the BSS of the AP (e.g. STA3) need to perform channel access using changed CCA parameters for a time indicated by a duration value. The CCA bandwidth information indicates a CCA bandwidth that needs to be used by STAs for a dynamic CCA duration. The CCA threshold level information indicates a CCA threshold level used by STAs for the dynamic CCA duration. That is, when a signal of higher than the CCA threshold level in the CCA bandwidth is detected for the CCA duration indicated through the CCA control frame, a wireless medium of the corresponding bandwidth can be determined to be occupied.

Upon reception of the CCA control frame and execution of channel access on the basis of a changed CCA parameter for the indicated CCA duration, the STA can recover the original CCA parameter and resume channel access after expiration of the indicated CCA duration.

In addition, when CCA is performed on the basis of an increased CCA threshold in an increased primary channel bandwidth and a backoff process is performed in examples of the present invention, a method of determining whether a wireless medium (WM) is busy or idle on the basis of the increased CCA threshold in the increased primary channel bandwidth can be implemented in various manners.

As a first example, when a CCA threshold for a 40 MHz primary channel is set to be higher by 3 dBm (e.g. A+3 dBm) than a CCA threshold (e.g. A dBm) for a 20 MHz primary channel and a backoff process is performed, whether the corresponding wireless medium is busy or idle can be determined by comparing received signal strength in the entire 40 MHz primary channel with the CCA threshold (e.g. A+3 dBm). For example, when the received signal strength in the entire 40 MHz primary channel is greater than the CCA threshold (e.g. A+3 dBm), the wireless medium can be determined to be busy.

As a second example, whether a wireless medium is busy or idle may be determined by comparing received signal strength with the CCA threshold on the basis of only part of the 40 MHz primary channel. For example, when received signal strength in a 20 MHz channel, which is part of the 40 MHz primary channel, is greater than the CCA threshold (e.g. A+3 dBm), the corresponding wireless medium can be determined to be busy.

According to the second example, a channel bandwidth sampled to determine a channel busy/idle state is not varied in a backoff process of an STA (that is, both CCA for the 20 MHz primary channel and CCA for the 40 MHz primary channel are performed on the basis of received signal strength in the 20 MHz channel), and thus implementation can be simplified. However, additional considerations are generated from the viewpoint of the MAC protocol.

For example, when PPDU transmission is performed after the backoff timer expires (i.e. after TXOP is obtained), a channel state is checked for only part (e.g. 20 MHz channel) of the entire channel (e.g. 40 MHz channel) used for actual PPDU transmission, instead of the entire channel, in the backoff process, and thus it is impossible to confirm that the entire channel for actual PPDU transmission is idle. According to circumstances, a PPDU may not be transmitted even when TXOP has been obtained after the backoff timer expires. For example, when the remaining 20 MHz channel (e.g. 20 MHz secondary channel) is busy for PIFS immediately before actual PPDU transmission after the backoff timer expires, the PPDU may not be transmitted on the 40 MHz channel. That is, when the remaining 20 MHz channel (e.g. 20 MHz secondary channel) is idle for PIFS immediately before actual PPDU transmission after the backoff timer expires, the PPDU can be transmitted on the 40 MHz channel. Accordingly, even when TXOP is obtained after the backoff timer expires by performing a backoff process on the basis of only part of the 40 MHz channel, actual PPDU transmission is not performed and thus a new backoff process may need to be performed.

When a new backoff process is performed, an STA can perform the backoff process without increasing (or changing) the contention window parameter used for previous backoff.

In the examples of the present invention, the operation of performing a backoff process on the basis of a higher CCA threshold in order to transmit a data unit having a wider channel width is not limited, such that the operation is performed only when a wireless medium is determined to be occupied from a CCA result on the basis of a lower CCA threshold when a data unit having a narrower channel width needs to be transmitted. That is, the backoff scheme proposed by the present invention is characterized in that a backoff process using CCA conditions (e.g. a CCA threshold) for the channel width of each data unit to be transmitted (or the channel width of each primary channel on which CCA or backoff is performed) is defined. For example, when a data unit having a first channel width (e.g. W MHz) or more is transmitted, it is possible to define an operation of performing a first backoff process using first CCA conditions (e.g. a CCA threshold set to A dBm) on a first primary channel corresponding to W MHz or part thereof. When TXOP is permitted as a result of the first backoff process, the data unit having the first channel width or more can be transmitted. When a data unit having a third channel width (e.g. 2W MHz) or more is transmitted, it is possible to define an operation of performing a second backoff process using second CCA conditions (e.g. a CCA threshold set to A+3 dBm) on a second primary channel corresponding to 2W MHz or part thereof as a backoff process discriminated from the first backoff process. When TXOP is permitted as a result of the second backoff process, the data unit having the third channel width or more can be transmitted.

To apply the CCA scheme proposed by the present invention, it is necessary to define a primitive for instructing, by MAC of an STA, PHY to change a CCA parameter. To this end, the present invention newly adds PHYCONFIG_VECTOR including CCA_CHANNEL_LIST and CCA_LEVEL_TYPE to the PHY-CONFIG.request primitive. Table 1 shows an example of definition of the PHY-CONFIG.request primitive and Table 2 shows an example of definition of PHY-CONFIG.confirm primitive.

TABLE 1

PHY-CONFIG.request
Function
This primitive is a request by the MAC sublayer to the local PHY entity to configure the PHY.
Semantics of the service primitive
The primitive provides the following parameter:
PHY-CONFIG.request(
PHYCONFIG_VECTOR
)
When generated
This primitive is generated by the MAC sublayer for the local PHY entity when it desires to change the configuration of the PHY.
Effect of receipt
The effect of receipt of this primitive by the PHY is to apply the parameters provided with the primitive and to configure the PHY for future operation.

TABLE 2

PHY-CONFIG.confirm
Function
This primitive is issued by the PHY to the local MAC entity to confirm that the PHY has applied the parameters provided in the PHY-CONFIG.request primitive.
Semantics of the service primitive
The semantics of the primitive are as follows:
PHY-CONFIG.confirm
This primitive has no parameters.
When generated
This primitive is issued by the PHY to the MAC entity when the PHY has received and successfully applied the parameters in the PHY-CONFIG.request primitive.
Effect of receipt
The effect of the receipt of this primitive by the MAC is unspecified.

Table 3 shows description of exemplary PHYCONFIG_VECTOR including CCA_CHANNEL_LIST and CCA_LEVEL_TYPE, which is included in the PHY-CONFIG.request primitive and newly defined according to the present invention.

TABLE 3

| Parameter | Associate vector | Value |
| --- | --- | --- |
| ACTIVE_RXCHAIN_SET | PHYCONFIG_VECTOR | The ACTIVE_RXCHAIN_SET parameter indicates which receive chains of the available receive chains are active. The length of the field is 8 bits. A 1 in bit position n indicates that the receive chain numbered n is used. At most 4 bits out of 8 may be set to 1. |
| OPERATING_CHANNEL | PHYCONFIG_VECTOR | The operating channel the PHY is configured use. |
| CHANNEL_OFFSET | PHYCONFIG_VECTOR | Enumerated type: CH_OFFSET_NONE indicates operation in 20 MHz HT STAs. CH_OFFSET_ABOVE indicates operation in 40 MHz with the secondary channel above the primary. CH_OFFSET_BELOW indicates operation in 40 MHz with the secondary channel below the primary. |
| ANT-CONFIG | PHYCONFIG_VECTOR | Indicates which antenna configuration(s) is to be used when receiving packets and which configuration is to be used when switching configurations during the reception of a packet. Values are implementation dependent. |
| GROUP_ID_MANAGEMENT | PHYCONFIG_VECTOR | The GROUP_ID_MANAGEMENT parameter specifies membership status and STA position for each of the group IDs. |
| PARTIAL_AID_LIST_GID00 | PHYCONFIG_VECTOR | The PARTIAL_AID_LIST_GID00 parameter includes the list of partial AIDs, of which the STA is an intended recipient, associated with group ID 0. |
| PARTIAL_AID_LIST_GID63 | PHYCONFIG_VECTOR | The PARTIAL_AID_LIST_GID63 parameter includes the list of partial AIDs, of which the STA is an intended recipient, associated with group ID 63. |
| LISTEN_TO_GID00 | PHYCONFIG_VECTOR | When true indicates to the PHY not to filter out PPDUs with GROUP_ID field equal to the value 0. |
| LISTEN_TO_GID63 | PHYCONFIG_VECTOR | When true indicates to the PHY not to filter out PPDUs with GROUP_ID field equal to the value 63. |
| CCA_CHANNEL_LIST | PHYCONFIG_VECTOR | Indicates which channels are reported in the channel-list parameter in a PHY-CCA.indication primitive generated by a STA. |
| CCA_LEVEL_TYPE | PHYCONFIG_VECTOR | Indicates which type of CCA level is applied to report a PHY-CCA.indication primitive generated by a STA. |

PHYCONFIG_VECTOR corresponding to CCA_CHANNEL_LIST designates a list of channels that the MAC layer of the STA wants to be reported from the PHY layer through the PHY-CCA.indication primitive. For example, when the STA considers 40 MHz PPDU transmission on the basis of a CCA threshold increased by 3 dB according to the dynamic CCA scheme proposed by the present invention, the STA requires CCA information about 40 MHz, 80 MHz and 160 MHz channels and does not require information about a 20 MHz channel. Accordingly, it is possible to set a channel set excluding the 20 MHz primary channel using CCA_CHANNEL_LIST, to call the PHY-CONFIG.request primitive and to deliver the PHY-CONFIG.request primitive to the PHY layer. Upon reception of PHYCONFIG_VECTOR corresponding to CCA_CHANNEL_LIST form the MAC layer, the PHY layer limits CCA target channels reported through the PHY-CCA.indication primitive to the cannel set designated by CCA_CHANNEL_LIST.

According to the CCA scheme proposed by the present invention, STAs can change CCA thresholds. That is, one or more different CCA threshold can be defined and an STA can use PHYCONFIG_VECTOR corresponding to CCA_LEVEL_TYPE in order to set a desired CCA threshold to the PHY layer. For example, a plurality of CCA threshold types can be defined such as Type 1, Type 2, Type 3, Type 4, . . . and information about a type that the STA wants to use can be encoded as CCA_LEVEL_TYPE. According to the CCA scheme proposed by the present invention, when the CCA threshold of Type 1 is A dBm, CCA thresholds of Type 2, Type 3 and Type 4 can be respectively set to A+3 dBm, A+6 dBm and A+9 dBm. In addition, a CCA threshold of one type can be composed of a set of CCA thresholds. For example, the CCA threshold of Type 1 can be defined as a CCA threshold set including a CCA threshold for a PPDU having a W MHz channel width, a CCA threshold for a PPDU having a 2W MHz channel width, a CCA threshold for a PPDU having a 4W MHz channel width, a CCA threshold for a PPDU having a 6W MHz channel width, etc. Upon reception of PHYCONFIG_VECTOR corresponding to CCA_LEVEL_TYPE from the MAC layer, a CCA threshold reported through the PHY-CCA.indication primitive is determined in the PHY layer on the basis of the corresponding CCA type.

Table 4 shows an example of definition of the PHY-CCA.indication primitive.

TABLE 4

PHY-CCA.indication
Function
This primitive is an indication by the PHY to the local MAC entity of the current state of the medium and to provide observed IPI values when IPI reporting is turned on.
Semantics of the service primitive
The primitive provides the following parameters:
PHY-CCA.indication(
STATE,
IPI-REPORT,
channel-list
)
The STATE parameter can be one of two values: BUSY or IDLE. The parameter value is BUSY if the assessment of the channel(s) by the PHY determines that the channel(s) are not available.
Otherwise, the value of the parameter is IDLE.
The IPI-REPORT parameter is present if dot1
1RadioMeasurementActivated is true and if IPI reporting has been turned on by the IPI-STATE parameter. The IPI-REPORT parameter provides a set of IPI values for a time interval. The set of IPI values may be used by the MAC sublayer for Radio Measurement purposes.
The set of IPI values are recent values observed by the PHY entity since the generation of the most recent PHYTXEND.confirm, PHY-RXEND.indication, PHY-CCARESET.confirm, or PHY-CCA.indication primitive, whichever occurred latest.
When STATE is IDLE or when, for the type of PHY in operation, CCA is determined by a single channel, the channel-list parameter is absent. Otherwise, it carries a set indicating which channels are busy. The channel-list parameter in a PHY-CCA.indication primitive generated by a STA contains at most a single element. Below table defines the members of this set.
When generated
This primitive is generated within aCCATime of the occurrence of a change in the status of the channel(s) from channel idle to channel busy or from channel busy to channel idle, or when the elements of the channel-list parameter change; otherwise this primitive is generated when the status of the channel(s) changes from channel idle to channel busy or from channel busy to channel idle, or when the elements of the channel-list parameter change. This includes the period of time when the PHY is receiving data. Refer to specific PHY clauses for details about CCA behavior for a given PHY. If the STA is an HT STA but not a VHT STA and the operating channel width is 20 MHz, the PHY maintains the channel busy indication until the period indicated by the LENGTH field has expired, where the LENGTH field is
 In a valid SIGNAL field if the format of the PPDU is NON_HT
 In a valid HT-SIG field if the format of the PPDU is HT_MF or HT_GF
If the STA is an HT STA but not a VHT STA and the operating channel width is 40 MHz, the PHY maintains the channel busy indication until the period indicated by the LENGTH field has expired, where the LENGTH field is
 In a valid SIGNAL field if the format of the PPDU is NON_HT and the PPDU is received in the primary 20 MHz channel
 In a valid HT-SIG field if the format of the PPDU is HT_MF or HT_GF provided that the PPDU is either a 20 MHz PPDU received in the primary channel or a 40 MHz PPDU
Effect of receipt
The effect of receipt of this primitive by the MAC is unspecified.

Table 5 shows Channel-list parameter elements included in the PHY-CCA.indication primitive.

TABLE 5

| channel-list elements | Meaning |
|---|---|
| Primary | For an HT STA that is not a VHT STA, indicates that the primary 20 MHz channel is busy. For a VHT STA, indicates that the primary 20 MHz channel is busy. |
| Secondary | For an HT STA that is not a VHT STA, indicates that the secondary channel is busy. For a VHT STA, indicates that the secondary 20 MHz channel is busy. |
| secondary40 | Indicates that the secondary 40 MHz channel is busy. |
| secondary80 | Indicates that the secondary 80 MHz channel is busy. |

According to the dynamic CCA scheme proposed by the present invention, two or more CCA types can be defined. A CCA threshold set (i.e. CCA threshold defined per channel width) can be defined for one CCA type, and different CCA threshold sets can be defined for different CCA types.

Furthermore, a CCA threshold for preamble detection and a CCA threshold for energy detection may be separately set for one CCA type. The preamble detection CCA threshold corresponds to a value of signal strength of an STF, an LTF and an SIG field corresponding to a PLCP preamble. When the signal strength of a preamble is greater than a predetermined threshold, it is possible to detect presence of a valid 802.11 signal by receiving the preamble. The energy detection CCA threshold is used to detect a channel which is being used when strength of a specific signal is greater than a predetermined threshold in a state that a preamble is not received.

Figure 26:
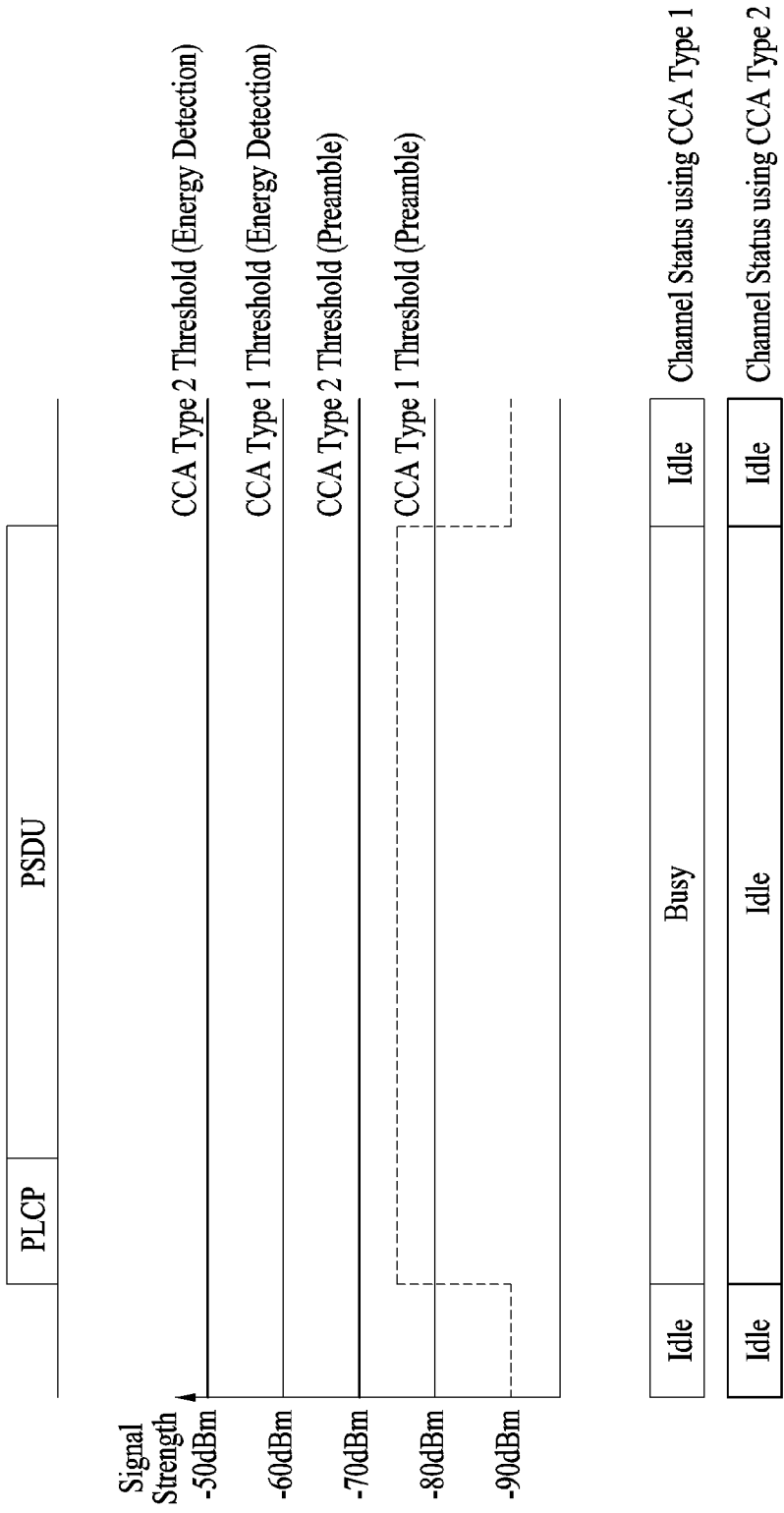
FIG. 26 illustrates an example of CCA operation according to CCA type.

FIG. 26 illustrates an exemplary CCA operation according to CCA type.

In the example shown in FIG. 26, the preamble detection CCA threshold is set to −80 dBm and the energy detection CCA threshold is set to −60 dBm in CCA Type 1, whereas the preamble detection CCA threshold is set to −70 dBm and the energy detection CCA threshold is set to −50 dBm in CCA Type 2.

When a plurality of CCA types is defined, an STA can change the corresponding CCA type to a CCA type set by an AP by receiving a beacon frame, a probe response frame and a management frame (e.g. CCA control frame) transmitted from the AP. Alternatively, the STA may autonomously change the CCA type according to the environment in which the STA currently operates.

The CCA type change operation of the STA includes calling the aforementioned PHY-CONFIG.request primitive. That is, the MAC layer of the STA can transmit the PHY-CONFIG.request primitive including PHYCONFIG_VECTOR to the PHY layer. The PHYCONFIG_VECTOR includes CCA_LEVEL_TYPE parameter, and the value of the CCA_LEVEL_TYPE parameter can be set to CCA Type1 or CCA Type 2.

FIG. 26 shows an example in which, when a transmission STA transmits a PPDU (i.e. PLCP and PSDU), a reception STA performs CCA in the PHY so as to report the PHY-CCA.indication primitive to the MAC. In the example of FIG. 26, a dotted line indicates signal strength detected by the reception STA.

In the lower part of FIG. 26, Channel Status using CCA Type 1 indicates a channel state determined when the reception STA performs CCA using CCA Type 1 and Channel Status using CCA Type 2 indicates a channel state determined when the reception STA performs CCA using CCA Type 2.

A case in which an STA determines a channel state using a preamble detection CCA threshold is assumed. In this case, signal strength of the preamble of a received signal is greater than the preamble detection CCA threshold of CCA Type 1 but less than the preamble detection CCA threshold of CCA Type 2. Accordingly, channel state "busy" is reported when CCA Type 1 is used, whereas channel state "idle" is reported when CCA Type 2 is used.

Figure 27:
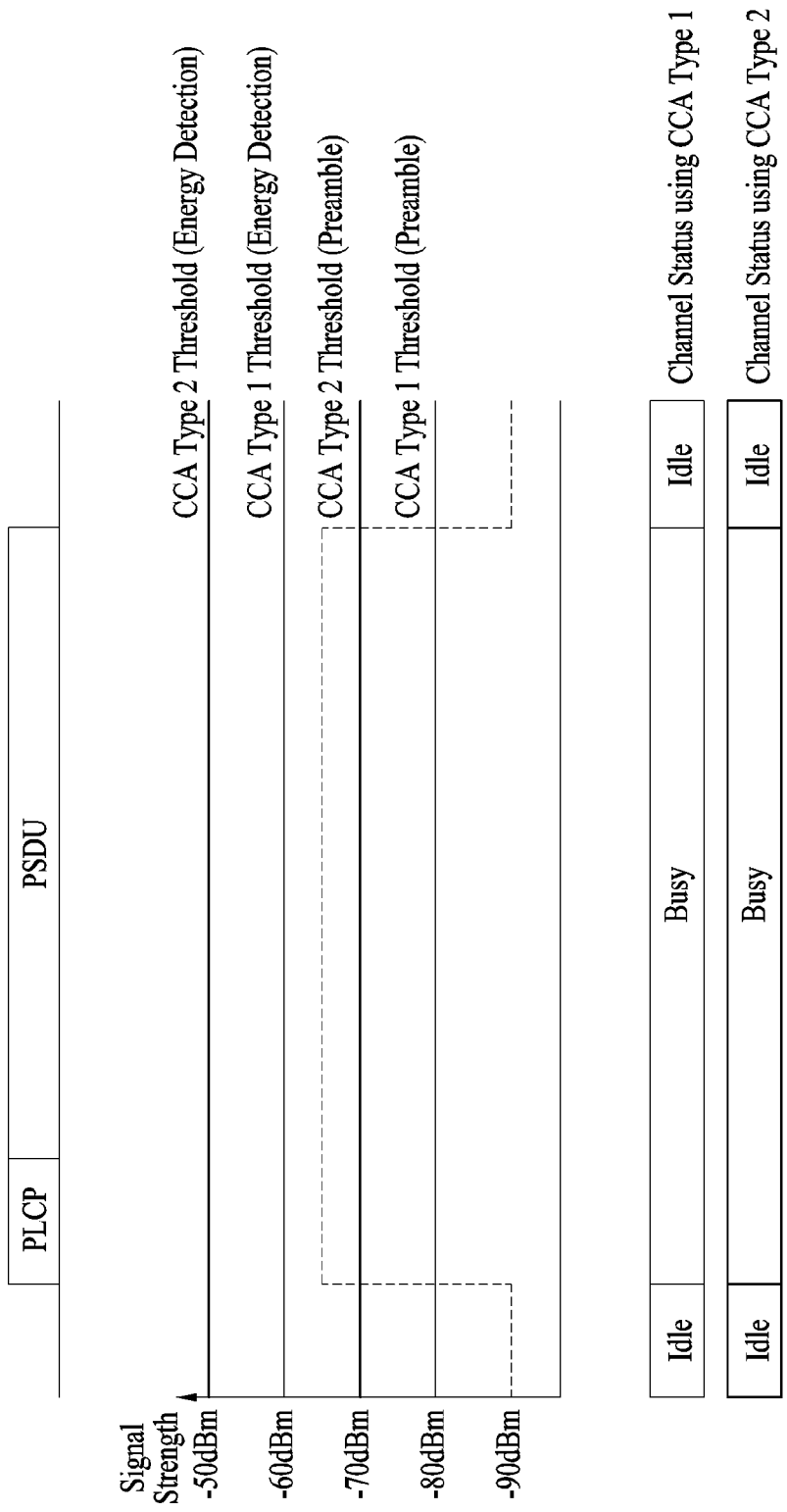
FIG. 27 illustrates another example of CCA operation according to CCA type.

FIG. 27 illustrates another exemplary CCA operation according to CCA type.

FIG. 27 shows a case in which a reception STA successfully receives PLCP of a PPDU and the strength of the received signal is greater than the preamble detection CCA threshold of CCA Type 1 and the preamble detection CCA threshold of CCA Type 2. In this case, channel state "busy" is reported when CCA Type 1 and CCA Type 2 are used.

Figure 28:
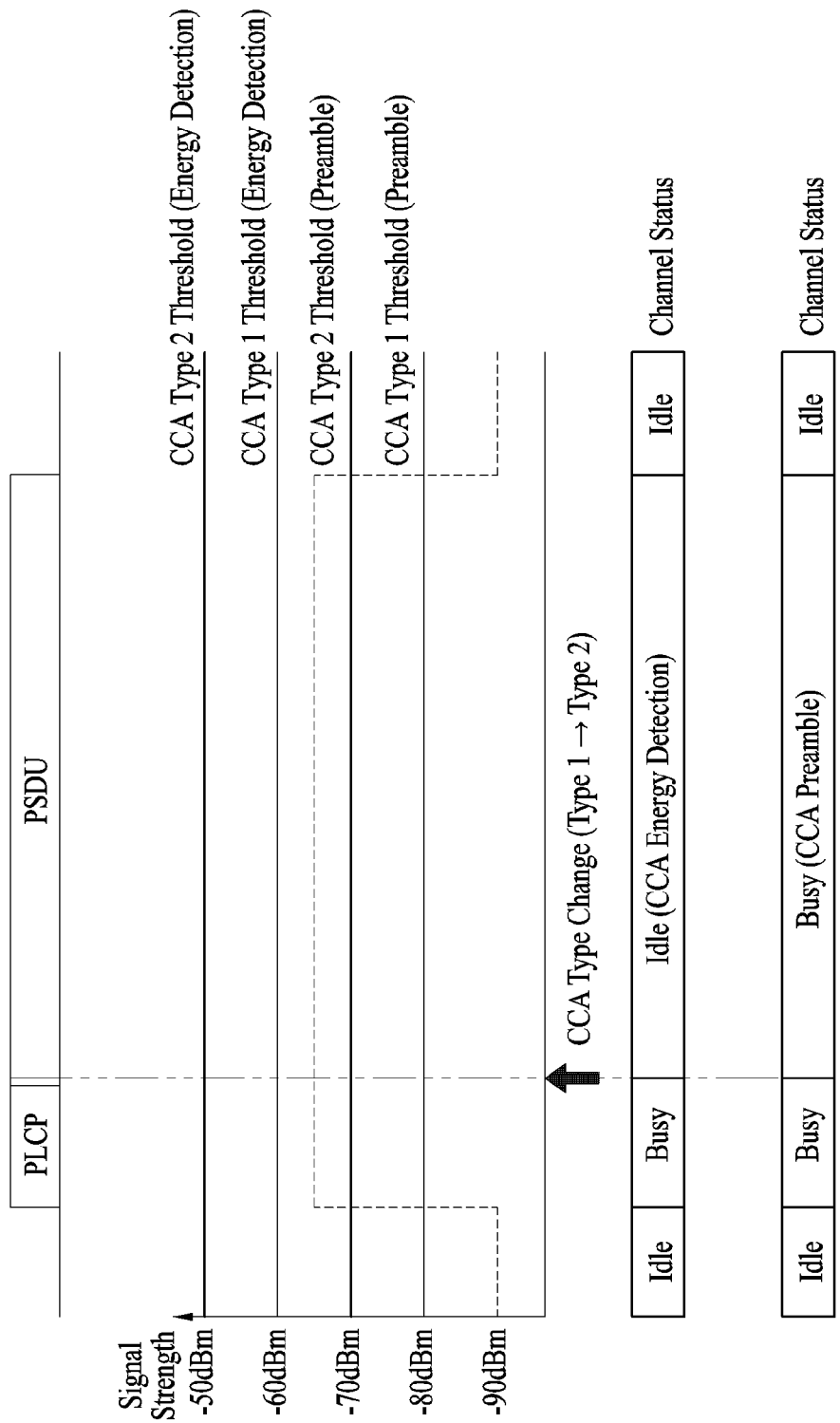
FIG. 28 illustrates another example of CCA operation according to CCA type.

FIG. 28 illustrates another exemplary CCA operation according to CCA type.

FIG. 28 shows a case in which CCA Type 1 is changed to CCA Type 2 according to the PHY-CONFIG.request primitive call while a reception STA performs CCA operation using CCA Type 1.

The reception STA successfully receives PLCP of a PPDU and determines a channel state using the preamble detection CCA threshold. Since the strength of the received signal is higher than the preamble detection CCA threshold, the channel state is reported as "busy". Here, the CCA type of the STA can be changed from CCA Type 1 to CCA Type 2. In this case, the channel state determination result is remarkably changed according to when and/or how the reception STA applies the changed CCA type. Accordingly, the present invention proposes a detailed rule with respect to CCA type change of the reception STA.

In the example shown in FIG. 28, when the reception STA changes the CCA type from CCA Type 1 to CCA Type 2 and then applies the energy detection CCA threshold, the channel state may be reported as "idle" since the received signal strength is less than the energy detection CCA threshold of CCA Type 2.

When the reception STA changes the CCA type from CCA Type 1 to CCA Type 2 and then applies the preamble detection CCA threshold in the example shown in FIG. 28, the channel state may be reported as "busy" since the received signal strength is higher than the preamble detection CCA threshold of CCA Type 2.

As described above, the preamble detection CCA threshold is for detecting use of a valid 802.11 signal by receiving a PLCP preamble when signal strength of the STF, LTF and SIG field corresponding to the PLCP preamble is greater than a predetermined threshold. Accordingly, the present invention proposes a rule of applying the energy detection CCA threshold of the changed CCA type when the reception STA does not detect use of a valid 802.11 signal after changing the CCA type. That is, when the reception STA detects use of a valid 802.11 signal after changing the CCA type, the preamble detection CCA threshold of the changed CCA type is applied.

In addition, the present invention proposes a method of applying the preamble detection CCA threshold of the changed CCA type, instead of the energy detection CCA threshold thereof, when the CCA type is changed in a state that the STA detects use of a valid 802.11 signal. To this end, the reception STA needs to store the signal strength of a PLCP when receiving the PLCP all the time, resulting in increase in the complexity of implementation of the reception STA. However, the STA can determine and report more accurate channel state by applying a newly changed CCA type.

Alternatively, to simplify STA implementation, the present invention proposes a method of delaying application of CCA type change until the channel state becomes an idle state without changing CCA type when the current channel state is busy, upon reception of a CCA type change request through PHY-CONFIG.request primitive. That is, PHY-CONFIG.request primitive for requesting CCA type change is received and CCA type change is applied when the channel state is idle. If the channel state is idle when a PHY-CONFIG.request primitive for requesting CCA type change is received, CCA type change can be immediately applied.

Alternatively, when the STA requests CCA type change through the PHY-CONFIG.request primitive, the STA may be restricted such that the STA calls the PHY-CONFIG.request primitive only when the channel state is idle. That is, when the current channel state is busy, the STA cannot request CCA type change through PHY-CONFIG.request primitive.

In addition, different CCA thresholds may be predefined and the PHY layer may report a channel state to which each CCA threshold has been applied to the MAC layer through the PHY-CCA.indication primitive. In this case, CCA type change through the PHY-CONFIG.request primitive is not requested, and the PHY layer may define a plurality of CCA thresholds as several types such as Type 1, Type 2, Type 3 and Type 4, compare a CCA threshold defined per type (i.e. for each type) with signal strength and report the PHY-CCA.indication primitive to the MAC layer when the signal strength exceeds the CCA threshold. Here, the PHY-CCA.indication primitive may include information indicating a type with respect to corresponding CCA status information.

To this end, the present invention proposes addition of a field indicating CCA type to the PHY-CCA.indication primitive.

Table 6 shows an example of definition of the PHY-CCA.indication primitive.

TABLE 6

PHY-CCA.indication
Function
This primitive is an indication by the PHY to the local MAC entity of the current state of the medium and to provide observed IPI values when IPI reporting is turned on.
Semantics of the service primitive
The primitive provides the following parameters:
PHY-CCA.indication(
STATE,
IPI-REPORT,
channel-list
CCA-Type
)
. . .

In Table 6, the PHY-CCA.indication primitive additionally includes a CCA-Type field. The CCA-Type field indicates CCA-Type on which state and channel-list information reported through PHY-CCA.indication primitive is based.

In addition to the method of adding the CCA-Type field to the PHY-CCA.indication primitive, the present invention provides a method of newly defining a PHY-CCA.indication primitive per CCA type in terms of STA implementation. That is, a PHY-CCA1.indication primitive, PHY-CCA2.indication primitive, PHY-CCA3.indication primitive and a PHY-CCA4.indication primitive can be respectively defined for CCA Type 1, Type 2, Type 3 and Type 4. In this case, PHY-CCA{n}.indication primitive defined for newly defined CCA-Type{n} does not include a CCA-Type field.

The STA may reset CCA status information of the PHY layer in a case in which a NAV (Network Allocation Vector) value for virtual carrier sensing is reset in the MAC layer. When the STA defines a CCA threshold per CCA type in the PHY layer as in the present invention, the PHY-CCARESET.request primitive for resetting CCA status information of the PHY layer can be used. The present invention proposes inclusion of CCA Type information in a PHY-CCARESET.request primitive.

Table 7 shows an example of definition of the PHY-CCARESET.request primitive.

TABLE 7

PHY-CCARESET.request
Function
This primitive is a request by the MAC sublayer to the local PHY entity to reset the CCA state machine and to turn IPI reporting on and off by means of the IPI-STATE parameter.
Semantics of the service primitive
The primitive provides the following parameter:
PHY-CCARESET.request(
IPI-STATE,
CCA-Type
)
The IPI-STATE parameter is present if dot1 1RadioMeasurementActivated is true. The IPI-STATE parameter can be one of two values: IPI-ON or IPI-OFF. The parameter value is IPI-ON when the MAC sublayer is requesting the PHY entity to report IPI values when the PHY is neither receiving nor transmitting an MPDU. IPI-ON turns on IPI reporting in the PHY entity. IPI-OFF turns off IPI reporting in the PHY entity.
When generated
This primitive is generated by the MAC sublayer for the local PHY entity at the end of a NAV timer and at a time indicated in CS mechanism after each MAC slot boundary, which is described in DCF timing relations and Obtaining an EDCA TXOP. This request can be used by some PHY implementations that may synchronize antenna diversity with slot timings.
Effect of receipt
The effect of receipt of this primitive by the PHY entity is to reset the PHY CS/CCA timers to the state appropriate for the end of a received frame and to initiate a new CCA evaluation cycle. If IPI-STATE parameter is IPI-ON, the PHY entity collects IPI values when it is not transmitting or receiving and provides those values to the MAC sublayer using the IPI-REPORT parameter.

Table 7 shows that the PHY-CCARESET.request primitive includes a CCA-Type field. The CCA-Type field indicates a CCA type to which the PHY-CCARESET.request primitive is applied.

When the STA defines a CCA threshold per CCA type in the PHY layer, a CCA type which will be actually used in the PHY layer can be determined according to CCA type actually supported by a BSS to which the STA belongs. To this end, a PHY-CCATYPESET.request primitive can be defined. Parameters included in the PHY-CCATYPESET.request primitive may include a value indicating "active" or "inactive" for each CCA type. The PHY-CCATYPESET.request primitive is a primitive delivered from the MAC layer to the PHY layer of an STA, and the PHY layer of the STA can report CCA status information to the MAC layer through a PHY-CCA{n}.indication primitive only for CCA Type{n} set to "active" upon reception of the PHY-CCATYPESET.request primitive. For CCA-Type{n} set to "inactive", the PHY layer may not report CCA status information to the MAC layer through the PHY-CCA {n}.indication primitive.

Figure 29:
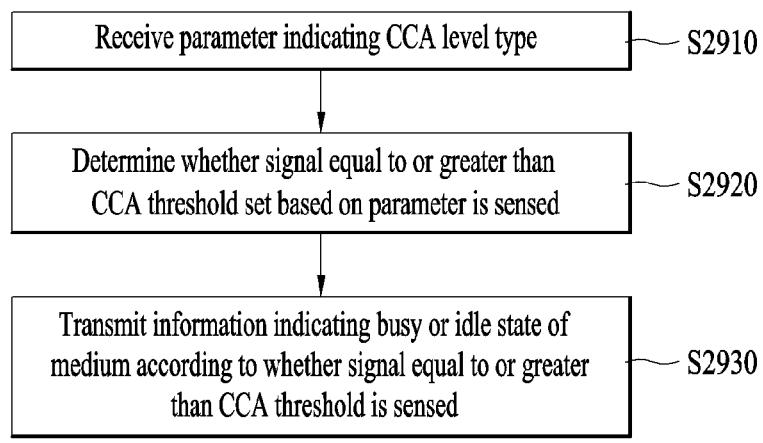
FIG. 29 illustrates an exemplary CCA method according to the present invention.

FIG. 29 is a flowchart illustrating a CCA method according to an embodiment of the present invention.

A PHY layer (or PHY layer module) of an STA may receive a request primitive (e.g. PHY-CONFIG.request primitive of Table 1) including a parameter (e.g. the CCA_LEVEL_TYPE parameter of Table 3) which indicates a CCA level type from a higher layer (e.g. MAC layer) in step S2910.

Here, the parameter indicating the CCA level type may be set to a first CCA level type for transmission of a data unit (e.g. PPDU) having a first channel width or more and to a second CCA level type for transmission of a data unit having more than a second channel width wider than the first channel width. A first CCA threshold set for the second CCA level type may be higher than a second CCA threshold set for the first CCA level type. For example, the first CCA threshold for a W MHz primary channel can be set to A dBm for transmission of a data unit having the first channel width or more, whereas the second CCA threshold for the W MHz primary channel can be set to A+3 dBm for transmission of a data unit having the second channel width or more.

It is possible to determine whether a signal having strength exceeding a CCA threshold (e.g. the first or second CCA threshold) set on the basis of the parameter value provided by the higher layer is detected in step S2920.

It is possible to transmit, to the higher layer, information (e.g. CCA indication primitive) indicating that a corresponding medium is busy when the signal having strength exceeding the CCA threshold is detected and indicating that the medium is idle otherwise in step S2930.

The STA can perform a backoff process including CCA operation of steps S2910 to S2930.

Specifically, for transmission of a data unit having the first channel width or more (e.g. a PPDU having a channel width of W MHz or more), the STA can perform a first backoff process using first CCA conditions (e.g. a CCA threshold set of Type 1 (i.e. a set of CCA thresholds defined as A dBm for detection of a W MHz PPDU, A+3 dBm for detection of a 2W MHz PPDU, A+6 dBm for detection of a 4W MHz PPDU and A+9 dBm for detection of an 8W MHz PPDU)) on a first primary channel having a channel width less than the first channel width (e.g. a W MHz primary channel or a primary channel corresponding to part of W MHz).

For transmission of a data unit having the second channel width or more (e.g. a PPDU having a channel width of more than 2W MHz, 4W MHz or 8W MHz), the STA can perform a second backoff process using second CCA conditions (e.g. a CCA threshold set of Type 2 (i.e. a set of CCA thresholds defined as A+3 dBm for detection of a W MHz PPDU, A+6 dBm for detection of a 2W MHz PPDU, A+9 dBm for detection of a 4W MHz PPDU and A+12 dBm for detection of a 8W MHz PPDU)) on a second primary channel having a channel width less than the second channel width (e.g. a 2W MHz primary channel or a W MHz primary channel).

When the STA is permitted to obtain TXOP as a result of the first backoff process, the STA can transmit the data unit having the first channel width or more (e.g. a PPDU having W MHz or more).

When the STA is permitted to obtain TXOP as a result of the second backoff process, the STA can transmit the data unit having the first channel width or more (e.g. a PPDU having a channel width of greater than 2W MHz, 4W MHz or 8W MHz).

While the exemplary method described with reference to FIG. 29 is represented as a series of operations for clarity of description, step execution order is not limited thereby and the steps may be performed simultaneously or in different order as necessary. Furthermore, to implement the method proposed by the present invention, all steps illustrated in FIG. 29 are not necessarily required.

In the method of the present invention, illustrated in FIG. 29, the aforementioned various embodiments of the present invention can be independently applied or two or more thereof can be simultaneously applied.

Figure 30:
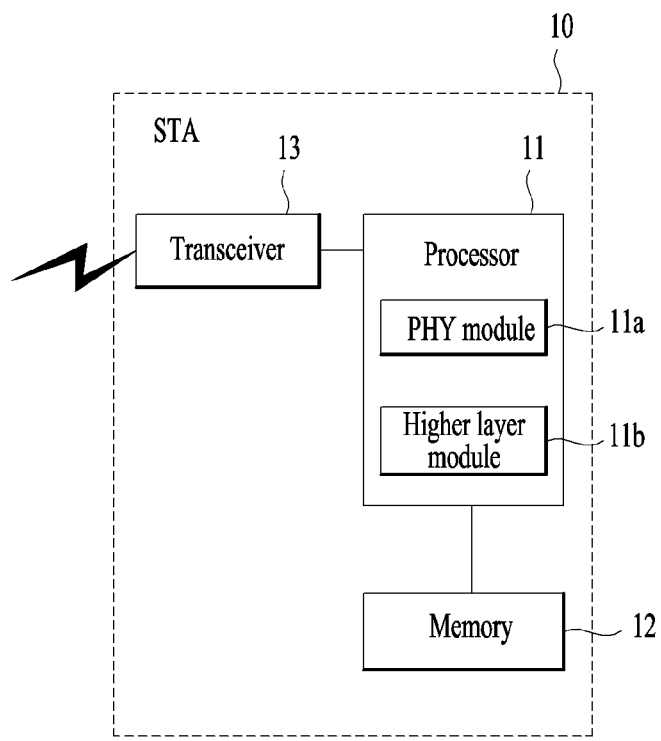
FIG. 30 is a block diagram of a wireless apparatus according to an embodiment of the present invention.

FIG. 30 is a block diagram of a wireless apparatus according to an embodiment of the present invention.

An STA 10 may include a processor 11, a memory 12 and a transceiver 13. The transceiver 13 may transmit/receive RF signals and implement a physical layer according to IEEE 802, for example. The processor 11 may implement a physical layer and/or a MAC layer according to IEEE 802 by being connected to the transceiver 13. The processor 11 may include a PHY module 11a and a higher layer module 11b (e.g. MAC module). The processor 11 may be configured to perform operations according to various embodiments of the present invention. In addition, a module implementing operations according to the aforementioned various embodiments of the present invention may be stored in the memory 12 and executed by the processor 11. The memory 12 may be included in the processor 11 or provided to the outside of the processor 11 and connected to the processor 11 through a known means.

The STA 10 shown in FIG. 30 may be configured to perform the CCA operation proposed by the present invention in a wireless LAN system. The PHY module may be configured to receive a request primitive including a parameter indicating a CCA level type from the MAC module and to determine whether a signal exceeding a CCA threshold set on the basis of the parameter is detected. The parameter may be set to a first CCA level type for transmission of a data unit having a first channel width or more and set to a second CCA level type for transmission of a data unit having a second channel width or more. Here, the second channel width may be wider than the first channel width, and a second CCA threshold set for the second CCA level type may be higher than a first CCA threshold set for the first CCA level type.

A detailed configuration of the aforementioned apparatus may be implemented such that the aforementioned various embodiments of the present invention can be independently applied or two or more thereof can be simultaneously applied, and redundant description is omitted for clarity.

The embodiments of the present invention may be achieved by various means, for example, hardware, firmware, software, or a combination thereof.

In a hardware configuration, the methods according to the embodiments of the present invention may be achieved by one or more Application Specific Integrated Circuits (ASICs), Digital Signal Processors (DSPs), Digital Signal Processing Devices (DSPDs), Programmable Logic Devices (PLDs), Field Programmable Gate Arrays (FPGAs), processors, controllers, microcontrollers, microprocessors, etc.

In a firmware or software configuration, the embodiments of the present invention may be implemented in the form of a module, a procedure, a function, etc. For example, software code may be stored in a memory unit and executed by a processor. The memory unit may be located at the interior or exterior of the processor and may transmit data to and receive data from the processor via various known means.

The detailed description of the preferred embodiments of the present invention is given to enable those skilled in the art to realize and implement the present invention. While the present invention has been described referring to the preferred embodiments of the present invention, those skilled in the art will appreciate that many modifications and changes can be made to the present invention without departing from the spirit and essential characteristics of the present invention. Therefore, the present invention is not intended to limit the embodiments disclosed herein but to give a broadest range matching the principles and new features disclosed herein.

INDUSTRIAL APPLICABILITY

While the aforementioned various embodiments of the present invention have been described based on IEEE 802.11, the embodiments can be equally applicable to various mobile communication systems.

The invention claimed is:

1. A method for performing clear channel assessment (CCA) by a station (STA) in a wireless local area network (LAN) system, the method comprising:
receiving, by a physical layer (PHY) of the STA, a request primitive including a parameter indicating a CCA level type from a higher layer;
checking whether a medium is busy or idle based on a CCA threshold when the STA intends to transmit a Physical layer Protocol Data Unit (PPDU),
wherein the CCA threshold is determined based on one of a plurality of CCA threshold sets each having a plurality of CCA thresholds, and the CCA level type indicates the one of the plurality of CCA threshold sets,
wherein when the parameter is set to a first CCA level type, a first CCA threshold of a first CCA threshold set is determined to be the CCA threshold,
wherein when the parameter is set to a second CCA level type, a second CCA threshold of a second CCA threshold set is determined to be the CCA threshold,
wherein the first CCA threshold set supports a smaller channel width than the second CCA threshold set,
wherein the second CCA threshold of the second CCA threshold set for the second CCA level type is higher than the first CCA threshold of the first CCA threshold set for the first CCA level type, and
wherein when a width of the PPDU is equal to or greater than a predetermined channel width, the higher layer configures the parameter of the request primitive to the second CCA level type.

2. The method according to claim 1,
wherein a CCA indication primitive including information indicating that the medium is busy is transmitted from the physical layer to the higher layer when a signal equal to or greater than the CCA threshold is sensed from the medium, and
wherein a CCA indication primitive including information indicating that the medium is idle is transmitted from the physical layer to the higher layer when the signal equal to or greater than the CCA threshold is not sensed from the medium.

3. The method according to claim 1, wherein the request primitive is a PHY-CONFIG.request primitive.

4. The method according to claim 1,
wherein the first CCA level type is used for transmission of a PPDU which is equal to or greater than a first channel width,
wherein the second CCA level type is used for transmission of a PPDU which is equal to or greater than a second channel width, and
wherein the second channel width corresponds to the predetermined channel width and is greater than the first channel width.

5. The method according to claim 4,
wherein a first backoff process is performed on a first primary channel having a channel width less than or equal to the first channel width using first CCA conditions including the first CCA threshold when the parameter is set to the first CCA level type, and
wherein a second backoff process is performed on a second primary channel having a channel width less than or equal to the second channel width using second CCA conditions including the second CCA threshold when the parameter is set to the second CCA level type.

6. The method according to claim 5, wherein a backoff timer value of the first backoff process is decreased per backoff slot when the first primary channel is idle, and a backoff timer value of the second backoff process is decreased per backoff slot when the second primary channel is idle.

7. The method according to claim 5, wherein a PPDU having a channel width equal to or greater than the first channel width is transmitted when a transmission opportunity (TXOP) is permitted as a result of the first backoff process, and a PPDU having a channel width equal to or greater than the second channel width is transmitted when a TXOP is permitted as a result of the second backoff process.

8. The method according to claim 7, wherein permission of the TXOP as a result of the first backoff process includes arrival of the backoff timer value of the first backoff process at 0, and permission of the TXOP as a result of the second backoff process includes arrival of the backoff timer value of the second backoff process at 0.

9. The method according to claim 8,
wherein transmission of the PPDU having a channel width equal to or greater than the first channel width is performed according to an idle state of one or more secondary channels when the TXOP is permitted as a result of the first backoff process,
wherein transmission of the PPDU having a channel width equal to or greater than the second channel width is performed according to an idle state of one or more secondary channels when the TXOP is permitted as a result of the second backoff process.

10. The method according to claim 9, wherein, when the TXOP is permitted as a result of the second backoff process and the one or more secondary channels are busy, a new backoff process is performed.

11. The method according to claim 4, wherein the first channel width is W MHz, 2W MHz, 4W MHz or 8W MHz and the second channel width is 2W MHz, 4W MHz or 8W MHz, where W denotes a first primary channel width which is a non-zero value.

12. The method according to claim 4, wherein a PHY-CONFIG.confirm primitive is transmitted from the physical layer to the higher layer in response to the PHY-CONFIG.request primitive.

13. The method according to claim 1, wherein the second CCA threshold is 3 dBm higher than the first CCA threshold.

14. A station (STA) performing clear channel assessment (CCA) in a wireless local area network (LAN) system, the STA comprising:
a transceiver; and
a processor to operate a physical layer module and a higher layer module,
wherein the processor controls the physical layer module to receive a request primitive including a parameter indicating a CCA level type from the higher layer module and checks whether a medium is busy or idle based on a CCA threshold when the STA intends to transmit a Physical layer Protocol Data Unit (PPDU),
wherein the CCA threshold is determined based on one of a plurality of CCA threshold sets each having a plurality of CCA thresholds, and the CCA level type indicates the one of the plurality of CCA threshold sets,
wherein when the parameter is set to a first CCA level type, a first CCA threshold of a first CCA threshold set is determined to be the CCA threshold,
wherein when the parameter is set to a second CCA level type, a second CCA threshold of a second CCA threshold set is determined to be the CCA threshold,
wherein the first CCA threshold set supports a smaller channel width than the second CCA threshold set,
wherein the second CCA threshold of the second CCA threshold set for the second CCA level type is higher than the first CCA threshold of the first CCA threshold set for the first CCA level type, and
wherein when a width of the PPDU has a channel width that is equal to or greater than a predetermined channel width, the higher layer module configures the parameter of the request primitive to the second CCA level type.

* * * * *